US010632801B2

(12) United States Patent
Hicks

(10) Patent No.: US 10,632,801 B2
(45) Date of Patent: Apr. 28, 2020

(54) TIRE CHARACTERISTIC DETERMINATION SYSTEM, TIRE-WHEEL ASSEMBLY MANUFACTURING SYSTEM AND METHODS FOR OPERATING THE SAME

(71) Applicant: Android Industries LLC, Auburn Hills, MI (US)

(72) Inventor: Joshua James Hicks, Grand Blanc, MI (US)

(73) Assignee: Android Industries LLC, Auburn Hills, MI (US)

( * ) Notice: Subject to any disclaimer, the term of this patent is extended or adjusted under 35 U.S.C. 154(b) by 675 days.

(21) Appl. No.: 15/287,207

(22) Filed: Oct. 6, 2016

(65) Prior Publication Data
US 2017/0096038 A1 Apr. 6, 2017

Related U.S. Application Data

(60) Provisional application No. 62/237,953, filed on Oct. 6, 2015.

(51) Int. Cl.
| | | |
|---|---|---|
| *B60C 25/05* | (2006.01) | |
| *G06F 16/901* | (2019.01) | |
| *B60C 19/00* | (2006.01) | |
| *G01M 17/02* | (2006.01) | |
| *B60C 25/00* | (2006.01) | |

(52) U.S. Cl.
CPC .......... *B60C 25/0551* (2013.01); *B60C 19/00* (2013.01); *B60C 25/007* (2013.01); *B60C 25/0503* (2013.01); *B60C 25/0515* (2013.01); *G01M 17/02* (2013.01); *G06F 16/9017* (2019.01)

(58) Field of Classification Search
CPC .............. B60C 25/0551; B60C 25/007; B60C 25/0503; G06F 16/9017
USPC ......................................................... 73/146
See application file for complete search history.

(56) References Cited

U.S. PATENT DOCUMENTS

5,980,083 A * 11/1999 Patte ..................... B60C 25/145
  700/95
8,919,413 B2   12/2014 Lawson et al.
(Continued)

FOREIGN PATENT DOCUMENTS

JP     2005-153764 A    6/2005
WO    WO-2014-186171 A1   11/2014

OTHER PUBLICATIONS

International Search Report for Application No. PCT/US2016/055616 dated Jan. 20, 2017.

*Primary Examiner* — Nathaniel T Woodward
(74) *Attorney, Agent, or Firm* — Honigman LLP

(57) ABSTRACT

A tire characteristic determination system is disclosed. The tire characteristic determination system includes a memory device that stores tire-engaging data related to one or more tire-engaging value to be utilized for spatially manipulating a tire about a wheel for forming a tire-wheel assembly. The tire characteristic determination device includes a tire-engaging test probe that is urged adjacent the tire at one or more tire displacement distances or is urged against the tire with one or more amounts of urging forces. The tire characteristic determination device is communicatively-coupled to the memory device for communicating the one or more tire displacement distances or the one or more amounts of urging forces to the memory device.

11 Claims, 34 Drawing Sheets

(56) References Cited

U.S. PATENT DOCUMENTS

| | | | |
|---|---|---|---|
| 8,973,640 B1* | 3/2015 | Hanneken | B60C 25/138 157/1.17 |
| 8,991,038 B2* | 3/2015 | Lawson | B60C 25/0515 29/802 |
| 2010/0000310 A1 | 1/2010 | Braghiroli | |
| 2010/0051206 A1* | 3/2010 | Lawson | B60C 25/0515 157/1.17 |
| 2012/0197549 A1* | 8/2012 | Oblizajek | G01M 17/025 702/43 |
| 2013/0081765 A1 | 4/2013 | Lawson et al. | |
| 2015/0096692 A1* | 4/2015 | Molbach | B60C 25/0515 157/1.17 |
| 2015/0165844 A1* | 6/2015 | Lawson | B60C 25/0515 157/1.22 |
| 2017/0166019 A1* | 6/2017 | Singh | B60C 23/0474 |

* cited by examiner

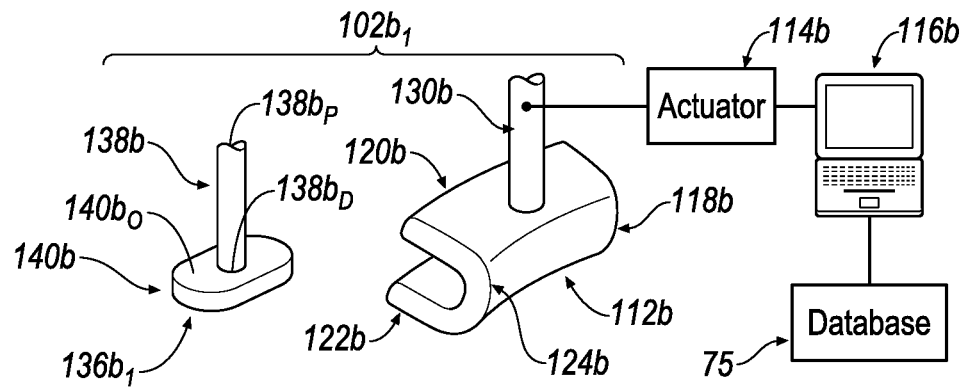
FIG. 2B$_1$
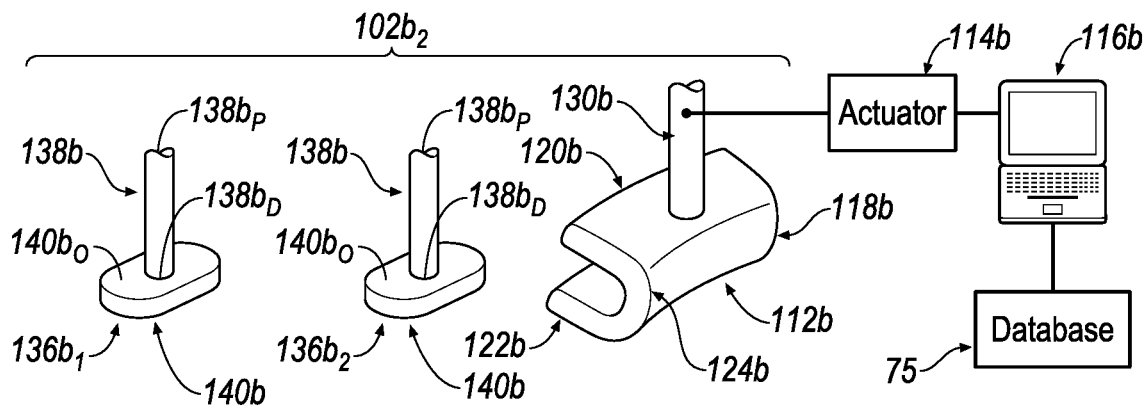
FIG. 2B$_2$
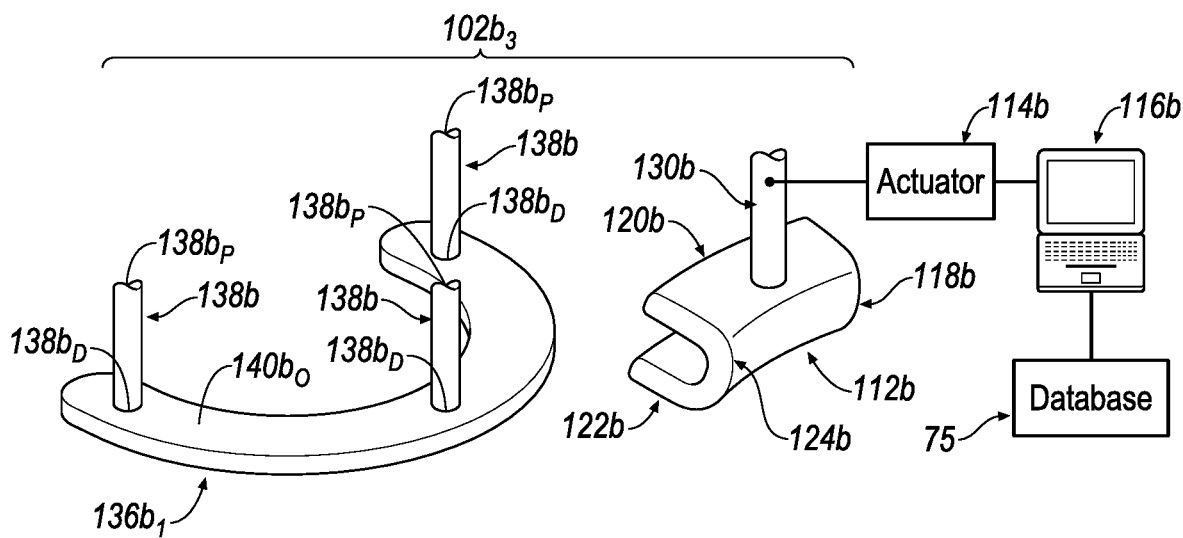
FIG. 2B$_3$

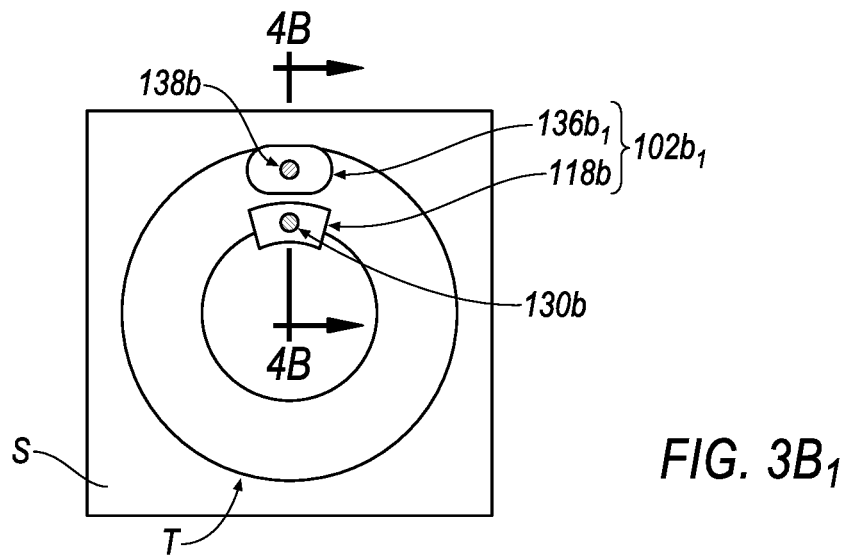
FIG. 3B₁
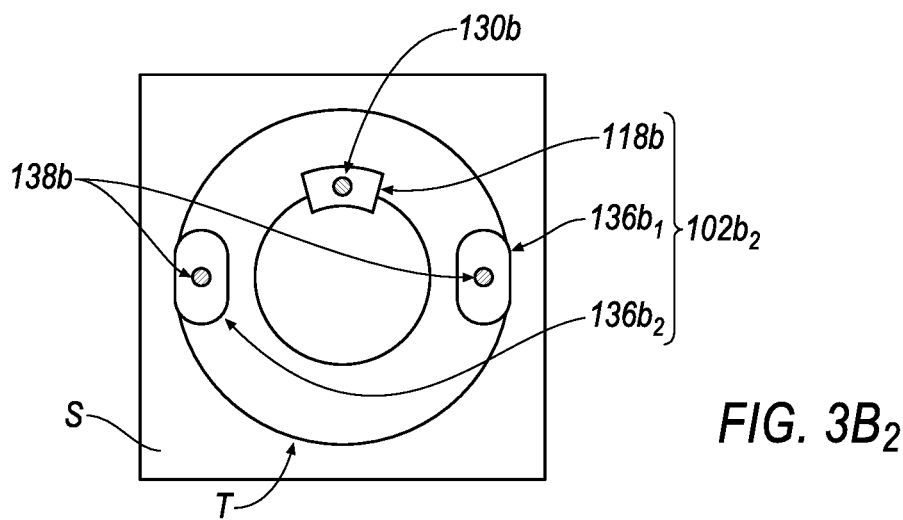
FIG. 3B₂
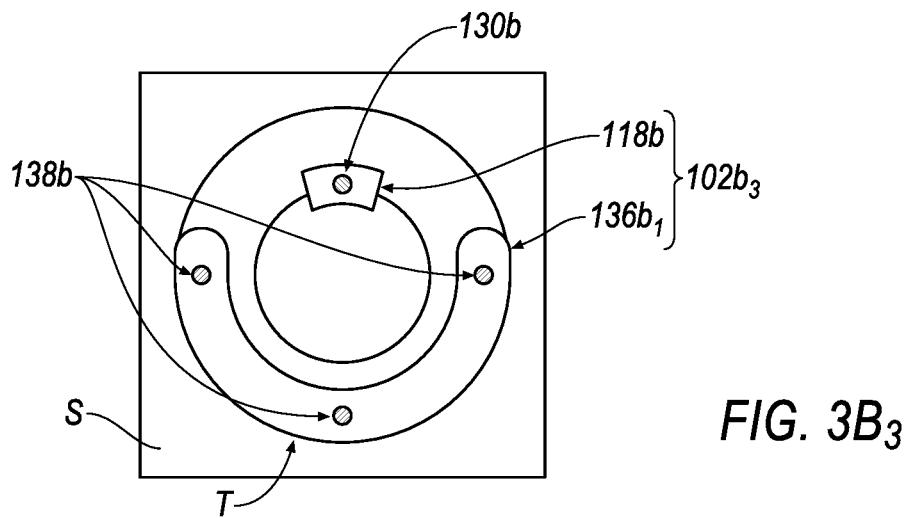
FIG. 3B₃

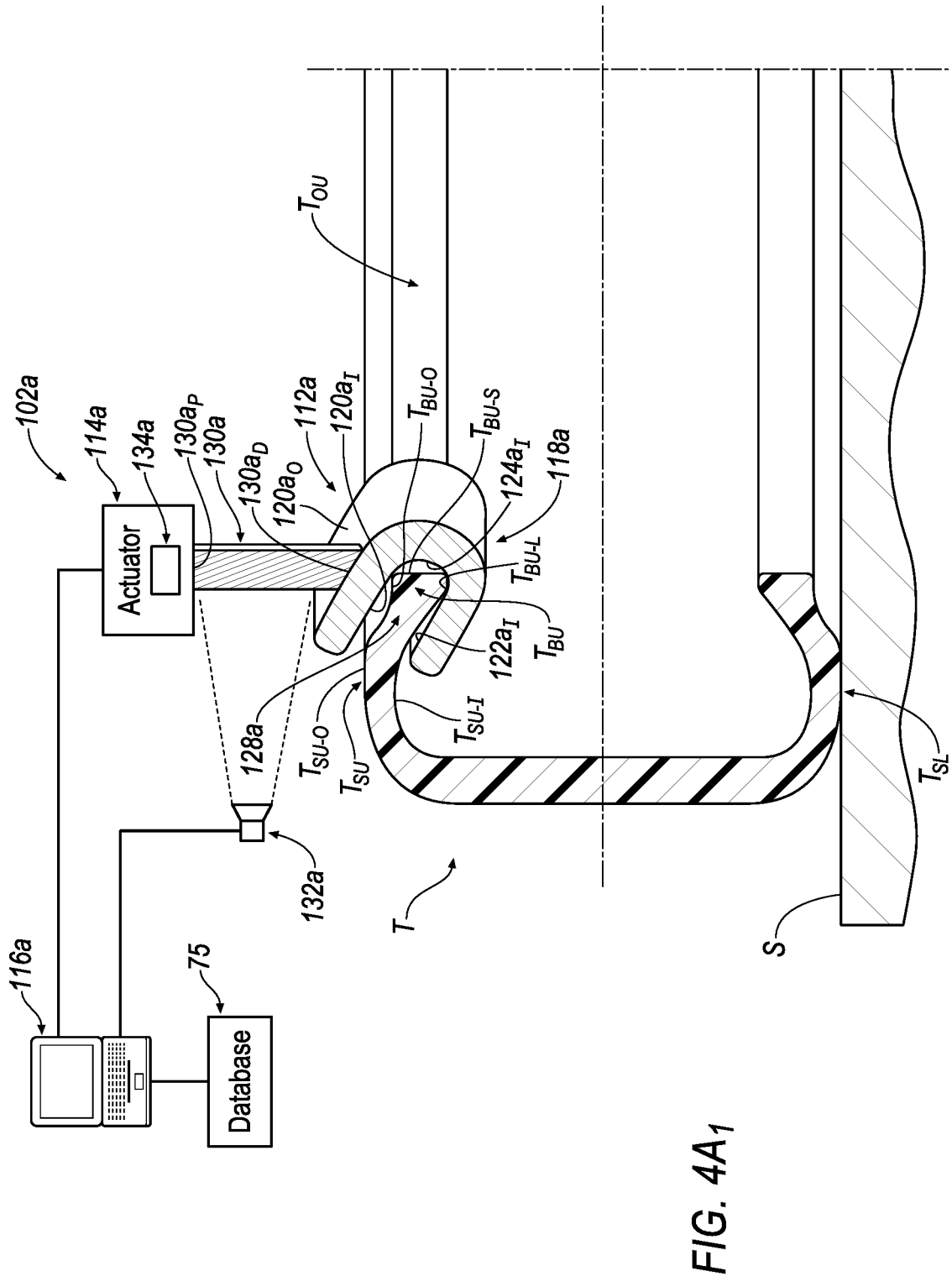
FIG. 4A₁

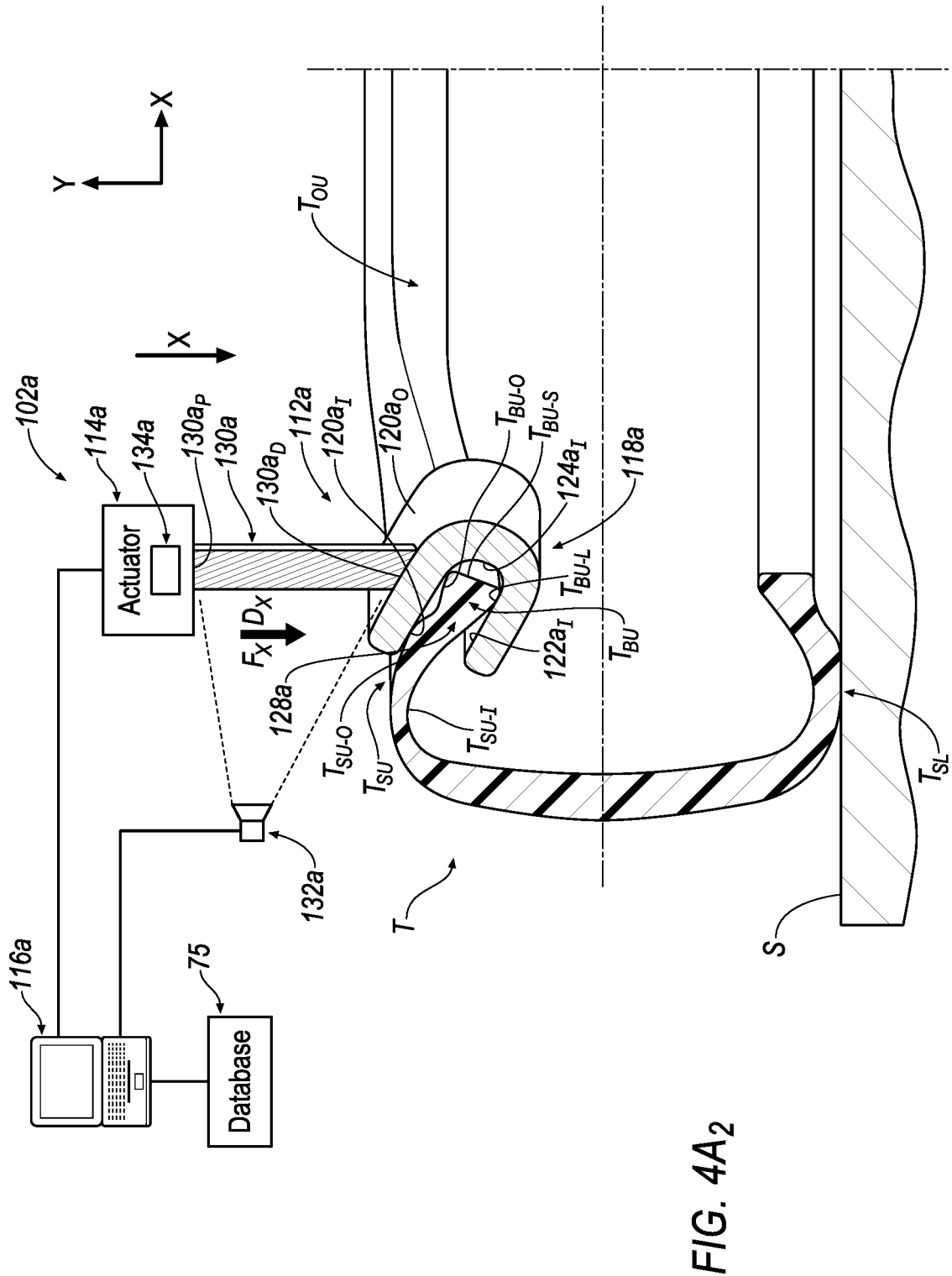
FIG. 4A₂

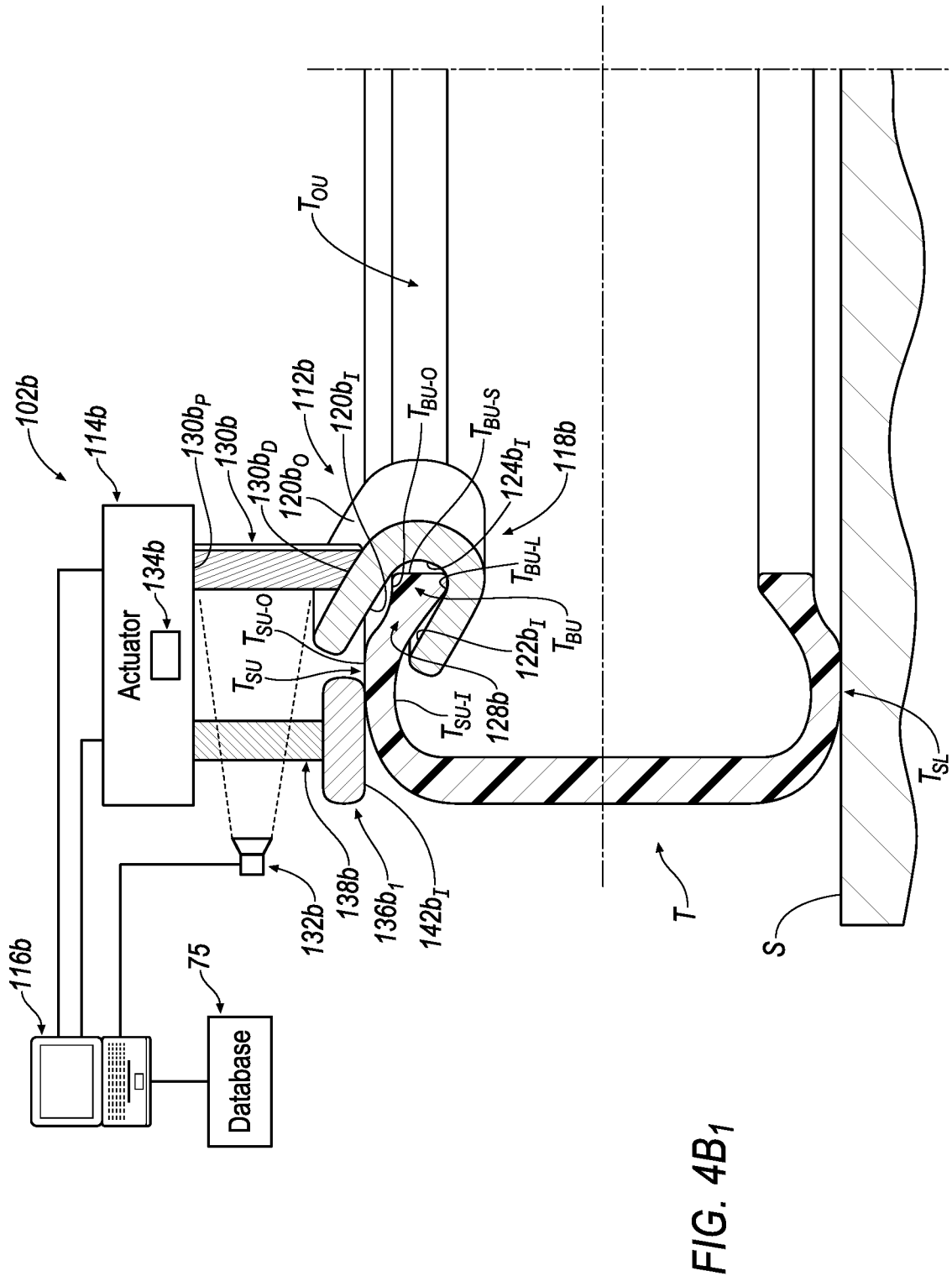
FIG. 4B₁

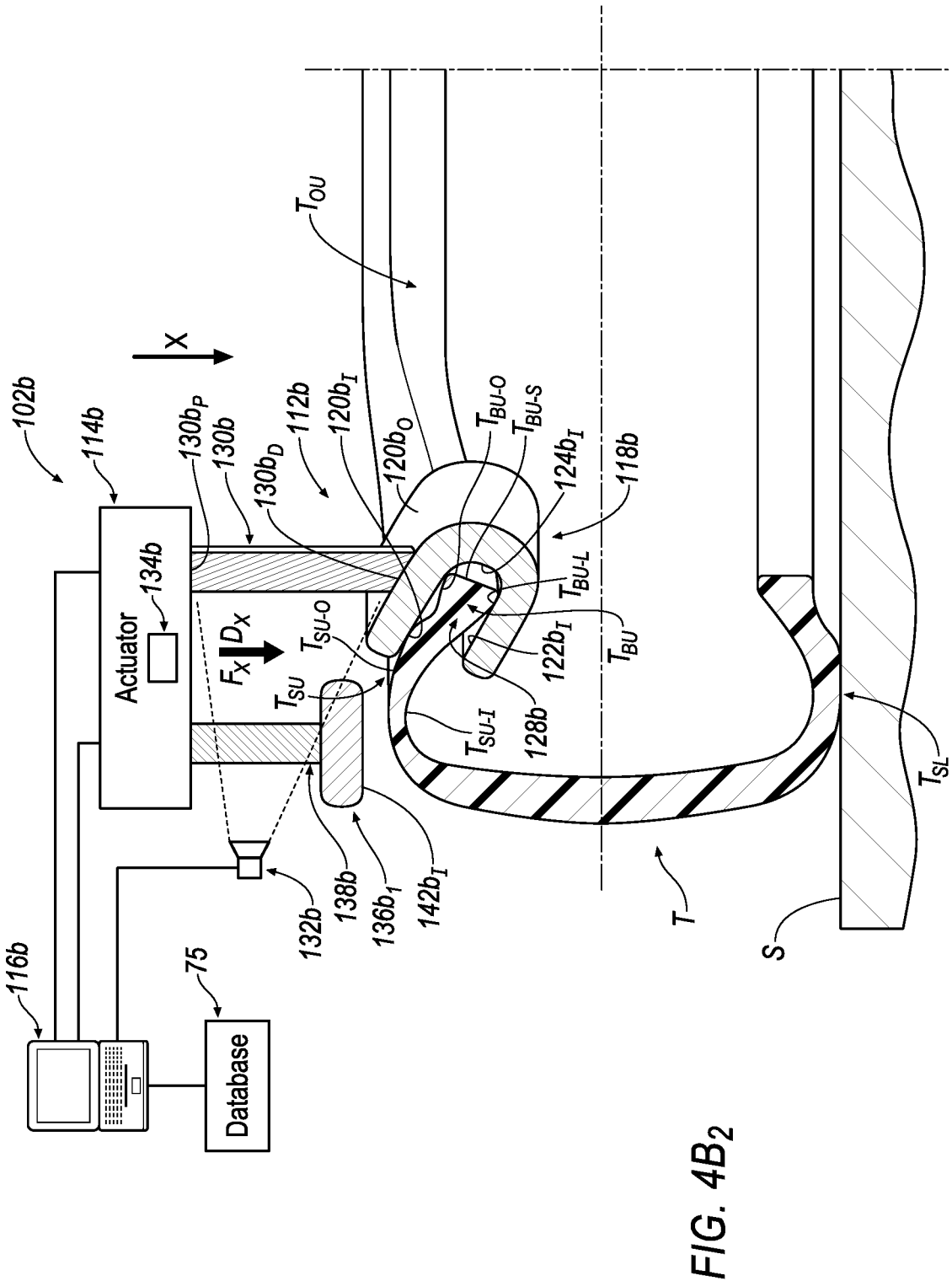
FIG. 4B₂

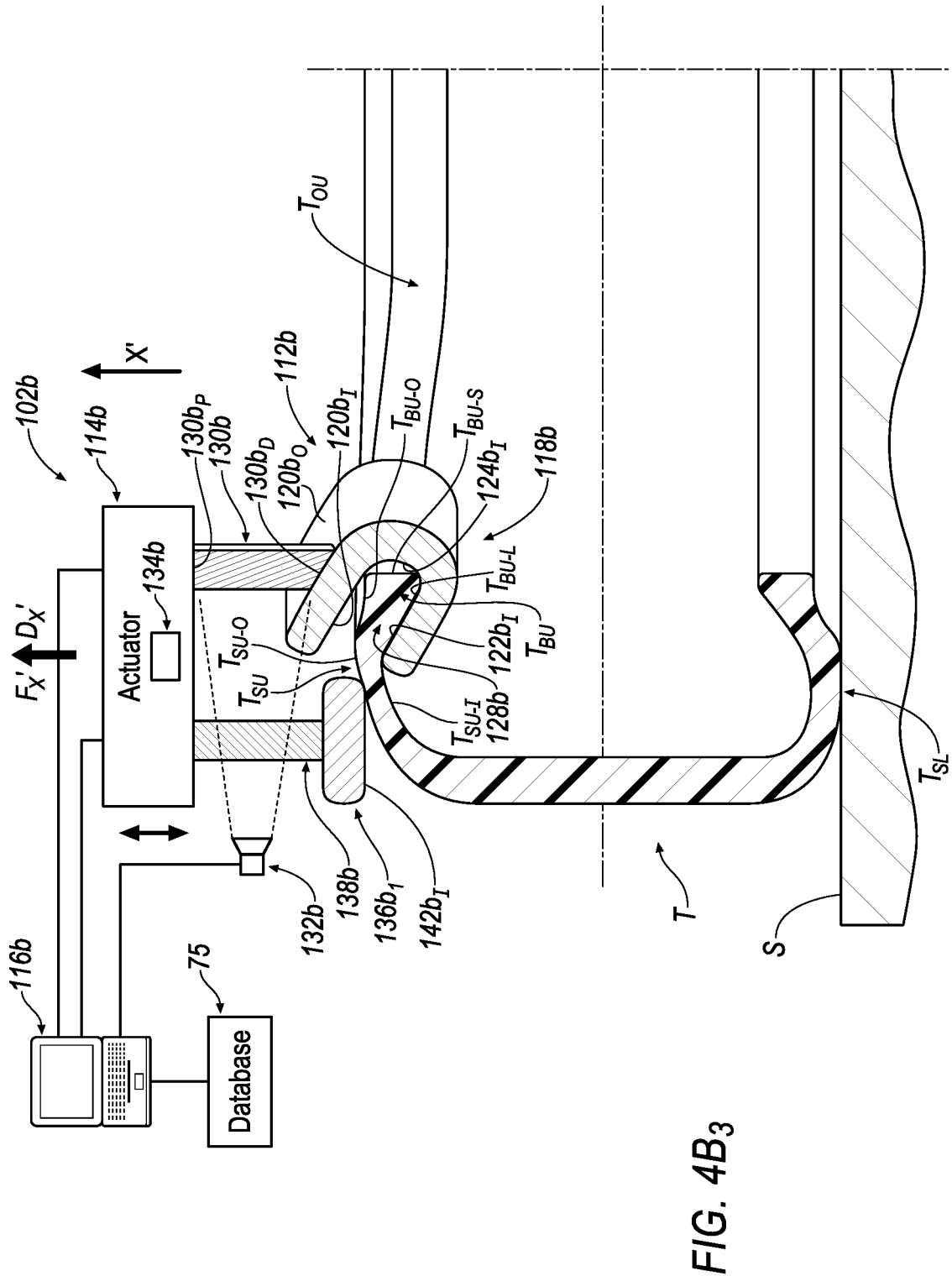
FIG. 4B₃

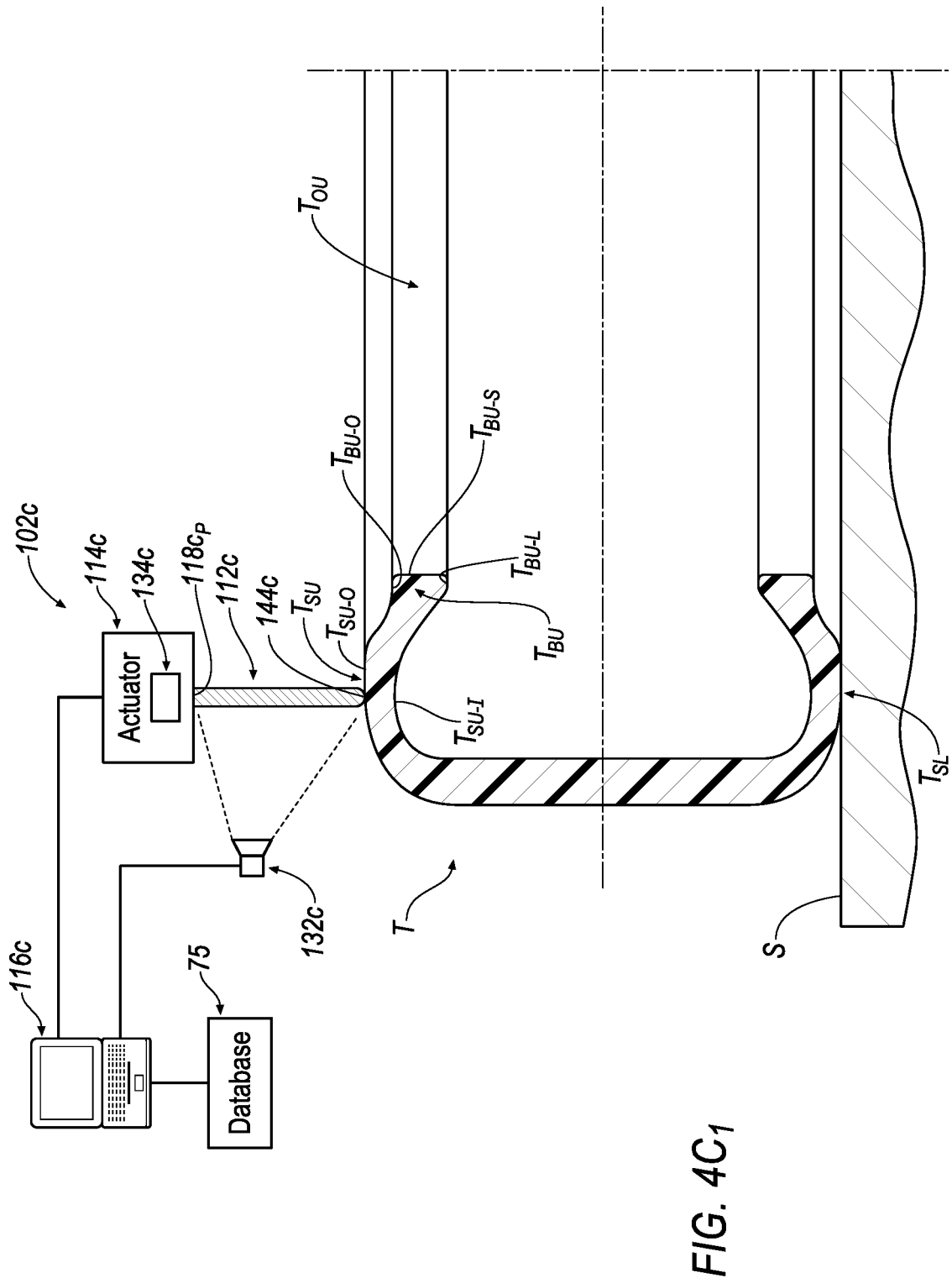
FIG. 4C₁

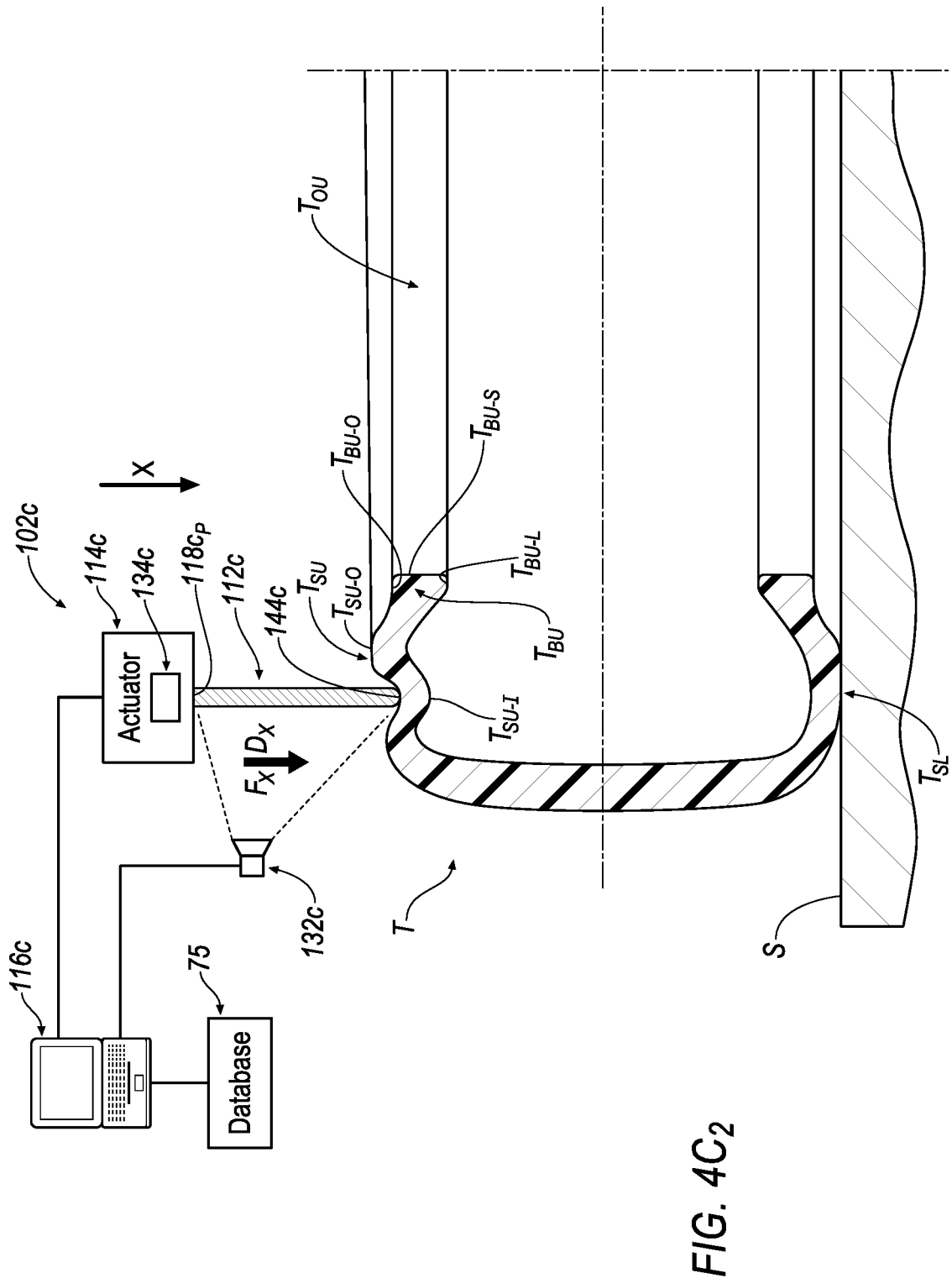
FIG. 4C₂

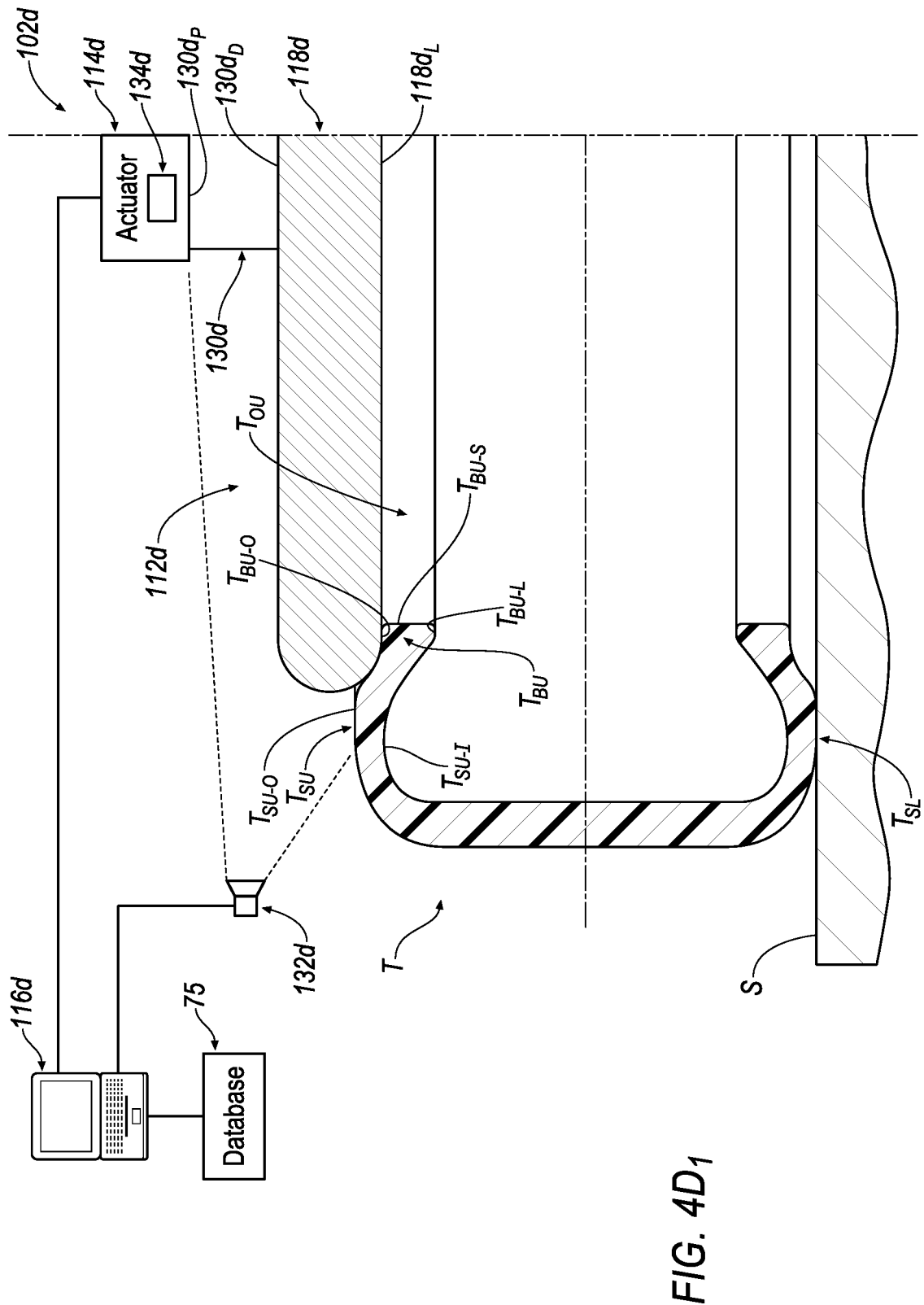
FIG. 4D₁

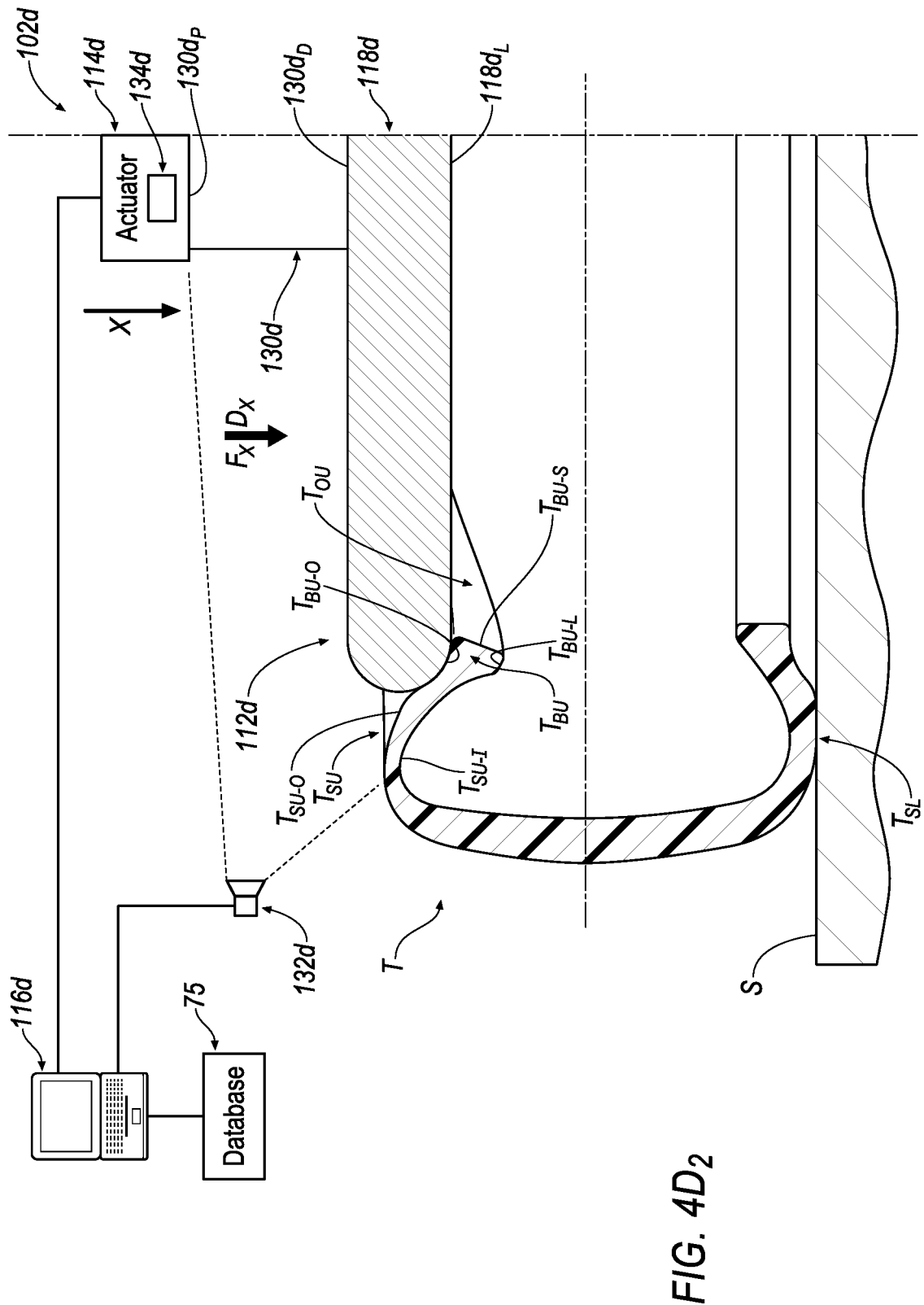
FIG. 4D₂

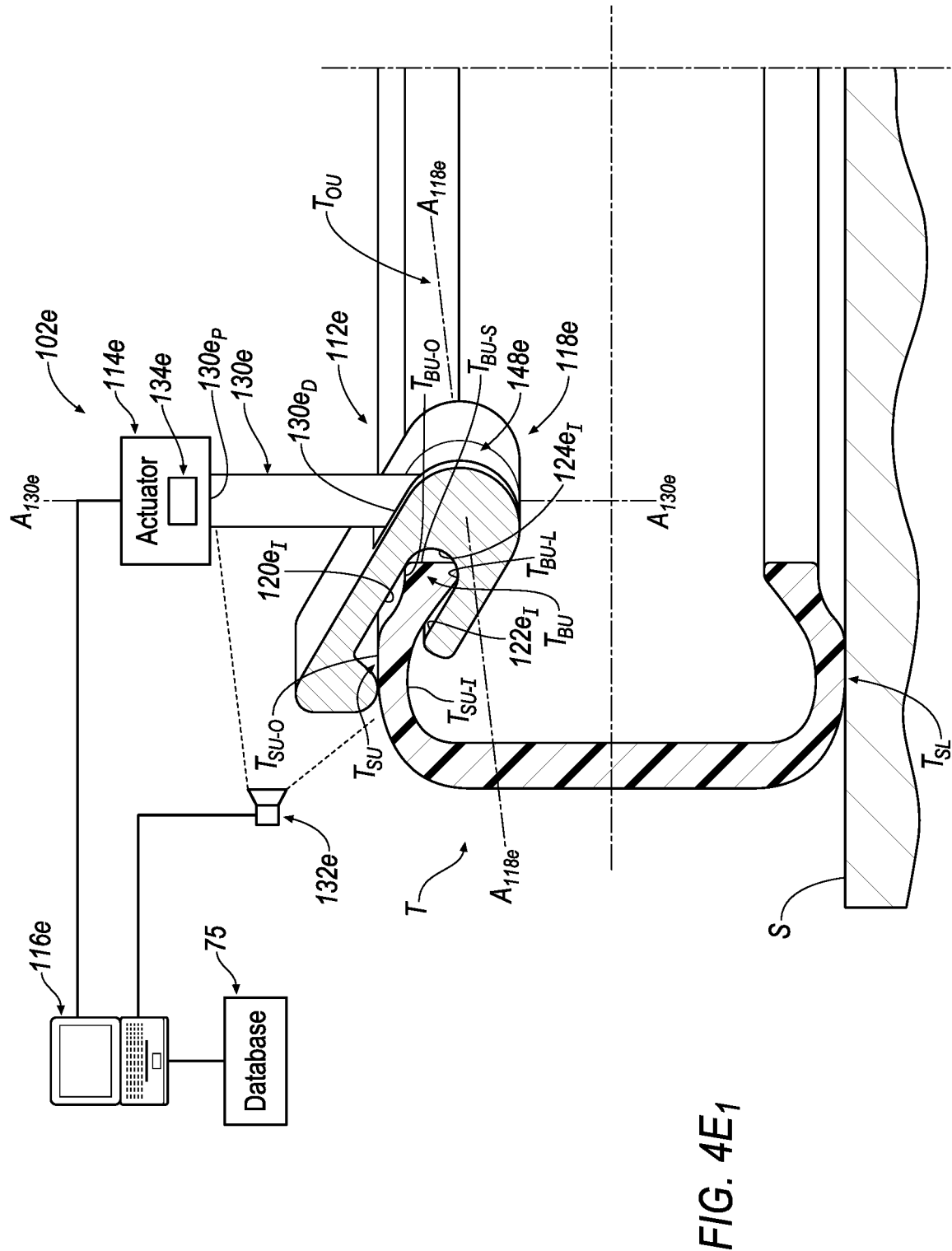
FIG. 4E₁

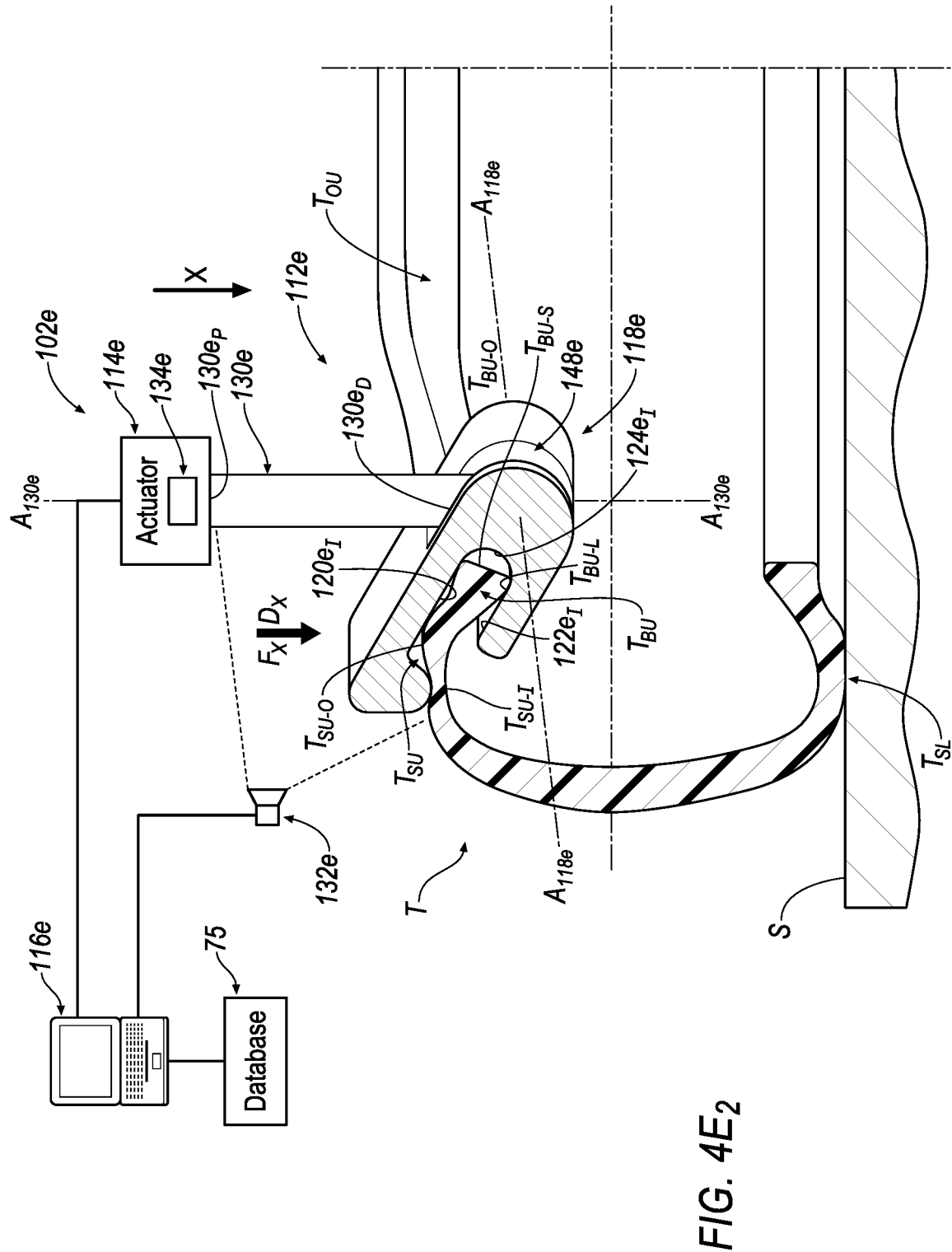
FIG. 4E₂

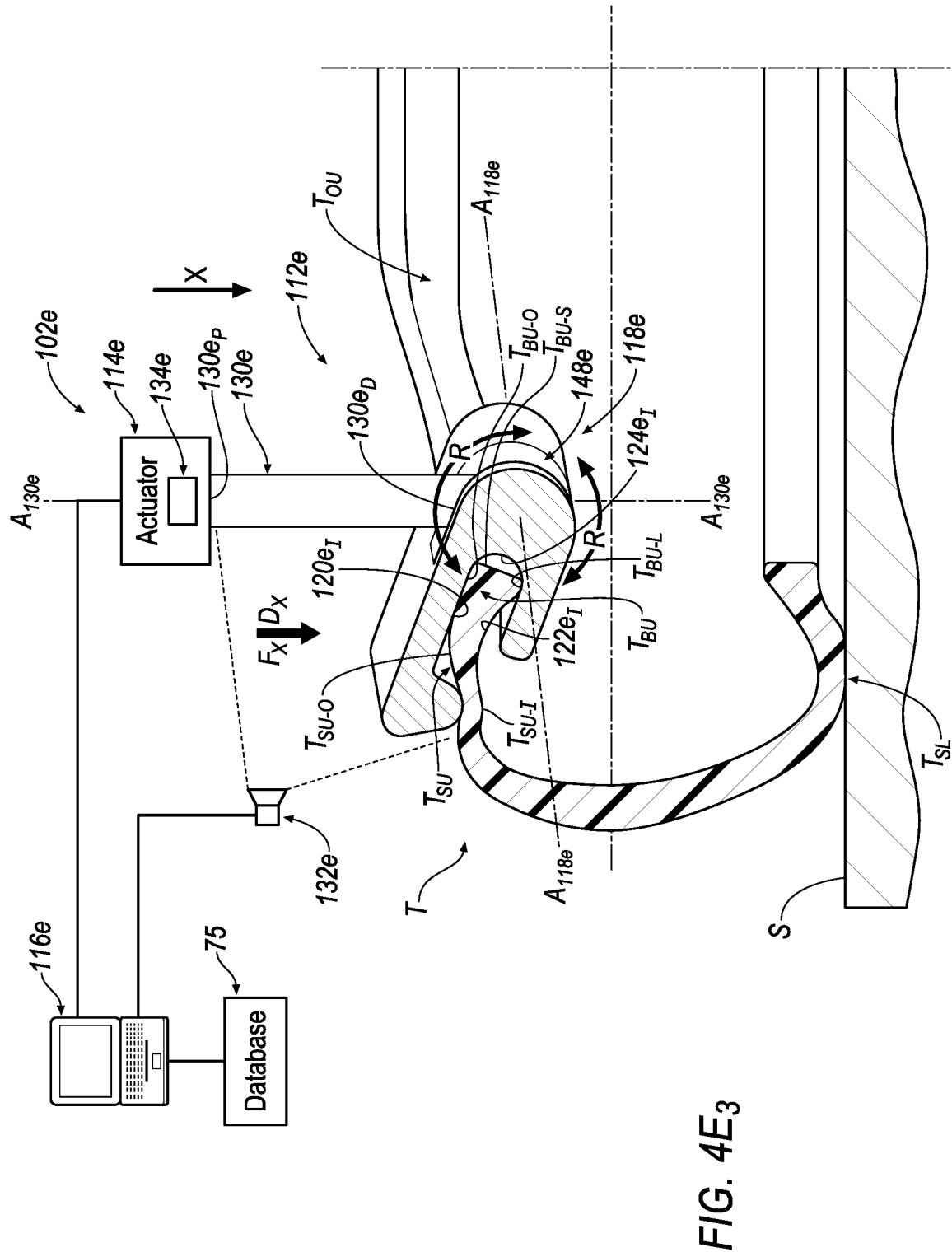
FIG. 4E₃

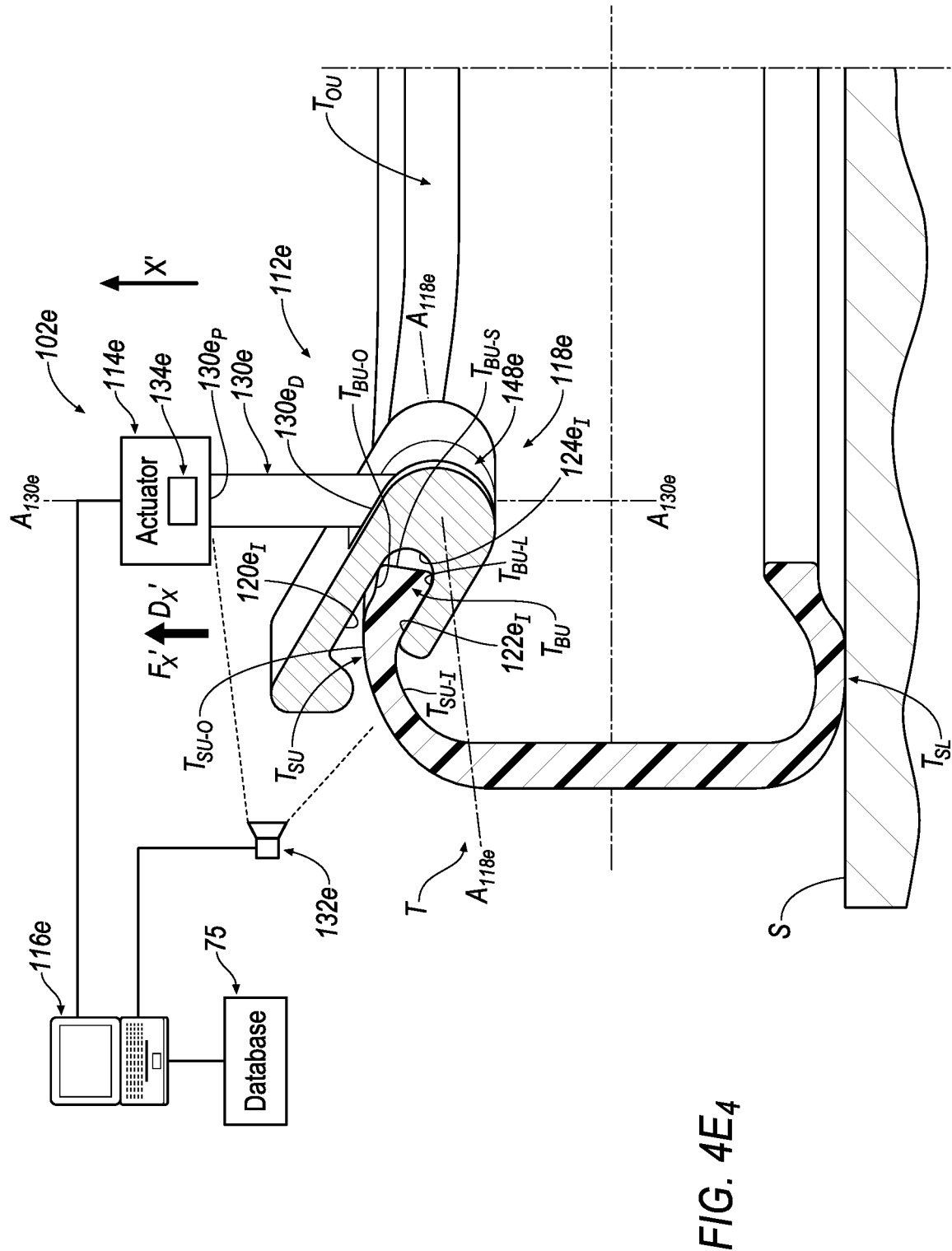
FIG. 4E₄

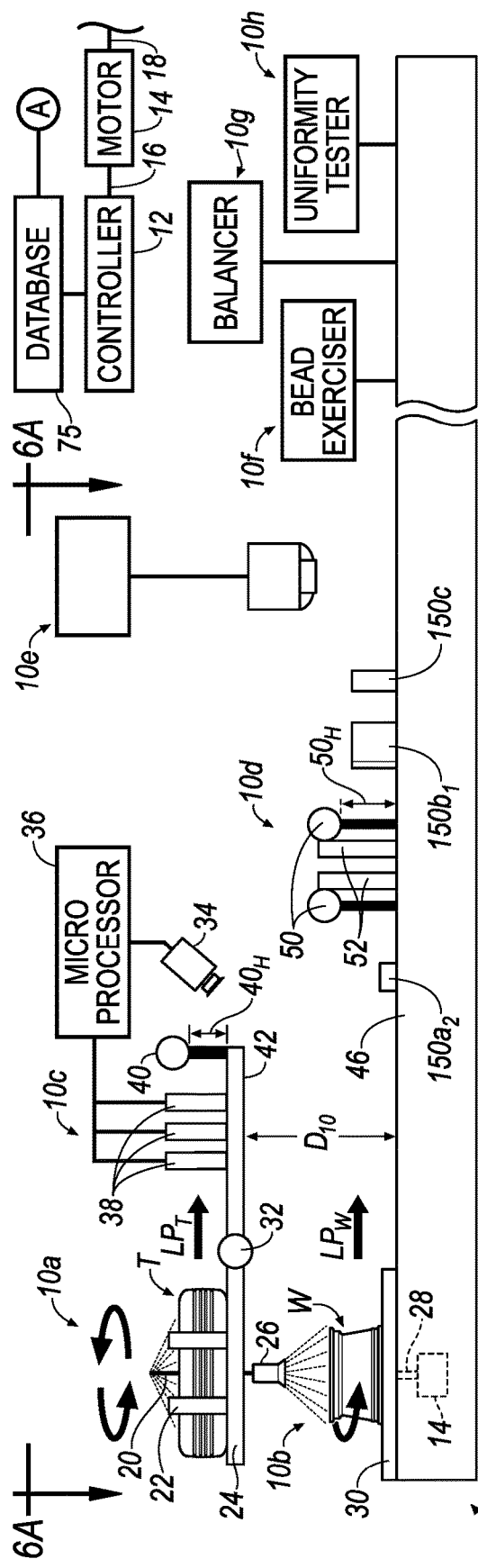

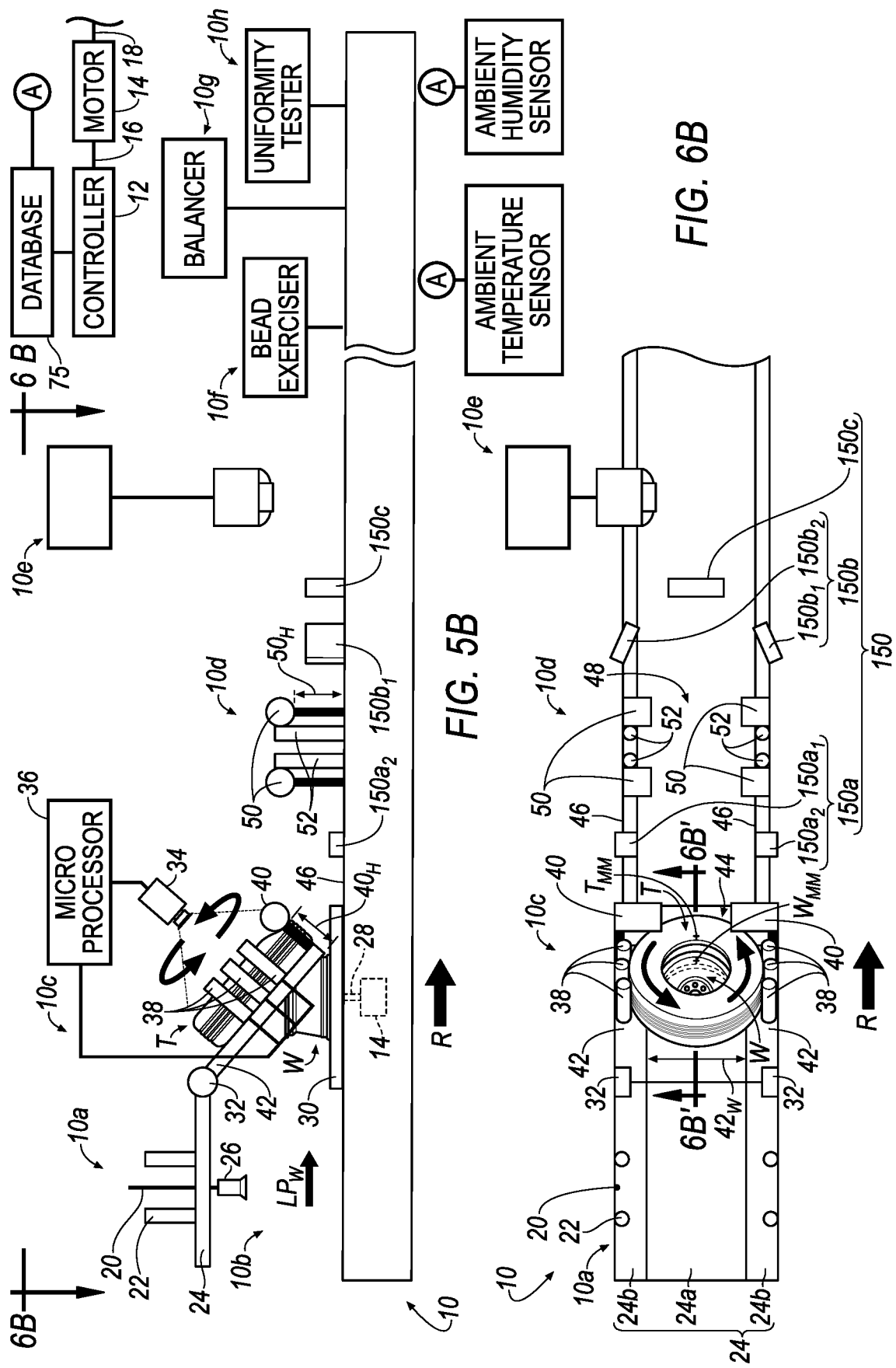

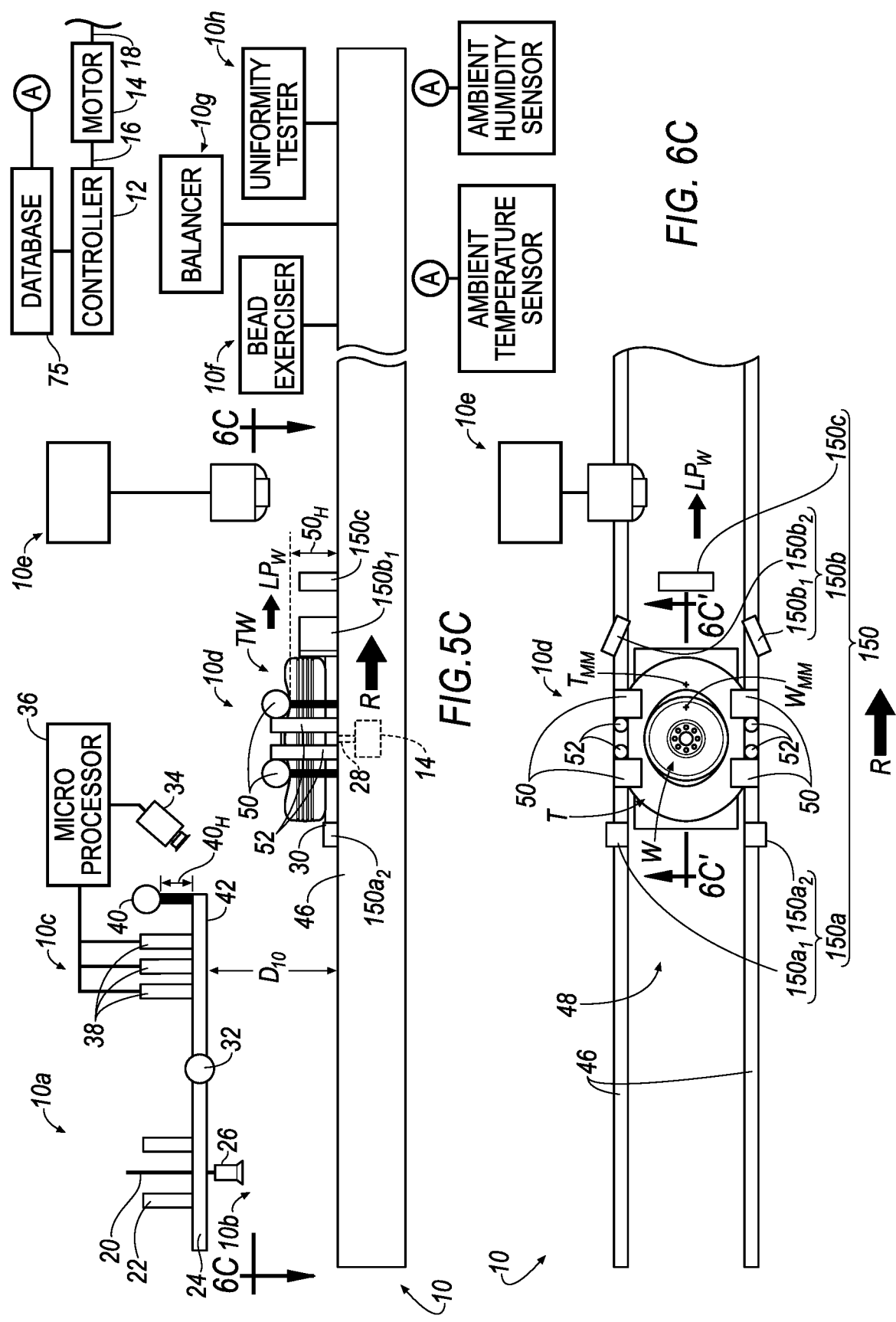

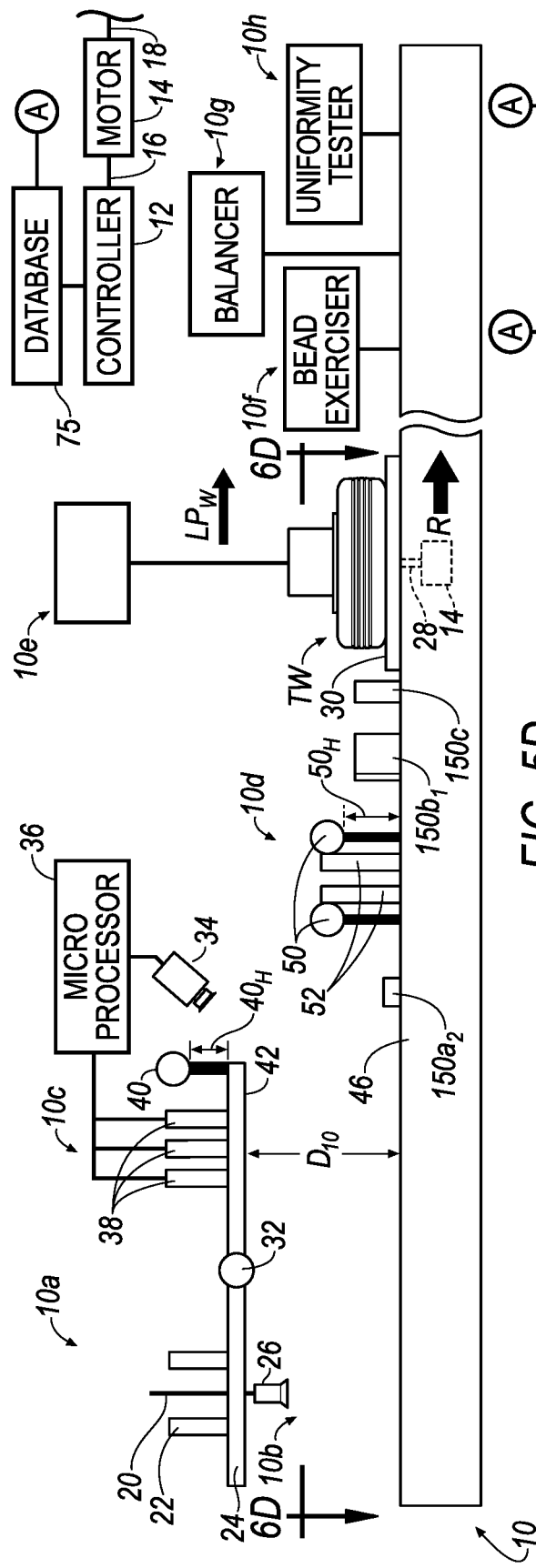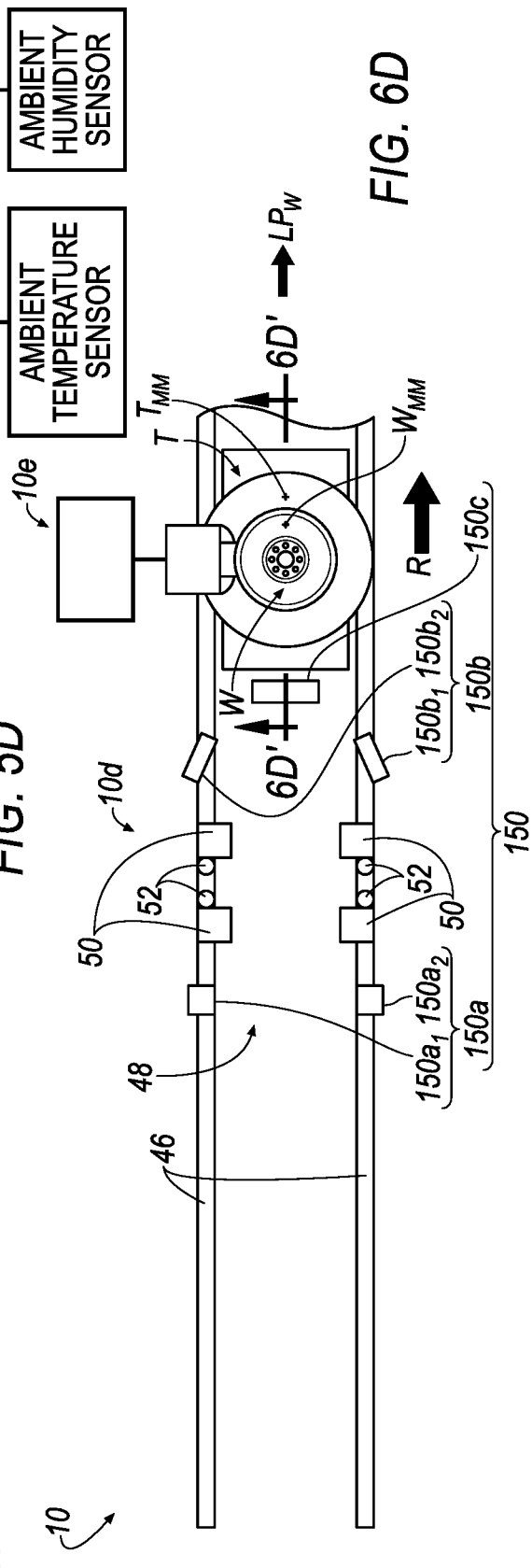

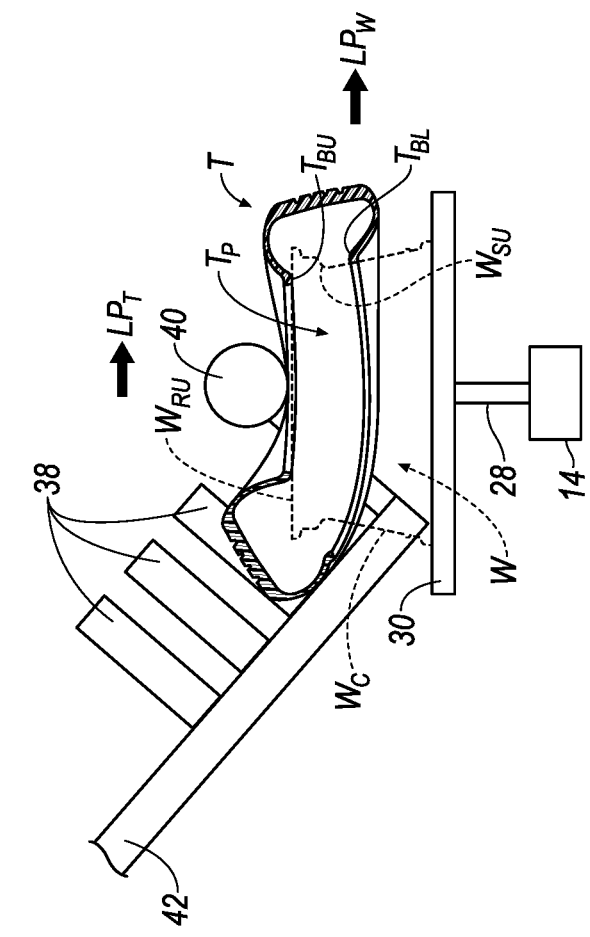
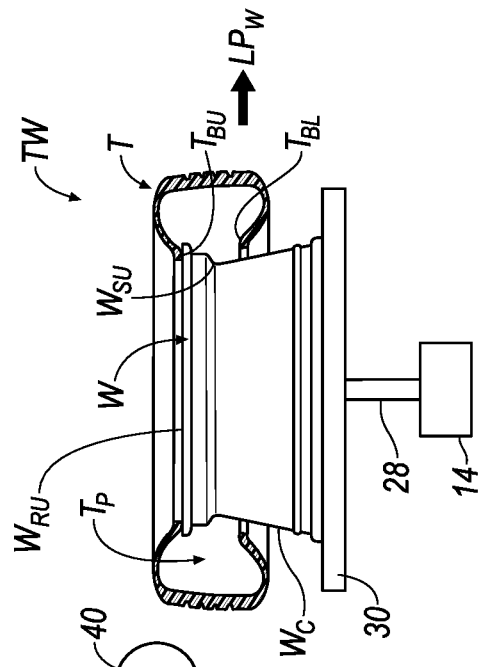
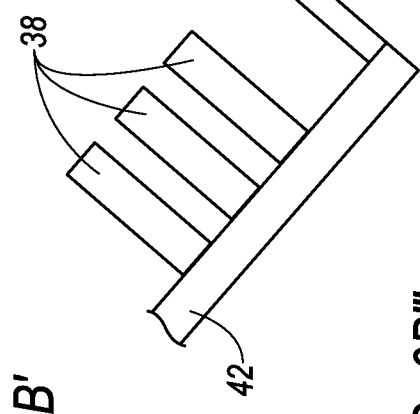
FIG. 6B'
FIG. 6B''
FIG. 6B'''

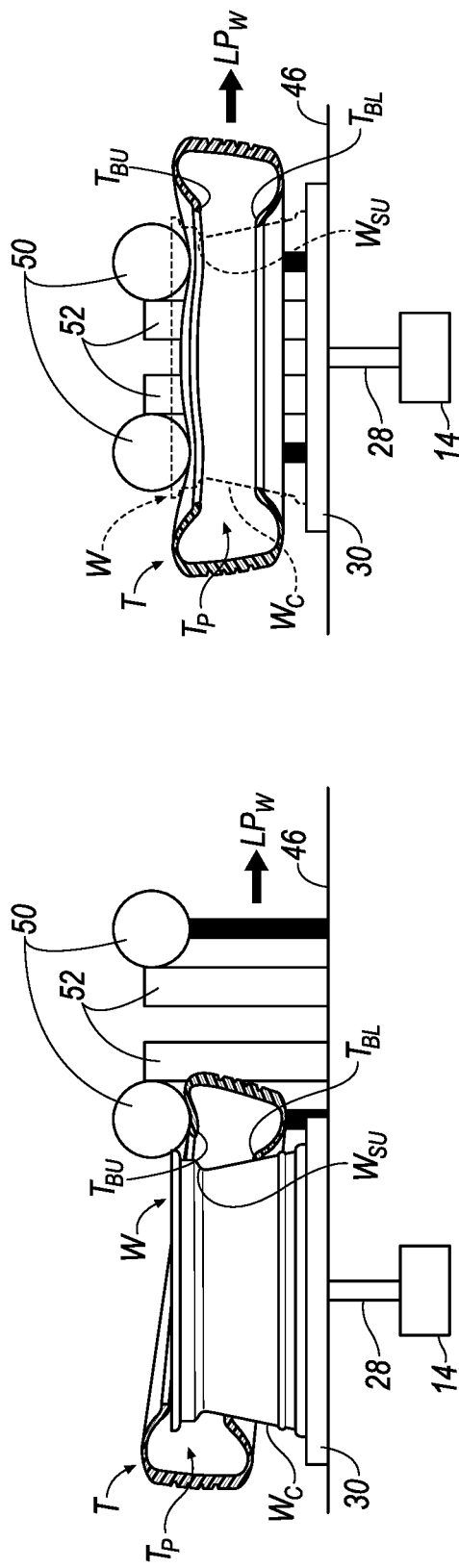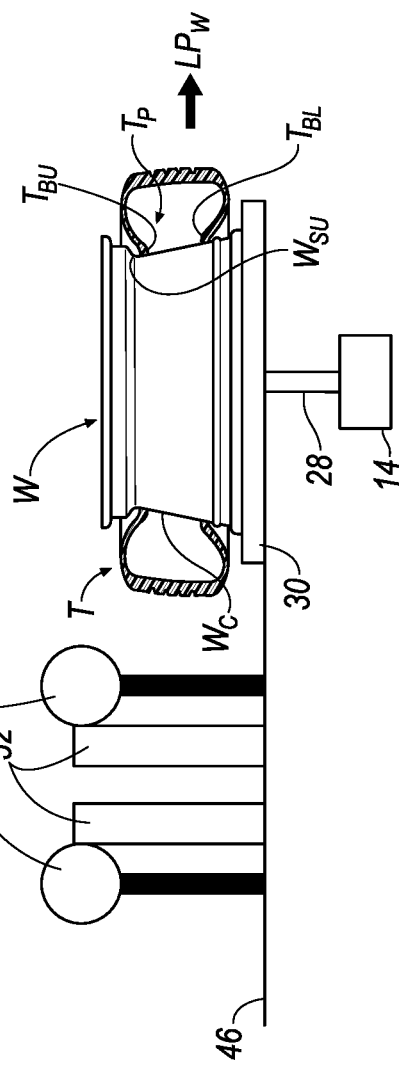
FIG. 6C'
FIG. 6C''
FIG. 6C'''

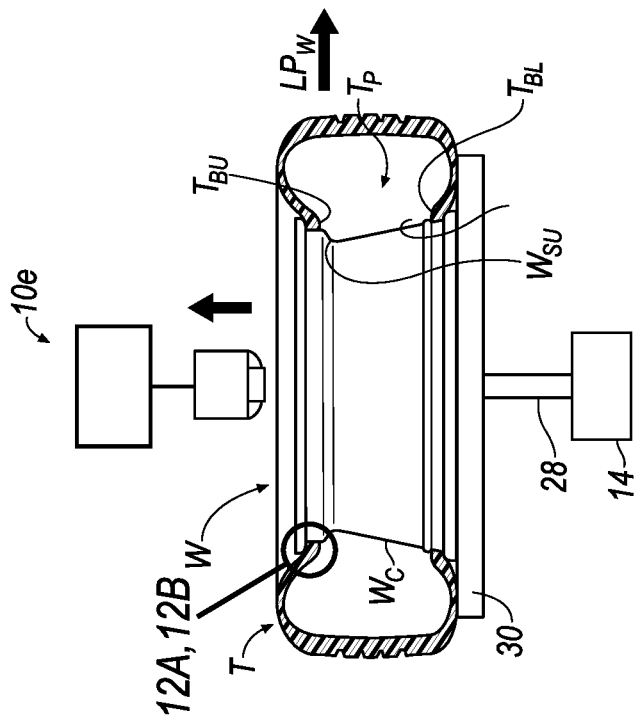
FIG. 6D"
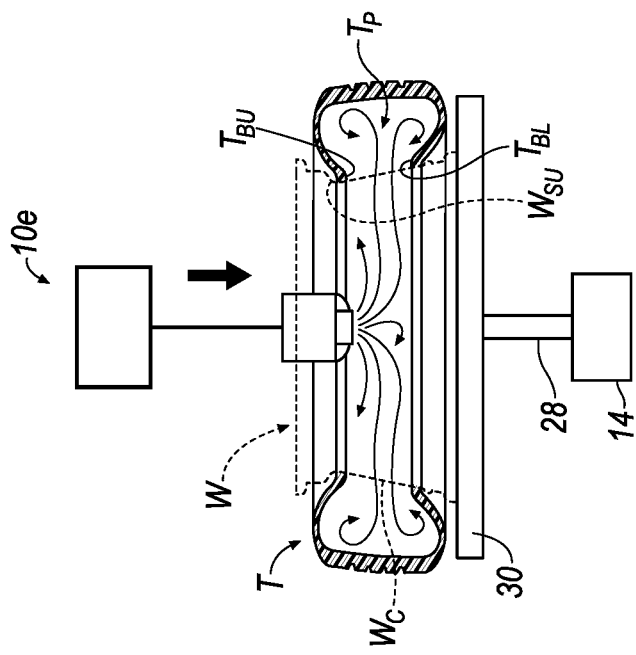
FIG. 6D'

| $T_{2-1}$ | $F_1/D_1$ | $F_2/D_2$ | $F_3/D_3$ | $F_4/D_4$ | $F_5/D_5$ | ⋮ | $F_n/D_n$ |
|---|---|---|---|---|---|---|---|
| $T_{2-2}$ | $XYZ_1$ | $XYZ_2$ | $XYZ_3$ | $XYZ_4$ | $XYZ_5$ | ⋮ | $XYZ_6$ |
| $T_{2-3}$ | $XYZ_7$ | $XYZ_8$ | $XYZ_9$ | $XYZ_{10}$ | $XYZ_{11}$ | ⋮ | $XYZ_{12}$ |
| $T_{2-4}$ | $XYZ_{13}$ | $XYZ_{14}$ | $XYZ_{15}$ | $XYZ_{16}$ | $XYZ_{17}$ | ⋮ | $XYZ_{18}$ |
| $T_{2-5}$ | $XYZ_{19}$ | $XYZ_{20}$ | $XYZ_{21}$ | $XYZ_{22}$ | $XYZ_{23}$ | ⋮ | $XYZ_{24}$ |
| ⋮ | $XYZ_{25}$ | $XYZ_{26}$ | $XYZ_{27}$ | $XYZ_{28}$ | $XYZ_{29}$ | ⋮ | $XYZ_{30}$ |
| ⋮ | ⋮ | ⋮ | ⋮ | ⋮ | ⋮ | ⋮ | ⋮ |
| $T_{2-n}$ | $XYZ_{31}$ | $XYZ_{32}$ | $XYZ_{33}$ | $XYZ_{34}$ | $XYZ_{35}$ | ⋮ | $XYZ_n$ |

FIG. 8

TIRE CHARACTERISTIC DETERMINATION SYSTEM, TIRE-WHEEL ASSEMBLY MANUFACTURING SYSTEM AND METHODS FOR OPERATING THE SAME

CROSS-REFERENCE TO RELATED APPLICATIONS

This U.S. patent application claims priority to U.S. Provisional Application 62/237,953 filed on Oct. 6, 2015 the disclosure of which is considered part of the disclosure of this application and is hereby incorporated by reference in its entirety.

FIELD OF THE INVENTION

The disclosure relates to a tire characteristic determination system, a tire-wheel assembly manufacturing system and methods for operating the same.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method that contributes to assembling a tire-wheel assembly.

BRIEF DESCRIPTION OF THE DRAWINGS

The disclosure will now be described, by way of example, with reference to the accompanying drawings, in which.

Figure 3A:
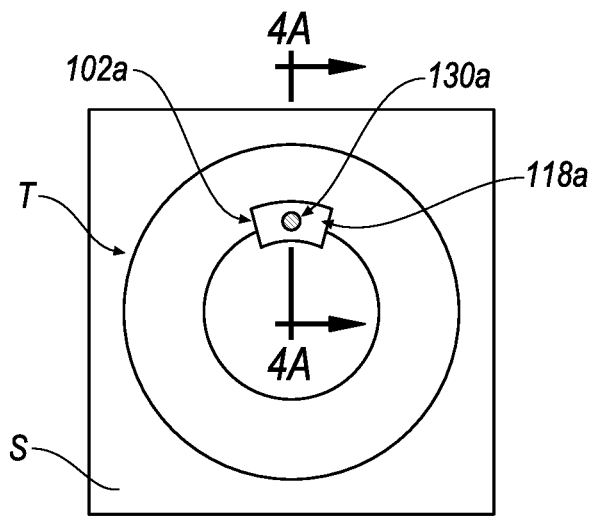
FIG. 3A is a top view of the tire characteristic determination device of FIG. 2A arranged about a tire T.

FIGS. $4A_1$-$4A_2$ are cross-sectional views according to line 4A-4A of FIG. 3A.

FIG. $2B_1$ is a perspective view of a portion of an exemplary tire characteristic determination device.

FIG. $2B_2$ is a perspective view of a portion of an exemplary tire characteristic determination device.

FIG. $2B_3$ is a perspective view of a portion of an exemplary tire characteristic determination device.

FIG. $3B_1$ is a top view of the tire characteristic determination device of FIG. $2B_1$ arranged about a tire T.

FIG. $3B_2$ is a top view of the tire characteristic determination device of FIG. $2B_2$ arranged about a tire T.

FIG. $3B_3$ is a top view of the tire characteristic determination device of FIG. $2B_3$ arranged about a tire T.

FIGS. $4B_1$-$4B_3$ are cross-sectional views according to line 4B-4B of FIG. $3B_1$.

Figure 2A:
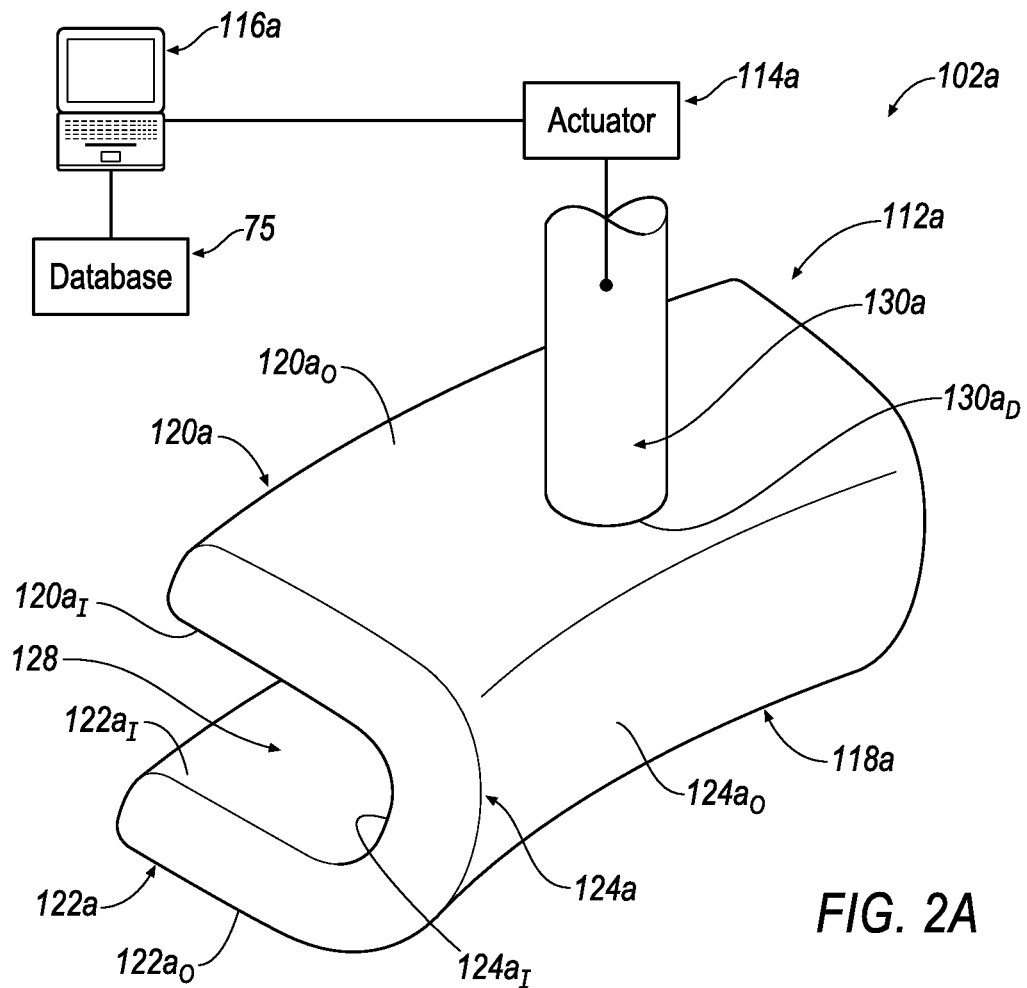
FIG. 2A is a perspective view of a portion of an exemplary tire characteristic determination device.
Figure 2C:
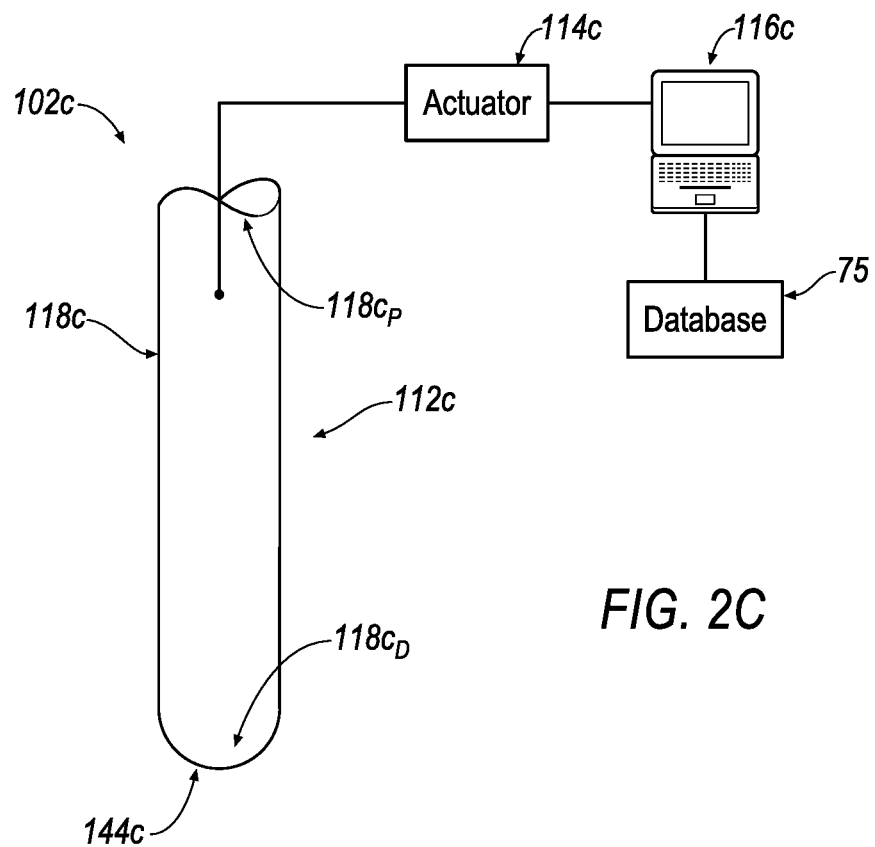

FIG. 2C is a perspective view of a portion of an exemplary tire characteristic determination device.

Figure 3C:
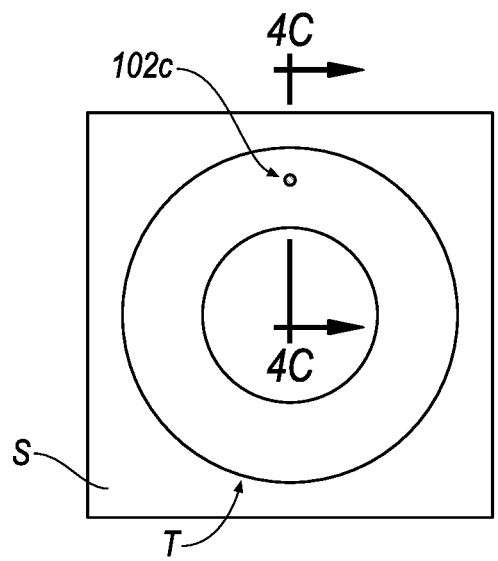

FIG. 3C is a top view of the tire characteristic determination device of FIG. 2C arranged about a tire T.

FIGS. $4C_1$-$4C_2$ are cross-sectional views according to line 4C-4C of FIG. 3C.

Figure 2D:
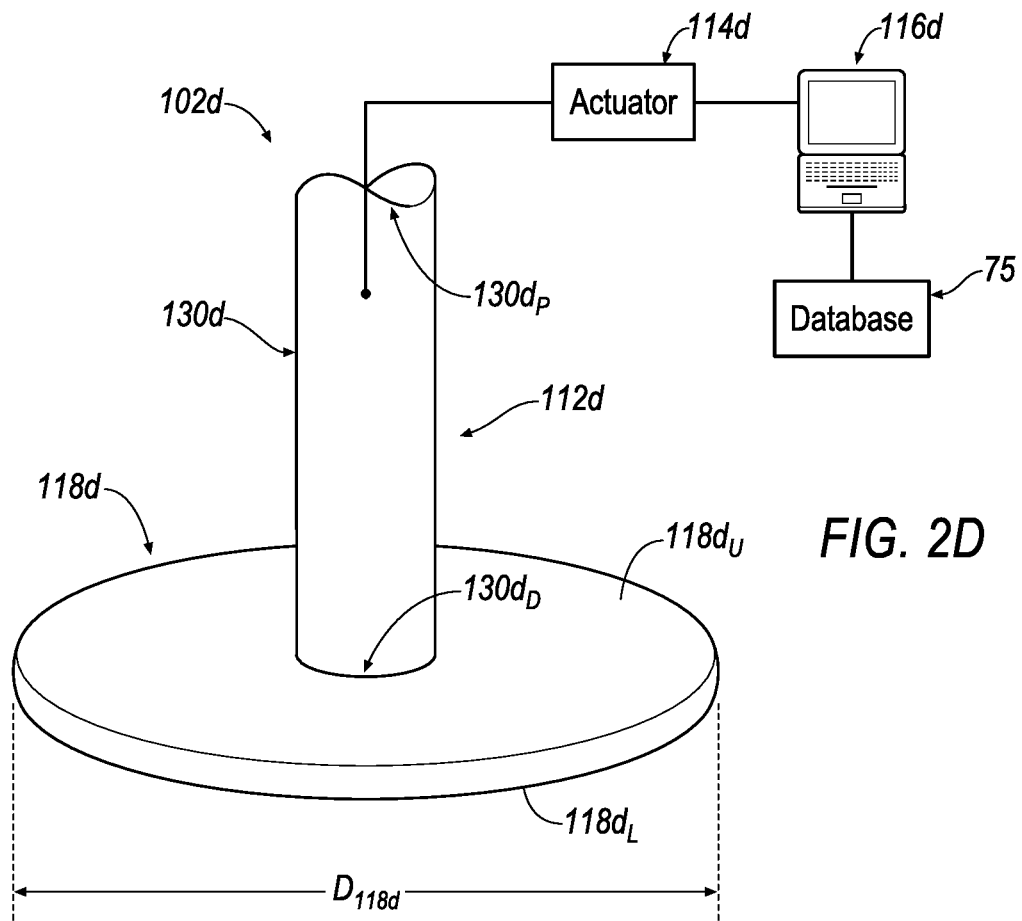

FIG. 2D is a perspective view of a portion of an exemplary tire characteristic determination device.

Figure 3D:
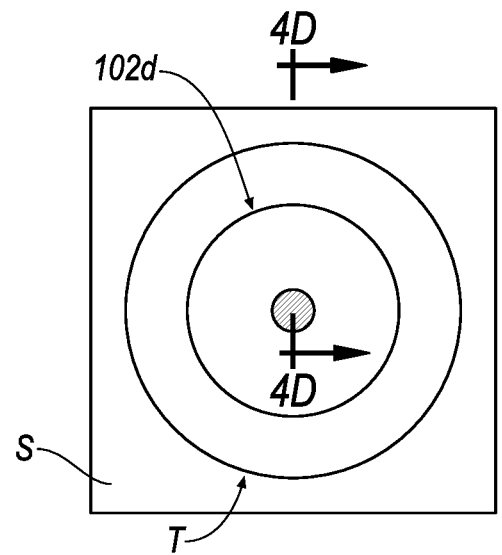

FIG. 3D is a top view of the tire characteristic determination device of FIG. 2D arranged about a tire T.

FIGS. $4D_1$-$4D_2$ are cross-sectional views according to line 4D-4D of FIG. 3D.

Figure 2E:
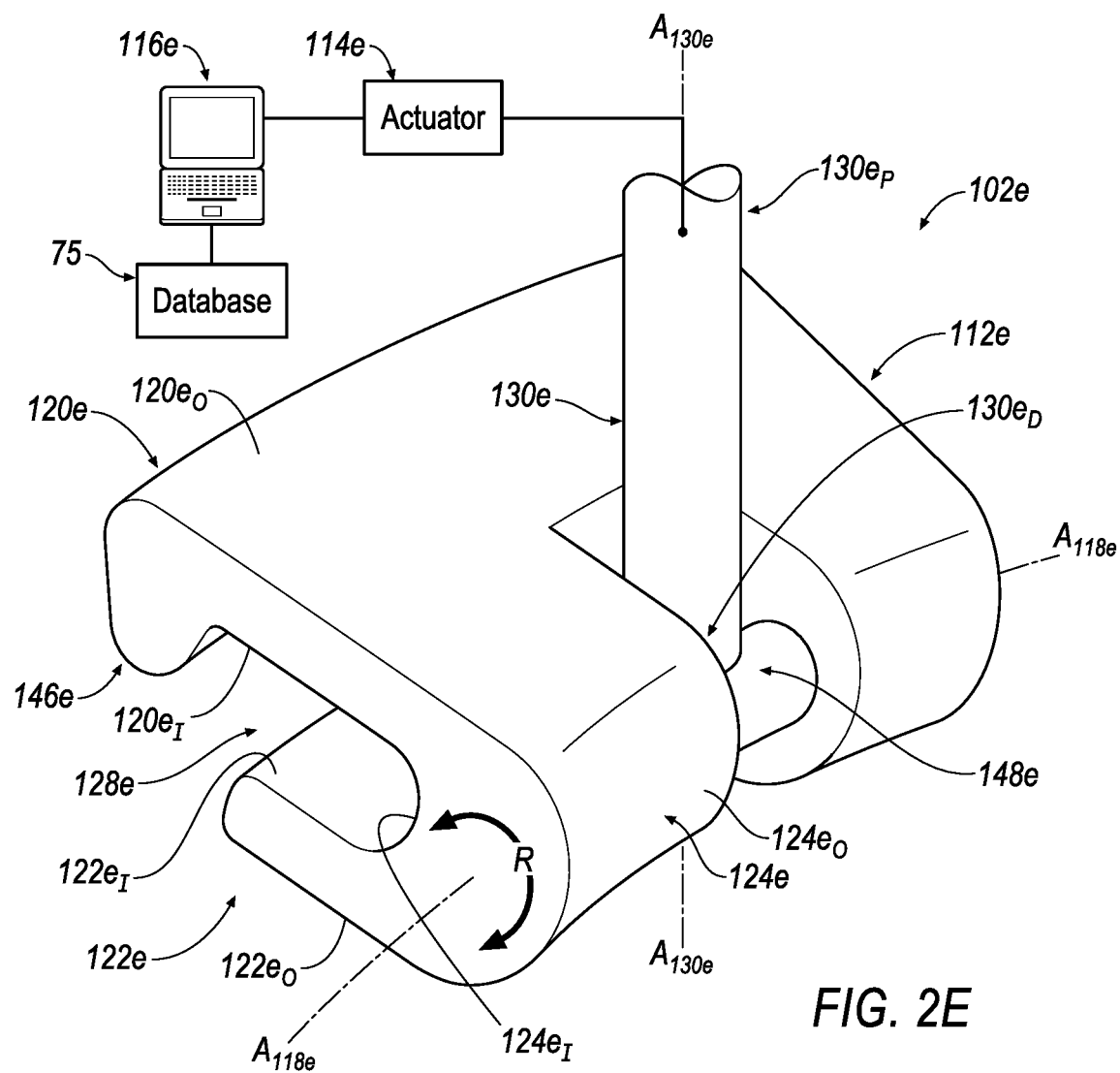

FIG. 2E is a perspective view of a portion of an exemplary tire characteristic determination device.

Figure 3E:
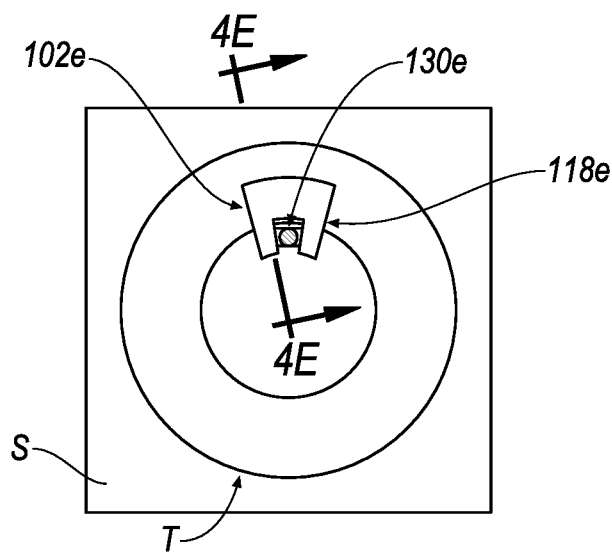

FIG. 3E is a top view of the tire characteristic determination device of FIG. 2E arranged about a tire T.

FIGS. $4E_1$-$4E_4$ are cross-sectional views according to line 4E-4E of FIG. 3E.

FIG. 5A is side view of an exemplary apparatus for processing a tire and a wheel.

FIG. 6A is a top view of the apparatus according to line 6A-6A of FIG. 5A.

FIG. 5B is another side view of the apparatus of FIG. 5A for processing a tire and a wheel.

FIG. 6B is a top view of the apparatus according to line 6B-6B of FIG. 5B.

FIGS. 6B'-6B''' are cross-sectional views of the tire and the wheel as well as a side view of a portion of the apparatus according to line 6B'-6B' of FIG. 6B.

FIG. 5C is another side view of the apparatus of FIG. 5B for processing a tire and a wheel.

FIG. 6C is a top view of the apparatus according to line 6C-6C of FIG. 5C.

FIGS. 6C'-6C''' are cross-sectional views of the tire and the wheel as well as a side view of a portion of the apparatus according to line 6C'-6C' of FIG. 6C.

FIG. 5D is another side view of the apparatus of FIG. 5C for processing a tire and a wheel.

FIG. 6D is a top view of the apparatus according to line 6D-6D of FIG. 5D.

FIGS. 6D'-6D'' are cross-sectional views of the tire and the wheel as well as a side view of a portion of the apparatus according to line 6D'-6D' of FIG. 6D.

Figure 7A:
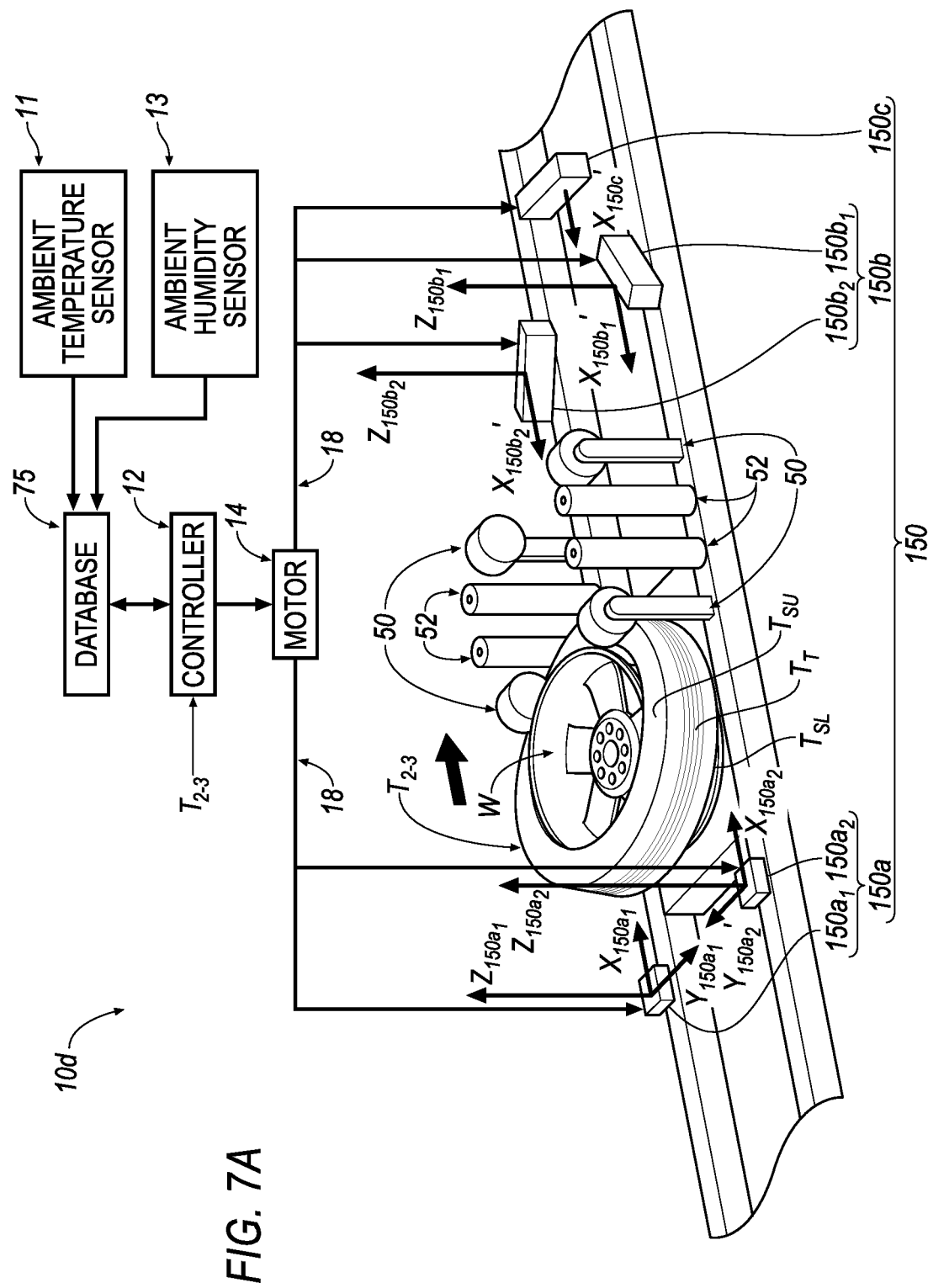
Figure 7B:
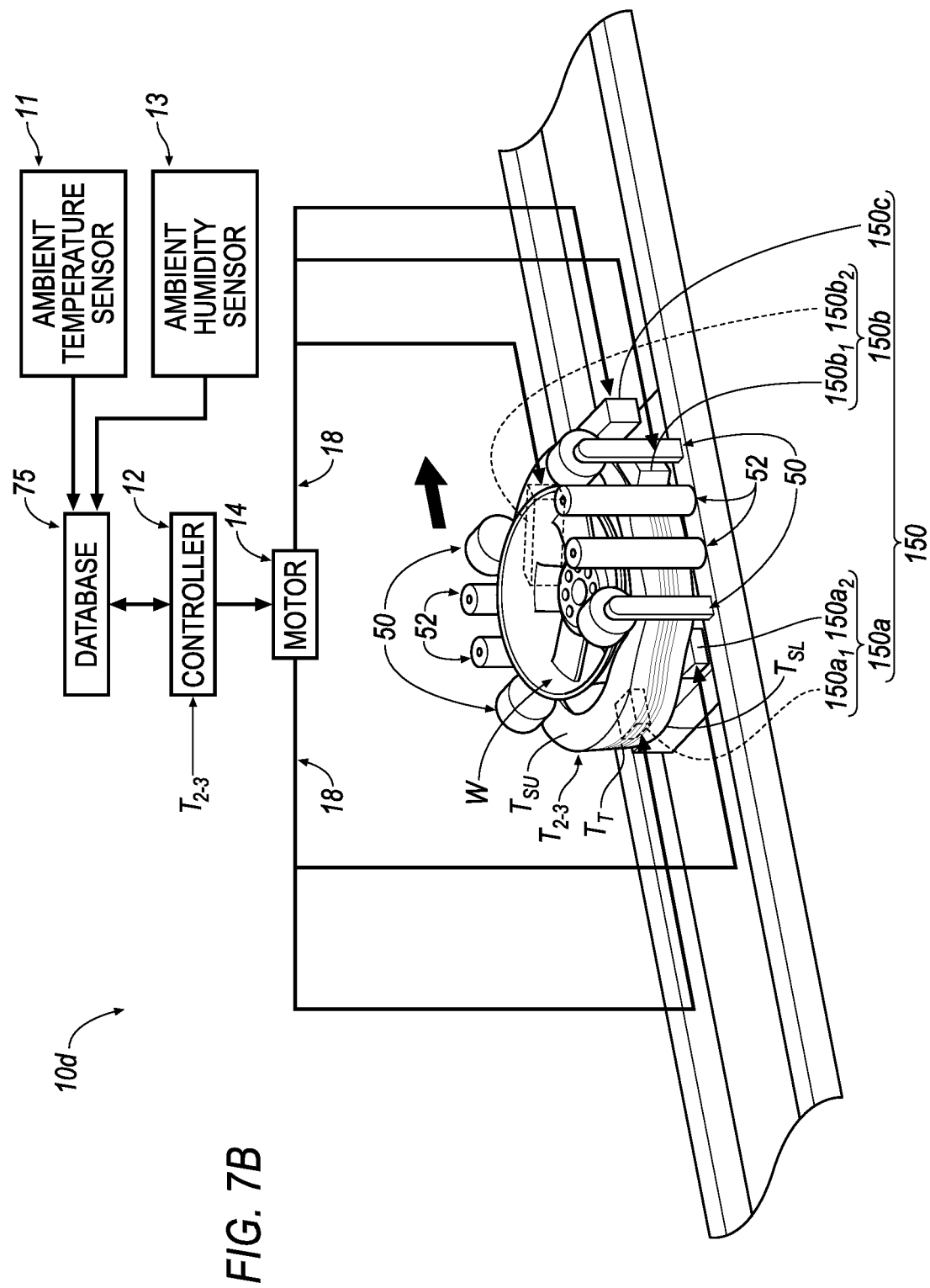
Figure 7C:
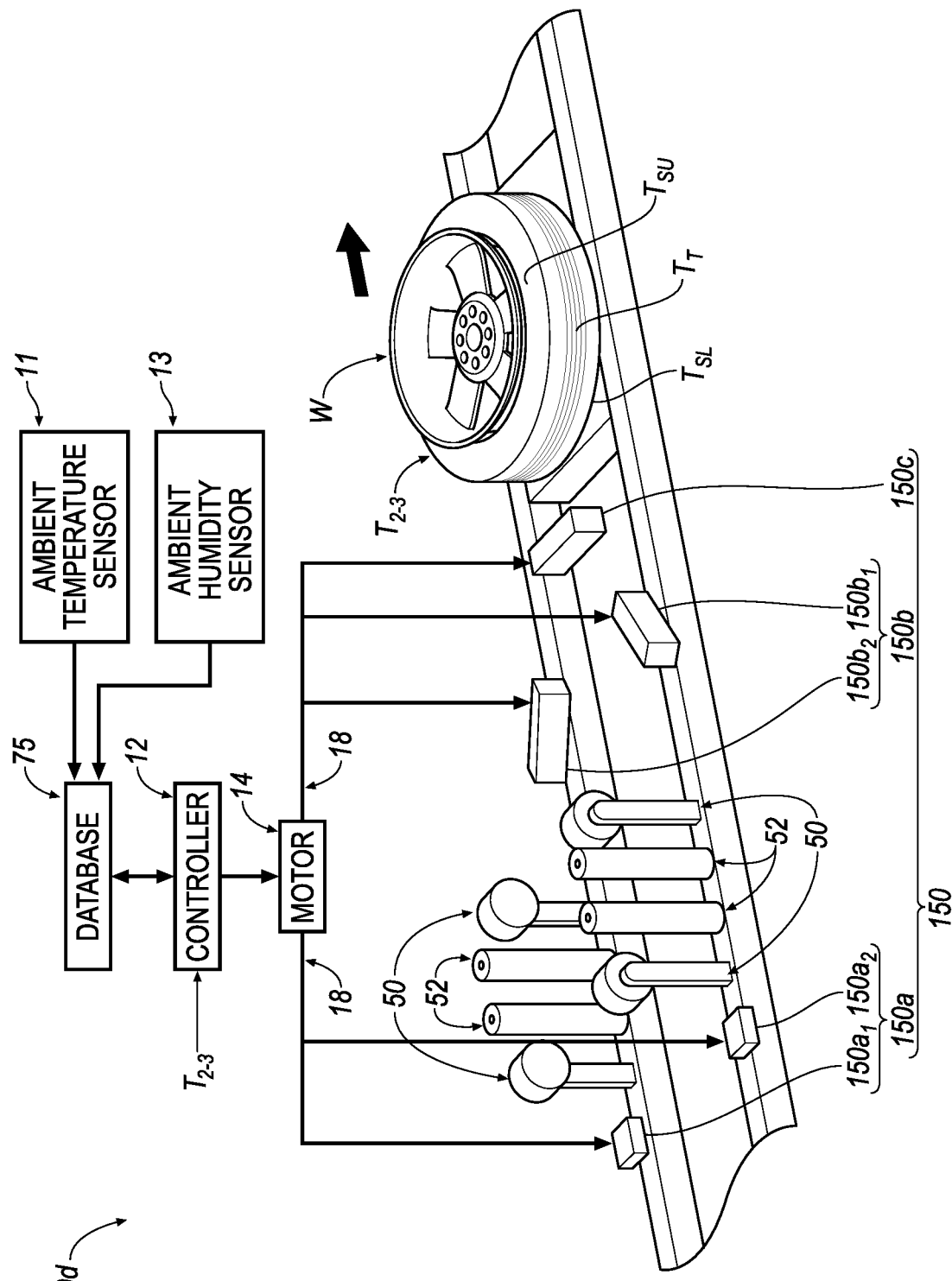

FIGS. 7A-7C are perspective views of a portion of the apparatus of FIGS. 5A-5D and 6A-6D.

FIG. 8 is an exemplary data look-up table of an exemplary database of an exemplary tire-wheel assembly processing system.

Figure 9A:
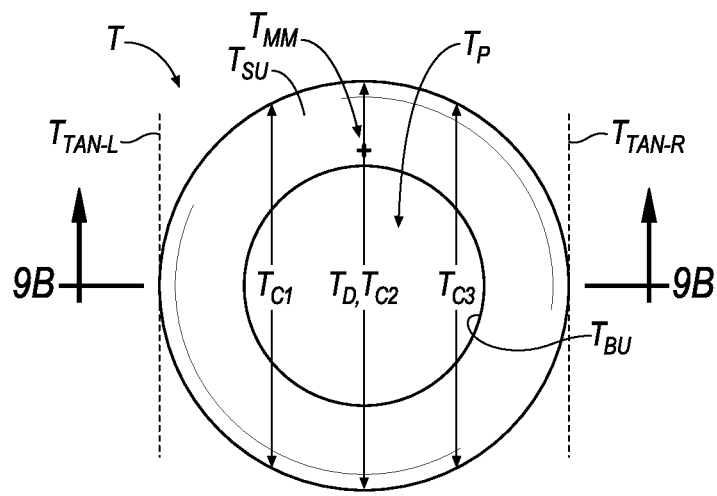

FIG. 9A is a top view of an exemplary tire.

Figure 9B:
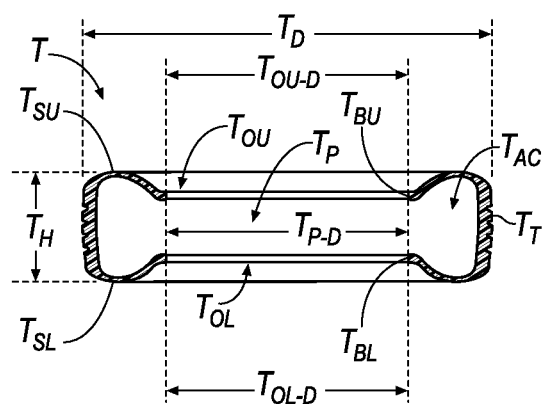

FIG. 9B is a cross-sectional view of the tire according to line 9B-9B of FIG. 9A.

Figure 9C:
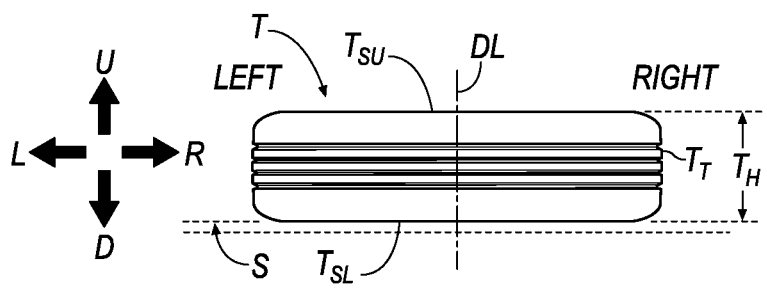

FIG. 9C is a side view of the tire of FIG. 9A.

Figure 9D:
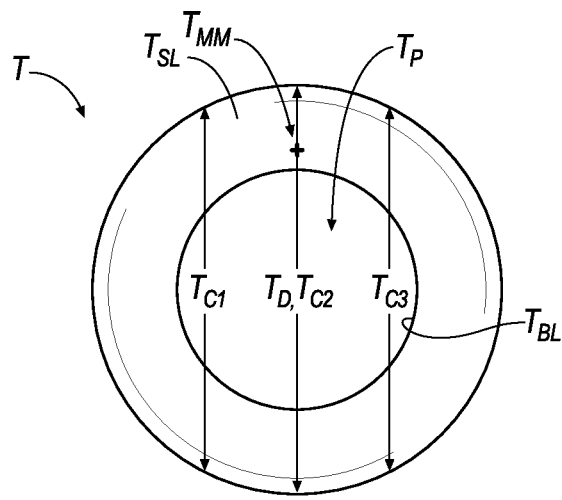

FIG. 9D is a bottom view of the tire of FIG. 9A.

Figure 10A:
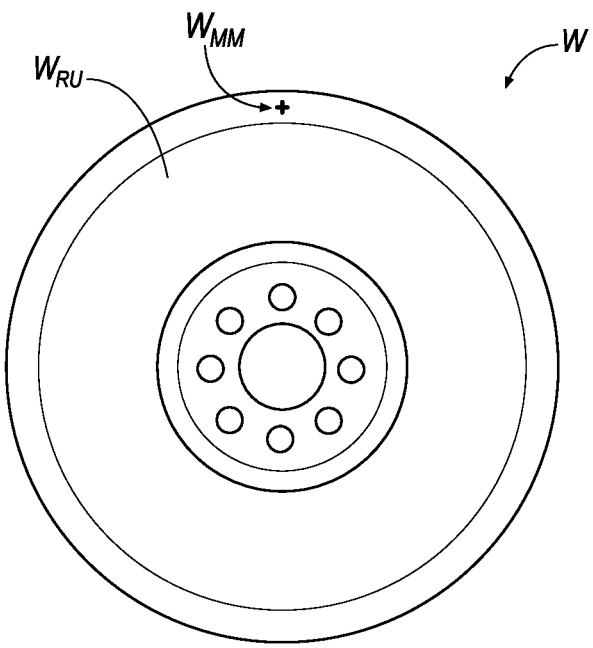

FIG. 10A is a top view of an exemplary wheel.

Figure 10B:
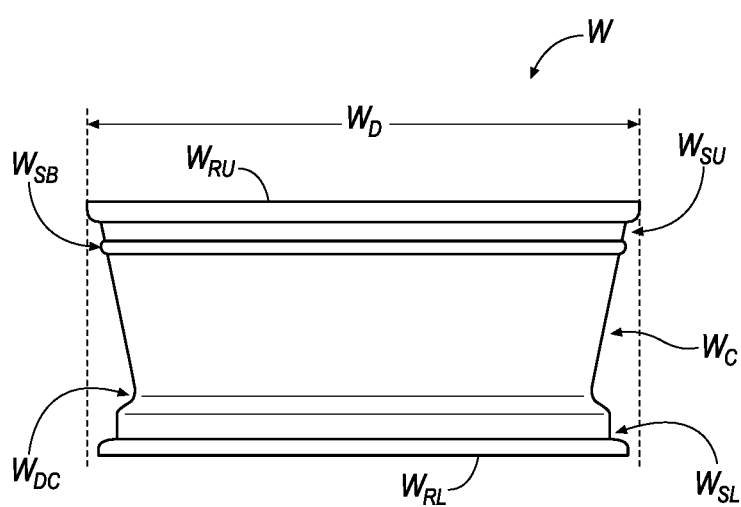

FIG. 10B is a side view of the wheel of FIG. 10A.

Figure 11:
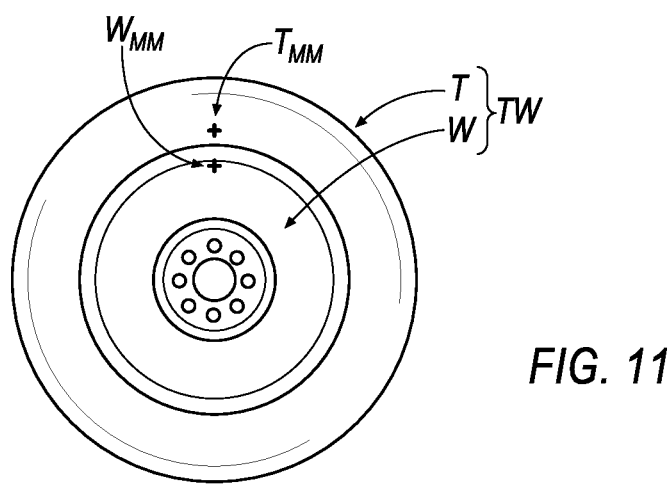

FIG. 11 is a top view of the tire of FIGS. 9A-9D joined to the wheel of FIGS. 10A-10B.

Figure 12B:
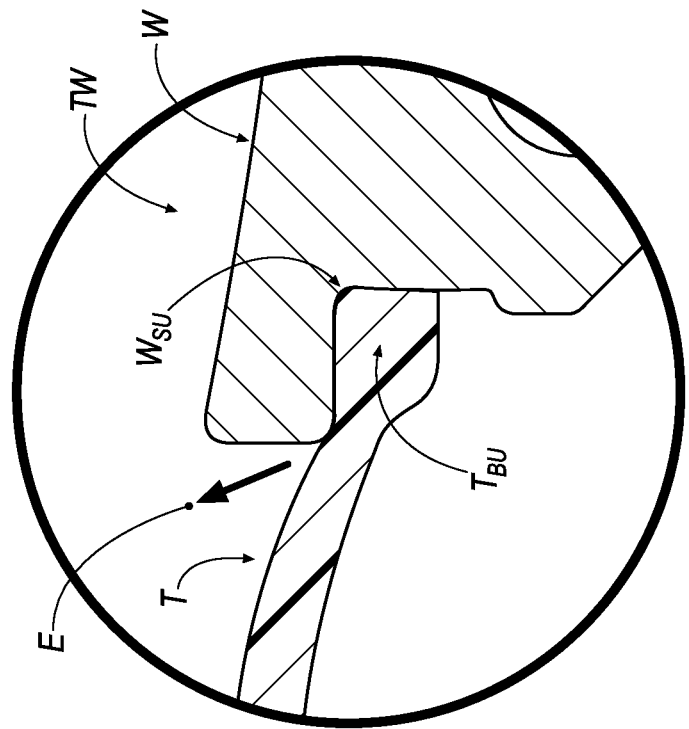
Figure 12A:
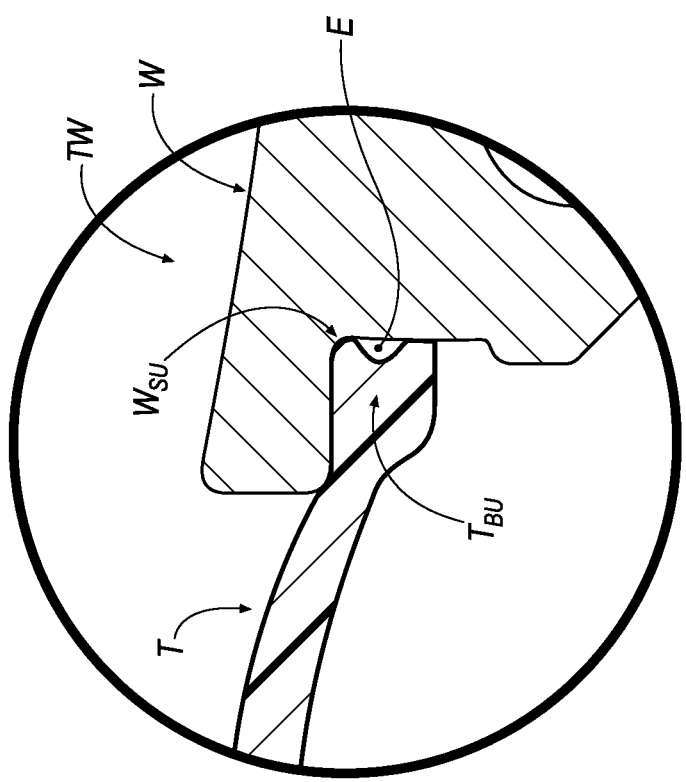

FIG. 12A is an enlarged, cross-sectional view of a portion of an inflated tire-wheel assembly including an entrapment according to line 12A, 12B of FIG. 6D''.

FIG. 12B is another enlarged, cross-sectional view of the inflated tire-wheel assembly of FIG. 12A without with entrapment according to line 12A, 12B of FIG. 6D''.

SUMMARY

One aspect of the disclosure provides a tire characteristic determination system. The tire characteristic determination system includes a memory device and a tire characteristic determination device. The memory device stores tire-engaging data related to one or more tire-engaging value to be utilized for spatially manipulating a tire about a wheel for forming a tire-wheel assembly. The tire characteristic determination device includes a tire-engaging test probe that is urged against into the tire at one or more tire displacement distances or is urged against the tire with one or more amounts of urging forces. The tire characteristic determination device is communicatively-coupled to the memory device for communicating the one or more tire displacement distances or the one or more amounts of urging forces to the memory device.

Implementations of the disclosure may include one or more of the following optional features. For example, the tire is a non-inflated tire and the tire-wheel assembly is a non-inflated tire-wheel assembly.

In some implementations, the memory device includes a database and the database includes a data look-up table. The data look-up table includes the tire-engaging data related to the one or more tire-engaging value to be utilized for spatially manipulating the non-inflated tire about the wheel for forming the non-inflated tire-wheel assembly.

In some examples, the tire characteristic determination device is communicatively-coupled to the memory device for communicating the one or more tire displacement distances or the one or more amounts of urging forces to the memory device for associating the one or more tire displacement distances or the one or more amounts of urging forces with the one or more tire-engaging values.

In some examples, the data look-up table may additionally include other tire-engaging data related to one or more other tire-engaging value to be utilized for spatially manipulating other non-inflated tires about other wheels for forming other non-inflated tire-wheel assemblies.

In some implementations, the other non-inflated tires includes one or more tire species. The one or more tire species includes at least an all-season tire species and a run-flat tire species.

In some examples, the other non-inflated tires includes one or more tire classes of a tire species.

In some implementations, the tire characteristic determination device further includes an actuator and a computing resource. The actuator is connected to the tire-engaging test probe. The computing resource is communicatively-coupled to the actuator. The computing resource is communicatively-coupled to the database. The computing resource sends a signal to the actuator for displacing the tire-engaging test probe into the non-inflated tire at the one or more tire displacement distances or urging the tire-engaging test probe into non-inflated tire with the one or more amounts of urging forces.

In some examples, the tire characteristic determination device further includes a displacement sensor communicatively-coupled to the computing resource for determining the one or more tire displacement distances of the tire-engaging test probe.

In some implementations, the tire characteristic determination device further includes a force sensor communicatively-coupled to the computing resource for determining the one or more amounts of urging forces provided by the tire-engaging test probe.

In some examples, the tire characteristic determination device further includes at least one clamping pad arranged adjacent the non-inflated tire for clamping the non-inflated tire between the at least one clamping pad and a support surface.

In some implementations, the at least one clamping pad includes one clamping pad. The one clamping pad is arranged proximate the tire-engaging test probe such that both of the one clamping pad and the tire-engaging test probe are arranged at approximately a "12 o'clock position" relative to the non-inflated tire.

In some examples, the at least one clamping pad includes a first clamping pad and a second clamping pad. The first clamping pad is arranged away from the tire-engaging test probe at approximately a "3 o'clock position" relative to the non-inflated tire. The second clamping pad is arranged away from the tire-engaging test probe at approximately a "9 o'clock position" relative to the non-inflated tire.

In some implementations, the at least one clamping pad includes one clamping pad. The one clamping pad includes an arcuate shape that is sized for engaging approximately half of the non-inflated tire. The one clamping pad is arranged away from the tire-engaging test probe and extends from approximately a "3 o'clock position" of the non-inflated tire to about approximately a "9 o'clock position" of the non-inflated tire.

In some examples, the tire-engaging test probe includes a tire-engaging member having an upper portion and a lower portion that are connected by an intermediate portion that collectively form a tire-portion-receiving cavity. The tire-portion-receiving cavity is sized for being interfaced with: a portion of a circumferential bead of the non-inflated tire, a portion of an outer surface of a sidewall of the non-inflated tire, and a portion an inner surface of the sidewall of the non-inflated tire.

In some implementations, the tire characteristic determination system further includes a shaft connected to the tire-engaging member.

In some examples, the shaft is fixed to the tire-engaging member in a non-movable orientation.

In some implementations, the shaft is hingedly-connected to the tire-engaging member in a rotationally-movable orientation.

In some examples, the tire-engaging test probe includes a cylindrically-shaped tire-engaging member having a spherically-shaped tire-engaging surface that is sized for being interfaced with a portion of an outer surface of a sidewall of the non-inflated tire.

In some implementations, the tire-engaging test probe includes a disk-shaped tire-sidewall-engaging member having a diameter that is sized for permitting a surface of the disk-shaped tire-sidewall-engaging member to be circumferentially-interfaced with: an outer surface of a sidewall of the non-inflated tire.

In some examples, the tire characteristic determination system further includes an ambient temperature sensor communicatively-coupled to the database for providing a detected ambient temperature surrounding the non-inflated tire and the tire characteristic determination device to the database.

In some implementations, the tire characteristic determination system further includes an ambient humidity sensor communicatively-coupled to the database for providing a detected ambient humidity surrounding the non-inflated tire and the tire characteristic determination device to the database.

Another aspect of the disclosure provides a tire-wheel assembly manufacturing system. The tire-wheel assembly manufacturing system includes a memory device that stores tire-engaging data related to one or more tire-engaging values. The mounting station includes one or more tire-engaging components. The mounting station is communicatively-coupled to the memory device for retrieving the tire-engaging data related to the one or more tire-engaging value that is/are to be utilized by the one or more tire-engaging components for spatially manipulating a tire about a wheel for forming a tire-wheel assembly.

Implementations of the disclosure may include one or more of the following optional features. For example, the tire is a non-inflated tire and the tire-wheel assembly is a non-inflated tire-wheel assembly.

In some implementations, the memory device includes a database having a data look-up table that includes the tire-engaging data related to one or more tire-engaging values In some examples, the mounting station may be a processing sub-station of a plurality of processing sub-stations.

In some examples, the tire-wheel assembly manufacturing system may also include a controller and a motor. The controller is communicatively-coupled to the database. The motor is communicatively-coupled to the controller. The motor is connected to the one or more tire-engaging components for applying the one or more tire-engaging value to the one or more tire-engaging components.

In some implementations, the controller is configured to receive at least one tire identifier of the non-inflated tire. The at least one tire identifier of the non-inflated tire provided to the controller is communicated to the database for determining a selection of the tire-engaging data related to the one or more tire-engaging value to be applied to the one or more tire-engaging components.

In some examples, the at least one tire identifier of the non-inflated tire includes one or more tire species. The one or more tire species includes at least an all-season tire species and a run-flat tire species.

In some implementations, the at least one tire identifier of the non-inflated tire includes a tire class of a tire species.

In some examples, the tire-wheel assembly manufacturing system further includes an ambient temperature sensor and an ambient temperature sensor and an ambient humidity sensor. The ambient temperature sensor is communicatively-coupled to the database for sensing an ambient temperature surrounding the non-inflated tire. The ambient temperature sensor is communicatively-coupled to the database for sensing an ambient humidity surrounding the non-inflated tire. One or more of the sensed ambient temperature and the sensed ambient humidity is provided to the database for further determining the selection of the tire-engaging data related to the one or more tire-engaging value to be applied to the one or more tire-engaging components.

In some implementations, the one or more tire-engaging components includes a pair of upstream tire-engaging components, a pair of midstream tire-engaging components and a downstream tire-engaging component. The pair of upstream tire-engaging components defined by a first upstream tire-engaging component and a second upstream tire-engaging component. The pair of midstream tire-engaging components are defined by a first midstream tire-engaging component and a second midstream tire-engaging component.

In some examples, the mounting station further includes two pairs of tire-linear-movement interference members and one or more tire-tread-surface-contacting guide members.

In yet another aspect of the disclosure provides a method of operating a tire characteristic determination system. The method includes: providing a memory device for storing tire-engaging data related to one or more tire-engaging value to be utilized for spatially manipulating a tire about a wheel for forming a tire-wheel assembly; and communicatively-coupling a tire characteristic determination device to the memory device. The tire characteristic determination device includes a tire-engaging test probe that is urged against the tire at one or more tire displacement distances or is urged against the tire with one or more amounts of urging forces.

The communicatively-coupling step further includes: communicating the one or more tire displacement distances or the one or more amounts of urging forces to the memory device.

Implementations of the disclosure may include one or more of the following optional features. For example, the tire is a non-inflated tire and the tire-wheel assembly is a non-inflated tire-wheel assembly.

In some implementations, the memory device includes a database and the database includes a data look-up table. The data look-up table includes the tire-engaging data related to the one or more tire-engaging value to be utilized for spatially manipulating the non-inflated tire about the wheel for forming the non-inflated tire-wheel assembly.

In some examples, after the communicating step, the method further includes associating the one or more tire displacement distances or the one or more amounts of urging forces with the one or more tire-engaging values.

In some implementations, the data look-up table may additionally include other tire-engaging data related to one or more other tire-engaging value to be utilized for spatially manipulating other non-inflated tires about other wheels for forming other non-inflated tire-wheel assemblies.

In some implementations, the other non-inflated tires includes one or more tire species. The one or more tire species includes at least an all-season tire species and a run-flat tire species.

In some examples, the other non-inflated tires includes one or more tire classes of a tire species.

In some implementations, the tire characteristic determination device further includes an actuator and a computing resource. The actuator is connected to the tire-engaging test probe. The computing resource is communicatively-coupled to the actuator. The computing resource is communicatively-coupled to the database. The method further comprises sending a signal from the computing resource to the actuator for displacing the tire-engaging test probe into the non-inflated tire at the one or more tire displacement distances or urging the tire-engaging test probe into non-inflated tire with the one or more amounts of urging forces.

In some examples, the tire characteristic determination device further includes a displacement sensor communicatively-coupled to the computing resource for determining the one or more tire displacement distances of the tire-engaging test probe.

In some implementations, the tire characteristic determination device further includes a force sensor communicatively-coupled to the computing resource for determining the one or more amounts of urging forces provided by the tire-engaging test probe.

In some examples, the tire characteristic determination device further includes at least one clamping pad for arrangement adjacent the non-inflated tire for clamping the non-inflated tire between the at least one clamping pad and a support surface.

In some implementations, the at least one clamping pad includes one clamping pad. The one clamping pad is arranged proximate the tire-engaging test probe such that both of the one clamping pad and the tire-engaging test probe are arranged at approximately a "12 o'clock position" relative to the non-inflated tire.

In some examples, the at least one clamping pad includes a first clamping pad and a second clamping pad. The first clamping pad is arranged away from the tire-engaging test probe at approximately a "3 o'clock position" relative to the non-inflated tire. The second clamping pad is arranged away from the tire-engaging test probe at approximately a "9 o'clock position" relative to the non-inflated tire.

In some implementations, the at least one clamping pad includes one clamping pad. The one clamping pad includes an arcuate shape that is sized for engaging approximately half of the non-inflated tire. The one clamping pad is arranged away from the tire-engaging test probe and extends from approximately a "3 o'clock position" of the non-inflated tire to about approximately a "9 o'clock position" of the non-inflated tire.

In some examples, the tire-engaging test probe includes a tire-engaging member having an upper portion and a lower portion that are connected by an intermediate portion that collectively form a tire-portion-receiving cavity. The method further includes interfacing the tire-portion-receiving cavity with: a portion of a circumferential bead of the non-inflated tire, a portion of an outer surface of a sidewall of the non-inflated tire, and a portion an inner surface of the sidewall of the non-inflated tire.

In some implementations, the tire characteristic determination device further includes a shaft connected to the tire-engaging member.

In some examples, the shaft is fixed to the tire-engaging member for arranging the tire-engaging member relative the shaft in a non-movable orientation.

In some implementations, the shaft is hingedly-connected to the tire-engaging member for arranging the tire-engaging member relative the shaft in a rotationally-movable orientation.

In some examples, the tire-engaging test probe includes a cylindrically-shaped tire-engaging member having a spherically-shaped tire-engaging surface that is sized for being interfaced with a portion of an outer surface of a sidewall of the non-inflated tire.

In some implementations, the tire-engaging test probe includes a disk-shaped tire-sidewall-engaging member having a diameter that is sized for permitting a surface of the disk-shaped tire-sidewall-engaging member to be circumferentially-interfaced with an outer surface of a sidewall of the non-inflated tire.

In some examples, the tire characteristic determination system further includes an ambient temperature sensor communicatively-coupled to the database for providing a detected ambient temperature surrounding the non-inflated tire and the tire characteristic determination device to the database.

In some implementations, the tire characteristic determination system further includes an ambient humidity sensor communicatively-coupled to the database for providing a detected ambient humidity surrounding the non-inflated tire and the tire characteristic determination device to the database.

One aspect of the disclosure provides a method for operating a tire-wheel assembly manufacturing system. The method includes: providing a memory device that stores tire-engaging data related to one or more tire-engaging values; communicatively-coupled a mounting station including one or more tire-engaging components to the memory device for retrieving the tire-engaging data related to the one or more tire-engaging value that is/are to be utilized by the one or more tire-engaging components for spatially manipulating a tire about a wheel for forming a tire-wheel assembly.

Implementations of the disclosure may include one or more of the following optional features. For example, the tire is a non-inflated tire and the tire-wheel assembly is a non-inflated tire-wheel assembly.

In some implementations, the memory device includes a database having a data look-up table that includes tire-engaging data related to one or more tire-engaging values.

In some examples, the mounting station may be a processing sub-station of a plurality of processing sub-stations.

In some implementations, the tire-wheel assembly manufacturing system further includes a controller and a motor. The controller is communicatively-coupled to the database. The motor is communicatively-coupled to the controller. The motor is connected to the one or more tire-engaging components for applying the one or more tire-engaging value to the one or more tire-engaging components.

In some examples, the method further includes: receiving at the controller at least one tire identifier of the non-inflated tire; communicating the at least one tire identifier of the non-inflated tire from the controller to the database for determining a selection of the tire-engaging data related to the one or more tire-engaging value to be applied to the one or more tire-engaging components.

In some implementations, the at least one tire identifier of the non-inflated tire includes one or more tire species. The one or more tire species includes at least an all-season tire species and a run-flat tire species.

In some examples, the at least one tire identifier of the non-inflated tire includes a tire class of a tire species.

In some implementations, an ambient temperature sensor is communicatively-coupled to the database for sensing an ambient temperature surrounding the non-inflated tire. Furthermore, an ambient humidity sensor is communicatively-coupled to the database for sensing an ambient humidity surrounding the non-inflated tire. The method further includes: providing one or more of the sensed ambient temperature and the sensed ambient humidity to the database for further determining the selection of the tire-engaging data related to the one or more tire-engaging value to be applied to the one or more tire-engaging components.

In some examples, the one or more tire-engaging components includes: a pair of upstream tire-engaging components, a pair of midstream tire-engaging components and a downstream tire-engaging component. The pair of upstream tire-engaging components is defined by a first upstream tire-engaging component and a second upstream tire-engaging component. The pair of midstream tire-engaging components is defined by a first midstream tire-engaging component and a second midstream tire-engaging component.

In some implementations, the mounting station further includes two pairs of tire-linear-movement interference members and one or more tire-tread-surface-contacting guide members.

Another aspect of the disclosure provides a method for operating a tire characteristic determination system and an automated tire-wheel assembly manufacturing system. The method includes: determining one or more characteristics relating to a sidewall stiffness of a tire; quantifying the one or more characteristics into one or more electrical signals representing the one or more characteristics; presenting the one or more electrical signals to the automated tire-wheel manufacturing system; and using the one or more electrical signals for establishing: a force-per-unit distance or a distance-per-unit force associated with at least one actuator used in the automated tire-wheel assembly manufacturing system for spatially manipulating a tire about a wheel for forming a tire-wheel assembly.

Implementations of the disclosure may include one or more of the following optional features. For example, the tire is a non-inflated tire and the tire-wheel assembly is a non-inflated tire-wheel assembly.

The details of one or more implementations of the disclosure are set forth in the accompanying drawings and the description below. Other aspects, features, and advantages will be apparent from the description and drawings, and from the claims.

DETAILED DESCRIPTION OF THE INVENTION

The figures illustrate an exemplary implementation of a tire characteristic determination system, a tire-wheel assembly manufacturing system and methods for operating the same. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 9A-9D, which illustrates an exemplary tire T. In the present disclosure, reference may be made to the "upper," "lower," "left," "right" and "side" of the tire T; although such nomenclature may be utilized to describe a particular portion or aspect of the tire T, such nomenclature may be adopted due to the orientation of the tire T with respect to structure that supports the tire T. Accordingly, the above nomenclature should not be utilized to limit the scope of the claimed invention and is utilized herein for exemplary purposes in describing an embodiment of the invention.

In an embodiment, the tire T includes an upper sidewall $T_{SU}$ (see, e.g., FIG. 9A), a lower sidewall $T_{SL}$ (see, e.g., FIG. 9D) and a tread surface $T_T$ (see, e.g., FIGS. 9B-9C), that joins the upper sidewall $T_{SU}$ to the lower sidewall $T_{SL}$. Referring to FIG. 9B, the upper sidewall $T_{SU}$ may rise away from the tread surface $T_T$ to a peak and subsequently descend at a slope to terminate at and form a circumferential upper bead, $T_{BU}$; similarly, the lower sidewall $T_{SL}$ may rise away from the tread surface $T_T$ to a peak and subsequently descend at a slope to terminate at and form a circumferential lower bead $T_{BL}$.

As seen in FIG. 9B, when the tire T is in a relaxed, unbiased state, the upper bead $T_{BU}$ forms a circular, upper tire opening $T_{OU}$; similarly, when the tire T is in a relaxed, unbiased state, the lower bead $T_{BL}$ forms a circular, lower tire opening, $T_{OL}$. It will be appreciated that when an external force is applied to the tire T, the tire T may be physically manipulated, and, as a result, one or more of the upper tire opening $T_{OU}$ and the lower tire opening $T_{OL}$ may be temporality upset such that one or more of the upper tire opening $T_{OU}$ and the lower tire opening $T_{OL}$ is/are not entirely circular, but, may, for example, be manipulated to include an oval shape.

Referring to FIGS. 9A and 9D, when in the relaxed, unbiased state, each of the upper tire opening $T_{OU}$ and the lower tire opening $T_{OL}$ form, respectively, an upper tire opening diameter $T_{OU-D}$ and a lower tire opening diameter $T_{OL-D}$. Further, as seen in FIGS. 9A and 9D, when in the relaxed, unbiased state, the upper sidewall $T_{SU}$ and the lower sidewall $T_{SL}$ define the tire T to include a tire diameter $T_D$.

Referring to FIGS. 9A-9B and 9D, the tire T also includes a passage $T_P$. Access to the passage $T_P$ is permitted by either of the upper tire opening $T_{OU}$ and the lower tire opening $T_{OL}$. Referring to FIG. 9B, when the tire T is in a relaxed, unbiased state, the upper tire opening $T_{OU}$ and the lower tire opening $T_{OL}$ define the passage $T_P$ to include a diameter $T_{P-D}$. Referring also to FIG. 9B, the tire T includes a circumferential air cavity $T_{AC}$ that is in communication with the passage $T_P$. After joining the tire T to a wheel W (see, e.g., FIGS. 10A-10B, pressurized air is deposited into the circumferential air cavity $T_{AC}$ for inflating the tire T, thereby forming a tire-wheel assembly TW (see, e.g., FIG. 11).

When the tire T is arranged adjacent structure or a wheel W, as described in the following disclosure, the written description may reference a "left" portion or a "right" portion of the tire T. Referring to FIG. 9C, the tire T is shown relative to a support member S; the support member S is provided (and shown in phantom) in order to establish a frame of reference for the "left" portion and the "right" portion of the tire T. In FIG. 9C, the tire T is arranged in a "non-rolling" orientation such that the tread surface $T_T$ is not disposed adjacent the phantom support member S but, rather, the lower sidewall $T_{SL}$ is disposed adjacent the phantom support member S. A center dividing line DL equally divides the "non-rolling" orientation of the tire T in half in order to generally indicate a "left" portion of the tire T and a "right" portion of the tire T.

As discussed above, reference is made to several diameters $T_{P-D}$, $T_{OU-D}$, $T_{OL-D}$ of the tire T. According to geometric theory, a diameter passes through the center of a circle, or, in the present disclosure, the axial center of the tire T, which may alternatively be referred to as an axis of rotation of the tire T. Geometric theory also includes the concept of a chord, which is a line segment that whose endpoints both lie on the circumference of a circle; according to geometric theory, a diameter is the longest chord of a circle.

In the following description, the tire T may be moved relative to structure; accordingly, in some instances, a chord of the tire T may be referenced in order to describe an embodiment of the invention. Referring to FIG. 9A, several chords of the tire T are shown generally at $T_{C1}$, $T_{C2}$ (i.e., the tire diameter, $T_D$) and $T_{C3}$.

The chord $T_{C1}$ may be referred to as a "left" tire chord. The chord $T_{C3}$ may be referred to as a "right" tire chord. The chord $T_{C2}$ may be equivalent to the tire diameter $T_D$ and be referred to as a "central" chord. Both of the left and right tire chords $T_{C1}$, $T_{C3}$, include a geometry that is less than central chord $T_{C2}$/tire diameter $T_D$.

In order to reference the location of the left chord $T_{C1}$ and the right chord $T_{C3}$ reference is made to a left tire tangent line $T_{TAN-L}$ and a right tire tangent line $T_{TAN-R}$. The left chord $T_{C1}$ is spaced apart approximately one-fourth (¼) of the tire diameter $T_D$ from the left tire tangent line $T_{TAN-L}$. The right chord $T_{C3}$ is spaced apart approximately one-fourth (¼) of the tire diameter $T_D$ from the right tire tangent line $T_{TAN-R}$. Each of the left and right tire chords $T_{C1}$, $T_{C3}$ may be spaced apart about one-fourth (¼) of the tire diameter $T_D$ from the central chord $T_{C2}$. The above spacings referenced from the tire diameter $T_D$ are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 9C, the movement may be referenced by an arrow U to indicate upwardly movement or an arrow D to indicate downwardly movement. Further, the movement may be referenced by an arrow L to indicate left or rearwardly movement or an arrow R to indicate right or forwardly movement.

Prior to describing embodiments of the invention, reference is made to FIGS. 10A-10B, which illustrate an exemplary wheel W. In the present disclosure, reference may be made to the "upper," "lower," "left," "right" and "side" of the wheel W; although such nomenclature may be utilized to describe a particular portion or aspect of the wheel W, such nomenclature may be adopted due to the orientation of the wheel W with respect to structure that supports the wheel W. Accordingly, the above nomenclature should not be utilized to limit the scope of the claimed invention and is utilized herein for exemplary purposes in describing an embodiment of the invention.

In an embodiment, the wheel W includes an upper rim surface $W_{RU}$ a lower rim surface $W_{RL}$ and an outer circumferential surface $W_C$ that joins the upper rim surface $W_{RU}$ to the lower rim surface $W_{RL}$. Referring to FIG. 10B, the upper rim surface $W_{RU}$ forms a wheel diameter $W_D$. The wheel diameter $W_D$ may be non-constant about the circumference $W_C$ from the upper rim surface $W_{RU}$ to the lower rim surface $W_{RL}$. The wheel diameter $W_D$ formed by the upper rim surface $W_{RU}$ may be largest diameter of the non-constant diameter about the circumference $W_C$ from the upper rim surface $W_{RU}$ to the lower rim surface $W_{RL}$. The wheel diameter $W_D$ is approximately the same as, but slightly greater than the diameter $T_{P-D}$ of the passage $T_P$ of the tire T; accordingly, once the wheel W is disposed within the passage $T_P$, the tire T may flex and be frictionally-secured to the wheel W as a result of the wheel diameter $W_D$ being approximately the same as, but slightly greater than the diameter $T_{P-D}$ of the passage $T_P$ of the tire T.

The outer circumferential surface $W_C$ of the wheel W further includes an upper bead seat $W_{SU}$ and a lower bead seat $W_{SL}$. The upper bead seat $W_{SU}$ forms a circumferential cusp, corner or recess that is located proximate the upper rim surface $W_{RU}$. The lower bead seat $W_{SL}$ forms a circumferential cusp, corner or recess that is located proximate the lower rim surface $W_{RL}$. Upon inflating the tire T the pressurized air causes the upper bead $T_{BU}$ to be disposed adjacent and "seat" in the upper bead seat $W_{SU}$; similarly, upon inflating the tire T, the pressurized air causes the lower bead $T_{BL}$ to be disposed adjacent and "seat" in the lower bead seat $W_{SL}$.

The non-constant diameter of the outer circumference $W_C$ of the wheel W further forms a wheel "drop center" $W_{DC}$. A wheel drop center $W_{DC}$ may include the smallest diameter of the non-constant diameter of the outer circumference $W_C$ of the wheel W. Functionally, the wheel drop center $W_{DC}$ may assist in the mounting of the tire T to the wheel W.

The non-constant diameter of the outer circumference $W_C$ of the wheel W further forms an upper "safety bead" $W_{SB}$. In an embodiment, the upper safety bead $W_{SB}$ may be located proximate the upper bead seat $W_{SU}$. In the event that pressurized air in the circumferential air cavity $T_{AC}$ of the tire T escapes to atmosphere the upper bead $T_{BU}$ may "unseat" from the upper bead seat $W_{SU}$; because of the proximity of the safety bead $W_{SB}$, the safety bead $W_{SB}$ may assist in the mitigation of the "unseating" of the upper bead $T_{BU}$ from the upper bead seat $W_{SU}$ by assisting in the retaining of the upper bead $T_{BU}$ in a substantially seated orientation relative to the upper bead seat $W_{SU}$. In some embodiments the wheel W may include a lower safety bead; however, upper and/or lower safety beads may be included with the wheel W, as desired, and are not required in order to practice the invention described in the following disclosure.

Figure 1:
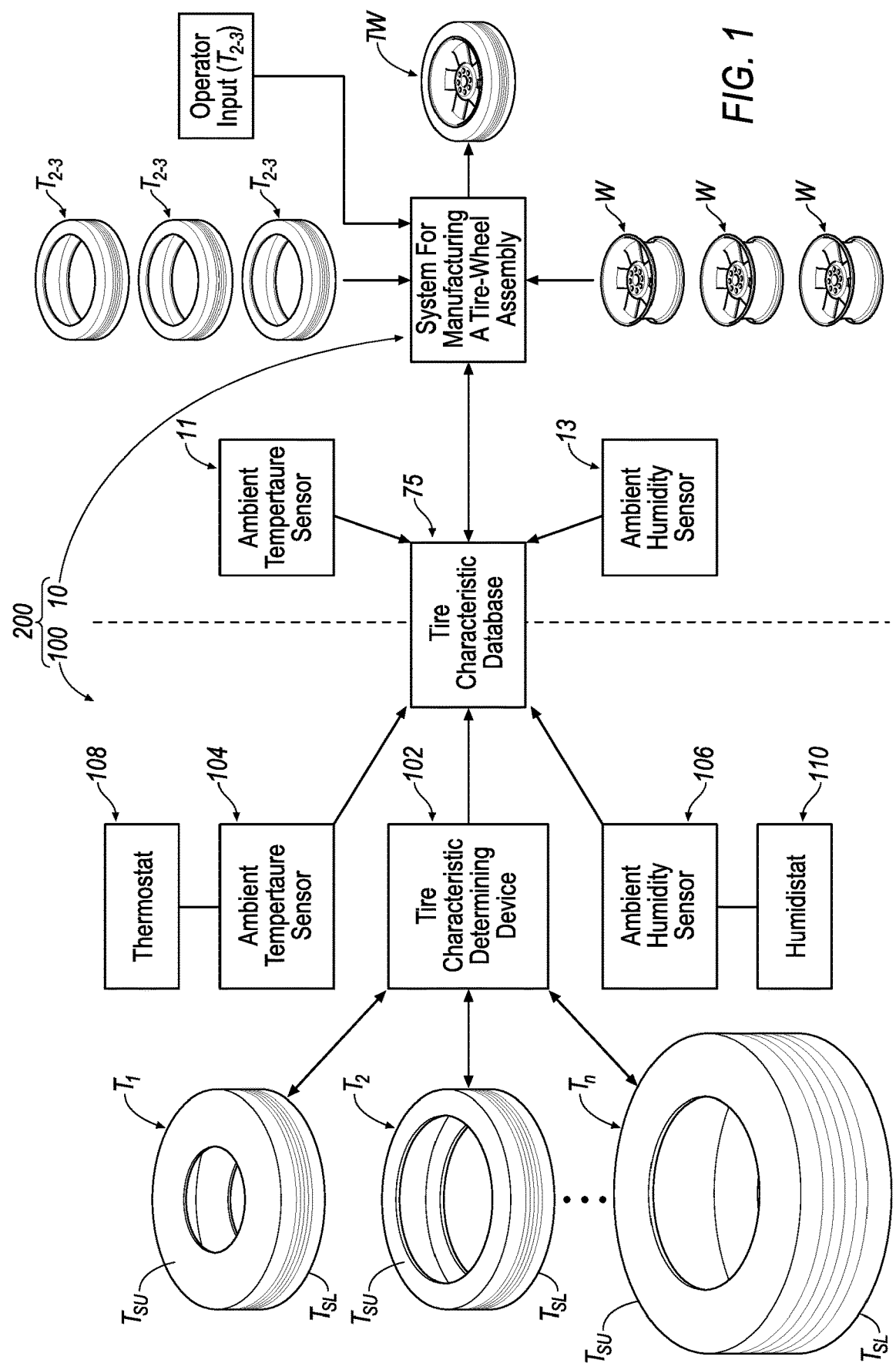
FIG. 1 is a plan view of a tire-wheel assembly processing system including a tire-wheel assembly manufacturing system and a tire characteristic determination system that are communicatively-coupled by a database.

Referring to FIG. 1, a tire-wheel assembly manufacturing system is shown generally at 10 and a tire characteristic determination system is shown generally at 100. The tire-wheel assembly manufacturing system 10 and the tire characteristic determination system 100 are communicatively-coupled by a database 75 to form a tire-wheel assembly processing system 200. In some instances, the database 75 may be located in a memory device that stores data associated with the database 75.

As seen in FIG. 1, a dashed line generally separates the tire-wheel assembly manufacturing system 10 from the tire characteristic determination system 100.

Furthermore, the dashed line is also shown extending across the tire characteristic database 75. In view of the exemplary illustration of FIG. 1 including the dashed line, it may be inferred that the tire characteristic database 75 may be a component of the tire-wheel assembly manufacturing system 10. Furthermore, the arrangement of the dashed line may infer that the tire characteristic database 75 may be a component of the tire characteristic determination system 100.

The tire characteristic determination system 100 is utilized for determining one or more characteristics of one or more tire species (see, e.g., $T_1, T_2 \ldots T_n$). A first exemplary tire species (see, e.g., $T_1$) may include an "all season" tire species. A second exemplary tire species (see, e.g., $T_2$) may include a "run-flat" tire species. Another exemplary tire species (see, e.g., $T_n$) may include a "heavy duty" tire species. The one or more characteristics of the one or more tire species $T_1, T_2 \ldots T_n$ determined by the tire characteristic determination system 100 is/are associated with data (see, e.g., $XYZ_1$-$XYZ_n$ in FIG. 8) in the tire characteristic database 75 that is utilized by the tire-wheel assembly manufacturing system 10 for manufacturing a tire-wheel assembly TW.

Furthermore, it should be noted that the tire characteristic determination system 100 determines one or more characteristics of a tire T. The tire T may/may not be mounted to a wheel. If it is mounted to a wheel, it may/may not be inflated. In the embodiment shown in FIG. 1, the tire T is not mounted or joined to a wheel W. The tire characteristic determination system 100 determines one or more characteristics of a tire T that optionally may or may not be arranged in an inflated state about a wheel W. Therefore, although not explicitly stated throughout the following disclosure, when the tire characteristic determination system 100 engages a tire T, the tire T may optionally be mounted to a wheel or optionally it may not be mounted to a wheel. If it is mounted to a wheel it may optionally be uninflated or it may optionally be inflated.

Although one or more tire species $T_1, T_2 \ldots T_n$ are described above, the tire characteristic determination system 100 is not limited to determining different characteristics of one or more tire species $T_1, T_2 \ldots T_n$. In an implementation, the tire characteristic determination system 100 may determine characteristics of one or more different tire classes (see, e.g., $T_{2-1}$-$T_{2-n}$ in FIG. 8) of a tire species (see, e.g., $T_2$ in FIG. 8). For example, an exemplary tire species $T_2$ may be a "run flat" tire species and the one or more tire classes $T_{2-1}$-$T_{2-n}$ may be different tire shapes, tire sizes, tire manufacturer brands (e.g., BFGOODRICH®, BRIDGESTONE®, CONTINENTAL®, GOODYEAR®, MICHELIN®, UNIROYAL®, YOKOHAMA®) and the like of the "run flat" tire species $T_2$. Therefore, although the following disclosure discusses an exemplary methodology discussing differences between tire characteristic of a plurality of tire species $T_1, T_2 \ldots T_n$, the same methodology may apply to one or more tire classes $T_{2-1}$-$T_{2-n}$ of a tire species $T_2$. As a result, the tire characteristic database 75 may not only contain tire characteristic data of a plurality of different tire species $T_1, T_2 \ldots T_n$ but also a plurality of different tire classes $T_{2-1}$-$T_{2-n}$ of different tire species $T_2$; as a result, the tire characteristic database 75 may contain tire characteristic information for virtually any tire T that is or was commercially available.

One of many tire characteristics that may be discovered with the assistance of the tire characteristic determination system 100 is a stiffness of a tire's sidewall $T_{SU}$, $T_{SL}$. Because the stiffness of a tire's sidewall $T_{SU}$, $T_{SL}$ varies from one tire species $T_1$, $T_2$ ... $T_n$ (or tire class $T_{2-1}$-$T_{2-n}$) to another tire species $T_1$, $T_2$ ... $T_n$ (or tire class $T_{2-1}$-$T_{2-n}$), the tire-wheel assembly manufacturing system 10 may process (as seen at, e.g., FIGS. 7A-7C) one type of tire T in a different fashion than another type of tire T (e.g., the act of processing the tire T at FIGS. 7A-7C includes engaging the tire T with one or more tire-engaging value (see, e.g., $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$)); the one or more tire-engaging value may include, but is not limited to one or more directional forces, one or more displacement distances or a combination of one or more directional forces and one or more displacement distances. The applied one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ may be retrieved from a data look-up table 175 (see, e.g., FIG. 8) of the tire characteristic database 75. The data look-up table 175 may include a plurality of cells including tire-engaging data $XYZ_1$-$XYZ_n$ related to one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that correspond to determined sidewall stiffness characteristics of tires T that were interfaced with the tire characteristic determination system 100. Data look-up tables, databases or the like, are one way of creating a functional relationship between tire engaging data and tire engaging values. Optionally other methods include converting the tire engaging data to mathematical functions such as piecewise linear functions, or parametric equations or the like. The ultimate goal when creating functions or parametric equations is to relate the tire engaging data to the tire engaging value such that:

tire engaging values=function (tire engaging data)

The tire-engaging data $XYZ_1$-$XYZ_n$ related to one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ may be empirically determined through experimentation and manually populated into the data look-up table 175 by a technician or scientist. The experimentation may include interfacing a tire T (e.g., a tire class $T_{2-3}$ of a tire species $T_2$) with a sub-station 10d of the tire-wheel assembly manufacturing system 10 for simulating a tire-wheel assembly manufacturing step. With the stiffness characteristics of the sidewalls $T_{SU}$, $T_{SL}$ of the tire class $T_{2-3}$ being previously discovered by applying the tire characteristic determination system 100 to the tire class $T_{2-3}$, the technician or scientist may apply a plurality of different tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ to determine how the tire class $T_{2-3}$ will respond during the simulated tire-wheel assembly manufacturing step at the sub-station 10d; the applied tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ may be recorded as tire-engaging data $XYZ_1$-$XYZ_n$ in the data look-up table 175 by the technician or scientist such that the technician or scientist may determine which unit (see, e.g., $XYZ_{15}$) of the tire-engaging data $XYZ_1$-$XYZ_n$ includes 'optimal' tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that will not result in an 'under-engagement' or an 'over-engagement' of the tire class $T_{2-3}$.

The one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ corresponding to a particular tire T will ensure that the particular tire T will be spatially flexed (as seen in, e.g., FIGS. 7A-7C) by the tire-wheel assembly manufacturing system 10 about the wheel W in order to mount the particular tire T to the wheel W for forming a tire-wheel assembly TW. In an example, because a "run-flat" tire species $T_2$ may be defined to have a stiffer sidewall characteristic than an "all season" tire species $T_1$, upon informing (e.g., via a manual input from a computer workstation (as seen at, e.g., the controller 12 in FIGS. 7A-7C)) the tire-wheel assembly manufacturing system 10 that, for example, a particular tire class (see, e.g., $T_{2-3}$ in FIGS. 7A-7C) of the "run-flat" tire species $T_2$ is being mounting to a wheel W for forming a tire-wheel assembly TW, the tire-wheel assembly manufacturing system 10 will communicate with the tire characteristic database 75 (e.g., the controller 12 may be communicatively-coupled to the tire characteristic database 75) to retrieve the one or more optimal tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ from the data look-up table 175 that corresponds to, for example, the particular tire class (see, e.g., $T_{2-3}$ in FIGS. 7A-7C) of the "run-flat" tire species $T_2$ such that one or more tire-engaging components (see, e.g., 150 in FIGS. 7A-7C) of the tire-wheel assembly manufacturing system 10 will apply the one or more optimal tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that is/are sufficient for spatially manipulating the "run flat" tire T about the wheel W.

As described above, 'optimal' tire-engaging data (see, e.g., $XYZ_2$, $XYZ_{10}$, $XYZ_{15}$, $XYZ_{23}$, $XYZ_{26}$, $XYZ_{34}$ in FIG. 8) having 'optimal' tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ may be designated in the data look-up table 175 by a technician or scientist such that the tire-wheel assembly manufacturing system 10 does not 'under-engage' or 'over-engage' a tire T. For example, looking to the row of cells in the data look-up table 175 in FIG. 8 associated with the tire class $T_{2-3}$, a technician or scientist may deem that tire-engaging data $XYZ_{13}$-$XYZ_{15}$ including one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ would under-engage the tire class $T_{2-3}$ and that tire-engaging data $XYZ_{16}$-$XYZ_{18}$ including one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ would over-engage the tire class $T_{2-3}$; conversely, the technician or scientist may deem that the tire-engaging data $XYZ_{15}$ (for illustrative purposes, the cell containing the tire-engaging data $XYZ_{15}$ includes gray shading and is identified by the reference arrow OD, which is meant to identify 'optimal data') is optimal due to the fact that the tire class $T_{2-3}$ would not be under-engaged or over-engaged with the its associated one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ similarly, other tire classes $T_{2-1}$, $T_{2-2}$, $T_{2-4}$, $T_{2-5}$ ... $T_{2-n}$ in the data look-up table 175 also includes one data cell (see, respectively, e.g., $XYZ_2$, $XYZ_{10}$, $XYZ_{23}$, $XYZ_{26}$, $XYZ_{34}$) that is also identified as containing optimal tire-engaging data OD. Therefore, if the tire-wheel assembly manufacturing system 10 did not have the benefit of the information contained in the tire characteristic database 75, the one or more tire-engaging components 150 of the tire-wheel manufacturing system 10 could potentially under-engage the tire class $T_{2-3}$ with an insufficient amount of tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that would result in the "run flat" tire T not being mounted to the wheel W; in the alternative, if the tire-wheel assembly manufacturing system 10 did not have the benefit of the information contained in the tire characteristic database 75, the one or more tire-engaging components 150 of the tire-wheel manufacturing system 10 could potentially over-engage the tire class $T_{2-3}$ with a considerable (i.e., too much) amount of tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that may result in damage being imparted to the tire T.

Referring to FIGS. 2A, $2B_1$, $2B_2$, $2B_3$, 2C, 2D, 2E a plurality of exemplary tire characteristic determination devices are shown respectively at 102a, $102b_1$, $102b_2$, $102b_3$, 102c, 102d, 102e. Any of the tire characteristic determination devices 102a, $102b_1$, $102b_2$, $102b_3$, 102c, 102d, 102e may perform the function of the tire characteristic determination device 102 of the tire characteristic determination system 100 of FIG. 1.

As seen in FIG. 1, the tire characteristic determination device 102 is communicatively-coupled to the tire characteristic database 75. In an example, the tire characteristic determination device 102 may communicate one or more specific amounts of tire-imparted forces or urging forces (see, e.g., $F_X/F_X'$ in FIGS. $4A_2$, $4B_2$-$4B_3$, $4C_2$, $4D_2$, $4E_2$-$4E_4$, which corresponds to forces $F_1$, $F_2$, $F_3$, $F_4$, $F_5$ ... $F_n$ in the data look-up table 175 of the tire characteristic database 75 in FIG. 8) or one or more specific tire displacement distances (see, e.g., $D_X/D_X'$ in FIGS. $4A_2$, $4B_2$-$4B_3$, $4C_2$, $4D_2$, $4E_2$-$4E_4$, which corresponds to displacement distances $D_1$, $D_2$, $D_3$, $D_4$, $D_5$ ... $D_n$ in the data look-up table 175 of the tire characteristic database 75 in FIG. 8) to the tire characteristic database 75.

Furthermore, as seen in FIG. 1, in addition to the tire characteristic determination device 102, the tire characteristic determination system 100 may also include one or more other devices such as, for example: an ambient temperature sensor 104, an ambient humidity sensor 106, a thermostat 108 and a humidistat 110. The ambient temperature sensor 104 and the ambient humidity sensor 106 may be communicatively-coupled to the tire characteristic database 75. The thermostat 108 and the humidistat 110 may also be components of and be communicatively-coupled to a heating-ventilation-air-conditioning (HVAC) system associated with an enclosed room or controlled environment (e.g., a test lab that houses components of the tire characteristic determination system 100 such as the tire characteristic determination device 102, the ambient temperature sensor 104, the ambient humidity sensor 106 and the tire characteristic database 75. When arranged in a test lab, the ambient temperature sensor 104 senses ambient temperature within the test lab, and the ambient humidity sensor 106 senses ambient humidity within the test lab. The ambient temperature sensor 104 may be communicatively-coupled to the thermostat 108, and the ambient humidity sensor 106 may be communicatively-coupled to the humidistat 110.

In some examples, a technician or scientist may selectively change or adjust the ambient conditions (e.g., temperature and/or humidity) within the test lab by accessing the thermostat 108 and/or the humidistat 110. By changing the ambient conditions within the test lab, the technician or scientist may further populate the tire characteristic database 75 with additional data such as sensed ambient temperature and/or sensed ambient humidity in order to discover one or more characteristics (e.g., sidewall stiffness) of the tire T when the tire T is subjected to a variety of ambient conditions such as different temperatures and humidity levels. Because differences in temperature and/or humidity may results in an inconsistent response of the tire T when external forces (e.g., one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$) are applied thereto, when a tire T is subsequently located at a manufacturing environment (where the tire-wheel assembly manufacturing system 10 is located) where the tire T is mounted to a wheel W for forming a tire wheel-assembly TW, the tire characteristic database 75 may also contain temperature and/or humidity data that will compensate (in terms of, e.g., an applied amount and/or direction of the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$) how the one or more tire-engaging components 150 of the tire-wheel manufacturing system 10 will engage the tire T when the tire-wheel assembly manufacturing system 10 is operated during, for example, the winter season (when ambient temperature and humidity may be seasonably low) or the summer season (when ambient temperature and humidity may be seasonably high).

In an example, with reference to FIGS. 2A and 8, a technician or scientist may populate a data look-up table 175 (see, e.g., FIG. 8) by interfacing an exemplary tire characteristic determination device 102a (see, e.g., FIG. 2A) with a plurality of tire classes $T_{2-1}$-$T_{2-n}$ of a run-flat tire species $T_2$ in order to discover the sidewall stiffness characteristics of each tire class $T_{2-1}$-$T_{2-n}$ of the run-flat tire species $T_2$. Firstly, in an example, the technician may selectively maintain the temperature (see, e.g., ##° F.) and/or humidity (see, e.g., ##%) within a test lab by selectively-adjusting one or more of the thermostat 108 and the humidistat 110. The ambient temperature sensor 104 and the ambient humidity sensor 106 may then communicate the sensed temperature ##° F. and humidity ##% to the tire characteristic database 75. Then, as will be described in the following disclosure, the technician or scientist may study the sidewall stiffness characteristics of each tire class $T_{2-1}$-$T_{2-n}$ of the run-flat tire species $T_2$ at the maintained temperature ##° F. and/or humidity setting ##% by, for example: utilizing the exemplary tire characteristic determination device 102a for (1) pushing the engaged portion of a tire class $T_{2-1}$, $T_{2-2}$, $T_{2-3}$, $T_{2-4}$, $T_{2-5}$ ... $T_{2-n}$ with a specific amount of force $F_1$, $F_2$, $F_3$, $F_4$, $F_5$ ... $F_n$ or (2) pushing the engaged portion of the tire class $T_{2-1}$, $T_{2-2}$, $T_{2-3}$, $T_{2-4}$, $T_{2-5}$ ... $T_{2-n}$ at a specific displacement distance $D_1$, $D_2$, $D_3$, $D_4$, $D_5$ ... $D_n$; thereafter, as a result of discovering the sidewall stiffness characteristics of each tire class $T_{2-1}$-$T_{2-n}$ of the run-flat tire species $T_2$ resulting from the applied forces $F_1$, $F_2$, $F_3$, $F_4$, $F_5$ ... $F_n$ or displacement distances $D_1$, $D_2$, $D_3$, $D_4$, $D_5$ ... $D_n$, the technician or scientist may, for example, empirically populate the data look-up table 175 of the tire characteristic database 75 with tire-engaging data $XYZ_1$-$XYZ_n$ corresponding to the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that is/are to be imparted by the one or more tire-engaging components 150.

Referring to FIG. 2A, the exemplary tire characteristic determination device 102a includes a tire-engaging test probe 112a, an actuator 114a and a computing resource 116a. The computing resource 116a is communicatively-coupled to the actuator 114a and the actuator 114a is connected to the tire-engaging test probe 112a.

The computing resource 116a may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 116a may be communicatively-coupled (e.g., wirelessly or hardwired by, for example, one or more communication conduits) to, for example, the tire characteristic database 75.

The tire-engaging test probe 112a includes an arcuate shaped (as seen more clearly in, e.g., FIG. 3A) tire-engaging member 118a that may be generally defined by a C-shaped or U-shaped cross-sectional geometry (as seen more clearly in, e.g., FIG. $4A_1$-$4A_2$). Referring to FIG. 2A, the tire-engaging member 118a may include an upper portion 120a and a lower portion 122a that are connected by an intermediate portion 124a. Each of the upper portion 120a, the lower portion 122a and the intermediate portion 124a is defined by an inner surface $120a_I$, $122a_I$, $124a_I$ and an outer surface $120a_O$, $122a_O$, $124a_O$. The inner surface $120a_I$, $122a_I$, $124a_I$ of the upper portion 120a, the lower portion 122a and the intermediate portion 124a collectively define a tire-portion-receiving cavity 128a.

Referring to FIG. 3A, a top view is shown, illustrating an exemplary arrangement of the tire characteristic determination device 102a about the tire T. As seen in FIGS. $4A_1$-$4A_2$, the lower sidewall $T_{SL}$ of the tire T may be arranged adjacent a support surface S (of, for example, a mobile cart or fixed platform of the tire characteristic determination device 102a). Furthermore, as seen in FIGS. $4A_1$-$4A_2$, the tire-engaging test probe 112a may be arranged within the upper opening $T_{OU}$ of the tire T such that a portion of the tire T may be arranged within the tire-portion-receiving cavity 128a of the tire-engaging test probe 112a.

When arranged within the upper opening $T_{OU}$ of the tire T as described above, the tire-engaging test probe 112a may engage: (1) a portion of the circumferential upper bead $T_{BU}$ of the tire T, (2) a portion of an outer surface $T_{SU-O}$ of the upper sidewall $T_{SU}$ of the tire T and (3) a portion an inner surface $T_{SU-I}$ of the upper sidewall $T_{SU}$ of the tire T. In some instances, at least a portion of the inner surface $120a_I$ of the upper portion 120a of the tire-engaging test probe 112a, at least a portion of the inner surface $122a_I$ of the lower portion 122a of the tire-engaging test probe 112a and the inner surface $124a_I$ of the intermediate portion 124a of the tire-engaging test probe 112a may engage: (1) a portion of an upper surface $T_{BU-O}$, of the circumferential upper bead $T_{BU}$ of the tire T, (2) a portion of a lower surface $T_{BU-L}$, of the circumferential upper bead $T_{BU}$ of the tire T, and (3) a portion of a side surface $T_{BU-S}$, of the circumferential upper bead $T_{BU}$ of the tire T that connects the upper surface $T_{BU-O}$, of the circumferential upper bead $T_{BU}$ of the tire T to the lower surface $T_{BU-L}$, of the circumferential upper bead $T_{BU}$ of the tire T. Furthermore, in some examples, at least a portion of the inner surface $120a_I$ of the upper portion 120a of the tire-engaging test probe 112a may engage the outer surface $T_{SU-O}$ of the upper sidewall $T_{SU}$ of the tire T. Yet even further, in some instances, at least a portion of the inner surface $122a_I$ of the lower portion 122a of the tire-engaging test probe 112a may engage the inner surface $T_{SU-I}$ of the upper sidewall $T_{SU}$ of the tire T.

As seen in FIGS. 2A, 3A and $4A_1$-$4A_2$, the tire characteristic determination device 102a may further include a shaft 130a extending away from the outer surface $120a_O$ (see, e.g., FIG. 2A) of the upper portion 120a of the tire-engaging test probe 112a. In an example, a distal end $130a_D$ (see, e.g., FIG. 2A) of the shaft 130a may be connected to the outer surface $120a_O$ of the upper portion 120a of the tire-engaging test probe 112a and a proximal end $130a_P$ (see, e.g., FIGS. $4A_1$-$4A_2$) of the shaft 130a may be connected to the actuator 114a.

After arranging the tire-engaging test probe 112a about the tire T such that the above-described surface portions of the tire T are arranged within the tire-portion-receiving cavity 128a of tire-engaging test probe 112a, the computing resource 116a may send a signal to the actuator 114a in order to impart movement to the shaft 130a that will result in corresponding movement to the tire-engaging test probe 112a. The direction of the imparted movement to the tire-engaging test probe 112a may be substantially orthogonal and toward (see, e.g., arrow X in FIG. $4A_2$) the upper sidewall $T_{SU}$ of the tire T. When the movement imparted to the tire-engaging test probe 112a is in this "pushing" direction, the inner surface $120a_I$ of the upper portion 120a of the tire-engaging test probe 112a is pushed into for direct engagement with the outer surface $T_{SU-O}$ of the upper sidewall $T_{SU}$ of the tire T.

In some examples, the computing resource 116a may send a signal to the actuator 114a for causing the tire-engaging test probe 112a to push the engaged portion of the tire T with a specific amount of force (see, e.g., $F_X$, which corresponds to $F_1$, $F_2$, $F_3$, $F_4$, $F_5$ ... $F_n$ in the data look-up table 175 of FIG. 8). A sensor 132a (e.g., a displacement sensor, which may be, for example, an imaging device) may be communicatively-coupled to the computing resource 116a for determining a displacement distance (see, e.g., $D_X$, which corresponds to $D_1$, $D_2$, $D_3$, $D_4$, $D_5$ ... $D_n$ in the data look-up table 175 of FIG. 8) that the tire-engagement test probe 112a was moved (as a result of the resistance arising from the sidewall stiffness characteristic of the upper sidewall $T_{SU}$ of the tire T). The sensor 132a may then communicate the determined displacement distance $D_X$ to the computing resource 116a. The above process may be repeated by increasing or decreasing the amount of imparted force $F_X$ for determining corresponding displacement distances $D_X$. The computing resource 116a may then communicate the imparted forces and corresponding displacement distances of the tire T to the tire characteristic database 75.

In another example, the computing resource 116a may send a signal to the actuator 114a for causing the tire-engaging test probe 112a to push the engaged portion of the tire T at a specific displacement distance (see, e.g., $D_X$, which corresponds to $D_1$, $D_2$, $D_3$, $D_4$, $D_5$ ... $D_n$ in the data look-up table 175 of FIG. 8). The actuator 114a may include a sensor 134a such as, for example, a force sensor) for determining an amount of force (see, e.g., $F_X$, which corresponds to $F_1$, $F_2$, $F_3$, $F_4$, $F_5$ ... $F_n$ in the data look-up table 175 of FIG. 8) that was required for moving the tire-engagement test probe 112a at the specified displacement distance (as a result of the resistance arising from the sidewall stiffness characteristic of the upper sidewall $T_{SU}$ of the tire T). The sensor 134a may then communicate the determined amount of force $F_X$ to the computing resource 116a. The above process may be repeated by increasing or decreasing the amount of specified displacement distance $D_X$ for determining corresponding imparted force amounts $F_X$. The computing resource 116a may then communicate the specified displacement distances $D_X$ and corresponding force amounts $F_X$ imparted to the tire T to the tire characteristic database 75.

In another example, with reference to FIGS. $2B_1$, $2B_2$, $2B_3$ and 8, a technician or scientist may populate a data look-up table 175 by interfacing exemplary tire characteristic determination devices $102b_1$, $102b_2$, $102b_3$ with a plurality of tire classes $T_{2-1}$-$T_{2-n}$ of a run-flat tire species $T_2$ in order to discover the sidewall stiffness characteristics of each tire class $T_{2-1}$-$T_{2-n}$ of the run-flat tire species $T_2$. Firstly, in an example, the technician may selectively maintain the temperature (see, e.g., ##° F.) and/or humidity (see, e.g., ##%) within a test lab by selectively-adjusting one or more of the thermostat 108 and the humidistat 110. The ambient temperature sensor 104 and the ambient humidity sensor 106 may then communicate the sensed temperature ##° F. and humidity ##% to the tire characteristic database 75. Then, as will be described in the following disclosure, the technician or scientist may study the sidewall stiffness characteristics of each tire class $T_{2-1}$-$T_{2-n}$ of the run-flat tire species $T_2$ at the maintained temperature ##° F. and/or humidity setting ##% by, for example: utilizing the exemplary tire characteristic determination devices $102b_1$, $102b_2$, $102b_3$ for (1) pushing or pulling the engaged portion of a tire class $T_{2-1}$, $T_{2-2}$, $T_{2-3}$, $T_{2-4}$, $T_{2-5}$ ... $T_{2-n}$ with a specific amount of force $F_1$, $F_2$, $F_3$, $F_4$, $F_5$ ... $F_n$ or (2) pushing or pulling the engaged portion of the tire class $T_{2-1}$, $T_{2-2}$, $T_{2-3}$, $T_{2-4}$, $T_{2-5}$ ... $T_{2-n}$ at a specific displacement distance $D_1$, $D_2$, $D_3$, $D_4$, $D_5$ ... $D_n$; thereafter, as a result of discovering the sidewall stiffness characteristics of each tire class $T_{2-1}$-$T_{2-n}$ of the run-flat tire species $T_2$ resulting from the applied forces $F_1$, $F_2$, $F_3$, $F_4$, $F_5$ ... $F_n$ or displacement distances $D_1$, $D_2$, $D_3$, $D_4$, $D_5$ ... $D_n$, the technician or scientist may, for example, empirically populate the data look-up table 175 of the tire characteristic database 75 with tire-engaging data $XYZ_1$-$XYZ_n$ corresponding to the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that is/are to be imparted by the one or more tire-engaging components 150.

Referring to FIGS. $2B_1$, $2B_2$, $2B_3$, the exemplary tire characteristic determination devices $102b_1$, $102b_2$, $102b_3$ are respectively shown. Each tire characteristic determination device $102b_1$, $102b_2$, $102b_3$ includes a tire-engaging test probe 112b, an actuator 114b, a computing resource 116b and at least one clamping pad $136b_1$, $136b_2$, which will be described in greater detail in the following disclosure at FIGS. $3B_1$, $3B_2$, $3B_3$. The computing resource 116b is communicatively-coupled to the actuator 114b, and the actuator 114b is connected to the tire-engaging test probe 112b.

The computing resource 116b may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 116b may be communicatively-coupled (e.g., wirelessly or hardwired by, for example, one or more communication conduits) to the tire characteristic database 75.

The tire-engaging test probe 112b is substantially similar to the tire-engaging test probe 112b described above. In some examples, the tire-engaging test probe 112b includes an arcuate shaped (as seen more clearly in each of, e.g., FIGS. $3B_1$, $3B_2$, $3B_3$) tire-engaging member 118b that may be generally defined by a C-shaped or U-shaped cross-sectional geometry (as seen more clearly in, e.g., FIGS. $4B_1$-$4B_3$). With reference to FIGS. $2B_1$-$2B_3$, the tire-engaging member 118b may include an upper portion 120b and a lower portion 122b that are connected by an intermediate portion 124b. As similarly described above at FIG. 2A, each of the upper portion 120b, the lower portion 122b and the intermediate portion 124b is defined by an inner surface $120b_I$, $122b_I$, $124b_I$ and an outer surface $120b_O$, $122b_O$, $124b_O$. The inner surface $120b_I$, $122b_I$, $124b_I$ of the upper portion 120b, the lower portion 122b and the intermediate portion 124b collectively define a tire-portion-receiving cavity 128b.

Referring to each of FIGS. $3B_1$, $3B_2$, $3B_3$, top views are shown, illustrating an exemplary arrangement of the tire characteristic determination devices $102b_1$, $102b_2$, $102b_3$ about the tire T. As seen in FIGS. $4B_1$-$4B_3$, for each of the tire characteristic determination devices $102b_1$, $102b_2$, $102b_3$, the lower sidewall $T_{SL}$ of the tire T may be arranged adjacent a support surface S (of, for example, a mobile cart or fixed platform of the tire characteristic determination devices $102b_1$, $102b_2$, $102b_3$). Furthermore, as seen in FIGS. $4B_1$-$4B_3$, the tire-engaging test probe 112b of each of the tire characteristic determination devices $102b_1$, $102b_2$, $102b_3$ may be arranged within the upper opening $T_{OU}$ of the tire T such that a portion of the tire T may be arranged within the tire-portion-receiving cavity 128b of the tire-engaging test probe 112b.

When arranged within the upper opening $T_{OU}$ of the tire T as described above, the tire-engaging test probe 112b may engage: (1) a portion of the circumferential upper bead $T_{BU}$ of the tire T, (2) a portion of an outer surface $T_{SU\text{-}O}$ of the upper sidewall $T_{SU}$ of the tire T and (3) a portion an inner surface $T_{SU\text{-}I}$ of the upper sidewall $T_{SU}$ of the tire T. In some instances, at least a portion of the inner surface $120b_I$ of the upper portion 120b of the tire-engaging test probe 112b, at least a portion of the inner surface $122b_I$ of the lower portion 122b of the tire-engaging test probe 112b and the inner surface $124b_I$ of the intermediate portion 124b of the tire-engaging test probe 112b may engage: (1) a portion of an upper surface $T_{BU\text{-}O}$, of the circumferential upper bead $T_{BU}$ of the tire T, (2) a portion of a lower surface $T_{BU\text{-}L}$, of the circumferential upper bead $T_{BU}$ of the tire T, and (3) a portion of a side surface $T_{BU\text{-}S}$, of the circumferential upper bead $T_{BU}$ of the tire T that connects the upper surface $T_{BU\text{-}O}$, of the circumferential upper bead $T_{BU}$ of the tire T to the lower surface $T_{BU\text{-}L}$, of the circumferential upper bead $T_{BU}$ of the tire T. Furthermore, in some examples, at least a portion of the inner surface $120b_I$ of the upper portion 120b of the tire-engaging test probe 112b may engage the outer surface $T_{SU\text{-}O}$ of the upper sidewall $T_{SU}$ of the tire T. Yet even further, in some instances, at least a portion of the inner surface $122b_I$ of the lower portion 122b of the tire-engaging test probe 112b may engage the inner surface $T_{SU\text{-}I}$ of the upper sidewall $T_{SU}$ of the tire T.

As seen in FIGS. $2B_1$, $2B_2$, $2B_3$, $3B_1$, $3B_2$, $3B_3$ and $4B_1$-$4B_3$, each of the tire characteristic determination devices $102b_1$, $102b_2$, $102b_3$ may further include a shaft 130b extending away from the outer surface $120b_O$ of the upper portion 120b of the tire-engaging test probe 112b. In an example, a distal end $130b_D$ of the shaft 130b may be connected to the outer surface $120b_O$ of the upper portion 120b of the tire-engaging test probe 112b and a proximal end $130b_P$ of the shaft 130b may be connected to the actuator 114b.

Furthermore, as seen in each of FIGS. $2B_1$, $2B_2$, $2B_3$, $3B_1$, $3B_2$, $3B_3$ and $4B_1$-$4B_3$, each of the tire characteristic determination devices $102b_1$, $102b_2$, $102b_3$ may further include at least one clamping pad $136b_1$ (see, e.g., FIGS. $2B_1$, $2B_2$, $2B_3$, $3B_1$, $3B_2$, $3B_3$), $136b_2$ (see, e.g., FIGS. $2B_2$, $3B_2$). As seen in FIGS. $3B_1$, $3B_2$, $3B_3$ and $4B_1$-$4B_3$, the at least one clamping pad $136b_1$, $136b_2$ is arranged for engagement adjacent the upper sidewall $T_{SU}$ of the tire T.

As seen in FIG. 3B$_1$, the tire characteristic determination devices 102b$_1$ includes one clamping pad 136b$_1$. As seen in FIG. 3B$_2$, the tire characteristic determination devices 102b$_2$ includes two clamping pads 136b$_1$, 136b$_2$. As seen in FIG. 3B$_3$, the tire characteristic determination devices 102b$_3$ includes one clamping pad 136b$_1$.

Referring to FIGS. 2B$_1$, 2B$_2$, 2B$_3$, each clamping pad 136b$_1$, 136b$_2$ is connected to a shaft 138b extending away from an upper surface 140b$_O$ of an upper portion 140b of the each clamping pad 136b$_1$, 136b$_2$. In an example, a distal end 138b$_D$ of the shaft 138b may be connected to the upper surface 140b$_O$ of the upper portion 140b of each clamping pad 136b$_1$, 136b$_2$ and a proximal end 138b$_P$ of the shaft 138b may be connected to the actuator 114b.

Referring to FIG. 3B$_1$, the one clamping pad 136b$_1$ is defined by a width dimension that is substantially similar to a width dimension of the tire-engaging member 118b. Furthermore, both of the one clamping pad 136b$_1$ and the tire-engaging member 118b are arranged at approximately a "12 o'clock position" relative to the tire T.

Referring to FIG. 3B$_2$, each of the first clamping pad 136b$_1$ and the second clamping pad 136b$_2$ are defined by a width dimension that is substantially similar to a width dimension of the tire-engaging member 118b. Furthermore, (1) the tire-engaging member 118b is arranged at approximately a "12 o'clock position", (2) the first clamping pad 136b$_1$ is arranged at approximately a "3 o'clock position" relative to the tire T and (3) the second clamping pad 136b$_2$ is arranged at approximately a "9 o'clock position" relative to the tire T.

Referring to FIG. 3B$_3$, the one clamping pad 136b$_1$ is defined an arcuate dimension that is sized for engaging approximately half of the upper sidewall T$_{SU}$ of the tire T. Furthermore, (1) the tire-engaging member 118b is arranged at approximately a "12 o'clock position" and (2) the one clamping pad 136b$_1$ having the arcuate dimension is arranged about the upper sidewall T$_{SU}$ of the tire T from about approximately a "3 o'clock position" to about approximately a "9 o'clock position" relative to the tire T.

After arranging the tire-engaging test probe 112b about the tire T such that the above-described surface portions of the tire T are arranged within the tire-portion-receiving cavity 128b of tire-engaging test probe 112b, the computing resource 116b may send a signal to the actuator 114b in order to impart movement to the at least one clamping pad 136b$_1$, 136b$_2$ for arranging a lower surface 142b$_I$ (see, e.g., FIGS. 4B$_1$-4B$_3$) of a lower portion 142b of each clamping pad 136b$_1$, 136b$_2$ adjacent the upper sidewall T$_{SU}$ of the tire T. Upon disposing the lower surface 142b$_I$ of a lower portion 142b of each clamping pad 136b$_1$, 136b$_2$ adjacent the upper sidewall T$_{SU}$ of the tire T, the tire T is spatially clamped or retained between the each clamping pad 136b$_1$, 136b$_2$ and the support surface S.

Before or after clamping the tire T between each clamping pad 136b$_1$, 136b$_2$ and the support surface S, the computing resource 116b may send a signal to the actuator 114b in order to impart or urge movement to the shaft 130b that will result in corresponding movement to the tire-engaging test probe 112b. The direction of the imparted movement to the tire-engaging test probe 112b may be substantially orthogonal and toward (see, e.g., arrow X in FIG. 4B$_2$) or away from (see, e.g., arrow X' in FIG. 4B$_3$) the upper sidewall T$_{SU}$ of the tire T. When the movement imparted to the tire-engaging test probe 112b is in a first, "pushing" direction (see, e.g., arrow X in FIG. 4B$_2$), the inner surface 120b$_I$ of the upper portion 120b of the tire-engaging test probe 112b is pushed into for direct engagement with the outer surface T$_{SU-O}$ of the upper sidewall T$_{SU}$ of the tire T. Conversely, when the movement imparted to the tire-engaging test probe 112b is in a second, "pulling" direction (see, e.g., arrow X' in FIG. 4B$_3$, which is opposite the first, "pulling" direction, X), the inner surface 122b$_I$ of the lower portion 122b of the tire-engaging test probe 112b is pulled into for direct engagement with the inner surface T$_{SU-I}$ of the upper sidewall T$_{SU}$ of the tire T.

In some examples, the computing resource 116b may send a signal to the actuator 114b for causing the tire-engaging test probe 112b to push or pull the engaged portion of the tire T with a specific amount of force (see, e.g., F$_X$/F$_X$', which corresponds to F$_1$, F$_2$, F$_3$, F$_4$, F$_5$ . . . F$_n$ in the data look-up table 175 of FIG. 8). A sensor 132b (e.g., a displacement sensor, which may be, for example, an imaging device) may be communicatively-coupled to the computing resource 116b for determining a displacement distance (see, e.g., D$_X$/D$_X$', which corresponds to D$_1$, D$_2$, D$_3$, D$_4$, D$_5$ . . . D$_n$ in the data look-up table 175 of FIG. 8) that the tire-engagement test probe 112b was moved (as a result of the resistance arising from the sidewall stiffness characteristic of the upper sidewall T$_{SU}$ of the tire T). The sensor 132b may then communicate the determined displacement distance D$_X$/D$_X$' to the computing resource 116b. The above process may be repeated by increasing or decreasing the amount of imparted force F$_X$/F$_X$' for determining corresponding displacement distances D$_X$/D$_X$'. The computing resource 116b may then communicate the imparted forces F$_X$/F$_X$' and corresponding displacement distances D$_X$/D$_X$' of the tire T to the tire characteristic database 75.

In another example, the computing resource 116b may send a signal to the actuator 114b for causing the tire-engaging test probe 112b to push or pull the engaged portion of the tire T at a specific displacement distance (see, e.g., D$_X$/D$_X$', which corresponds to D$_1$, D$_2$, D$_3$, D$_4$, D$_5$ . . . D$_n$ in the data look-up table 175 of FIG. 8). The actuator 114b may include a sensor 134b such as, for example, a force sensor) for determining an amount of force (see, e.g., F$_X$/F$_X$', which corresponds to F$_1$, F$_2$, F$_3$, F$_4$, F$_5$ . . . F$_n$ in the data look-up table 175 of FIG. 8) that was required for moving the tire-engagement test probe 112b at the specified displacement distance D$_X$/D$_X$' (as a result of the resistance arising from the sidewall stiffness characteristic of the upper sidewall T$_{SU}$ of the tire T). The sensor 134b may then communicate the determined amount of force F$_X$/F$_X$' to the computing resource 116b. The above process may be repeated by increasing or decreasing the amount of specified displacement distance D$_X$/D$_X$' for determining corresponding imparted force amounts F$_X$/F$_X$'. The computing resource 116b may then communicate the specified displacement distances D$_X$/D$_X$' and corresponding force amounts F$_X$/F$_X$' imparted to the tire T to the tire characteristic database 75.

In yet another example, with reference to FIGS. 2C and 8, a technician or scientist may populate a data look-up table 175 by interfacing an exemplary tire characteristic determination device 102c with a plurality of tire classes T$_{2-1}$-T$_{2-n}$ of a run-flat tire species T$_2$ in order to discover the sidewall stiffness characteristics of each tire class T$_{2-1}$-T$_{2-n}$ of the run-flat tire species T$_2$. Firstly, in an example, the technician may selectively maintain the temperature (see, e.g., ##° F.) and/or humidity (see, e.g., ##%) within a test lab by selectively-adjusting one or more of the thermostat 108 and the humidistat 110. The ambient temperature sensor 104 and the ambient humidity sensor 106 may then communicate the sensed temperature ##° F. and humidity ##% to the tire characteristic database 75. Then, as will be described in the following disclosure, the technician or scientist may study the sidewall stiffness characteristics of each tire class $T_{2-1}$-$T_{2-n}$ of the run-flat tire species $T_2$ at the maintained temperature ##° F. and/or humidity setting ##% by, for example: utilizing the exemplary tire characteristic determination device 102c for (1) pushing the engaged portion of a tire class $T_{2-1}$, $T_{2-2}$, $T_{2-3}$, $T_{2-4}$, $T_{2-5}$ . . . $T_{2-n}$ with a specific amount of force $F_1$, $F_2$, $F_3$, $F_4$, $F_5$ . . . $F_n$ or (2) pushing the engaged portion of the tire class $T_{2-1}$, $T_{2-2}$, $T_{2-3}$, $T_{2-4}$, $T_{2-5}$ . . . $T_{2-n}$ at a specific displacement distance $D_1$, $D_2$, $D_3$, $D_4$, $D_5$ . . . $D_n$; thereafter, as a result of discovering the sidewall stiffness characteristics of each tire class $T_{2-1}$-$T_{2-n}$ of the run-flat tire species $T_2$ resulting from the applied forces $F_1$, $F_2$, $F_3$, $F_4$, $F_5$ . . . $F_n$ or displacement distances $D_1$, $D_2$, $D_3$, $D_4$, $D_5$ . . . $D_n$, the technician or scientist may, for example, empirically populate the data look-up table 175 of the tire characteristic database 75 with tire-engaging data $XYZ_1$-$XYZ_n$ corresponding to the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that is/are to be imparted by the one or more tire-engaging components 150.

Referring to FIG. 2C, the exemplary tire characteristic determination device 102c includes a tire-engaging test probe 112c, an actuator 114c and a computing resource 116c. The computing resource 116c is communicatively-coupled to the actuator 114c and the actuator 114c is connected to the tire-engaging test probe 112c.

The computing resource 116c may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 116c may be communicatively-coupled (e.g., wirelessly or hardwired by, for example, one or more communication conduits) to the tire characteristic database 75.

The tire-engaging test probe 112c includes a cylindrically-shaped tire-sidewall-engaging member 118c. The tire-engaging member 118c may include a distal end $118c_D$ and a proximal end $118c_P$. The distal end $118c_D$ may include a spherically-shaped tire-sidewall-engaging surface 144c that engages the upper sidewall $T_{SU}$ of the tire T. The proximal end $118c_P$ May be Connected to the Actuator 114c.

Referring to FIG. 3C, a top view is shown, illustrating an exemplary arrangement of the tire characteristic determination device 102c about the upper sidewall $T_{SU}$ of tire T. As seen in FIGS. $4C_1$-$4C_2$, the lower sidewall $T_{SL}$ of the tire T may be arranged adjacent a support surface S (of, for example, a mobile cart or fixed platform of the tire characteristic determination device 102c).

Referring to FIG. $4C_1$, after arranging the tire-engaging test probe 112c about the tire T such that the spherically-shaped tire-sidewall-engaging surface 144c is located in an opposing relationship with respect to the upper sidewall $T_{SU}$ of the tire T, the computing resource 116c may send a signal to the actuator 114c in order to impart movement to the tire-engaging test probe 112c. The direction of the imparted movement to the tire-engaging test probe 112c may be substantially orthogonal and toward (see, e.g., arrow X in FIG. $4C_2$) the upper sidewall $T_{SU}$ of the tire T. When the movement imparted to the tire-engaging test probe 112c is in this "pushing" direction, the spherically-shaped tire-sidewall-engaging surface 144c of the tire-engaging test probe 112c is pushed into for direct engagement with the upper sidewall $T_{SU}$ of the tire T.

In some examples, the computing resource 116c may send a signal to the actuator 114c for causing the tire-engaging test probe 112c to push the engaged portion of the tire T with a specific amount of force (see, e.g., $F_X$, which corresponds to $F_1$, $F_2$, $F_3$, $F_4$, $F_5$ . . . $F_n$ in the data look-up table 175 of FIG. 8). A sensor 132c (e.g., a displacement sensor, which may be, for example, an imaging device) may be communicatively-coupled to the computing resource 116c for determining a displacement distance (see, e.g., $D_X$, which corresponds to $D_1$, $D_2$, $D_3$, $D_4$, $D_5$ . . . $D_n$ in the data look-up table 175 of FIG. 8) that the tire-engagement test probe 112c was moved (as a result of the resistance arising from the sidewall stiffness characteristic of the upper sidewall $T_{SU}$ of the tire T). The sensor 132c may then communicate the determined displacement distance $D_X$ to the computing resource 116c. The above process may be repeated by increasing or decreasing the amount of imparted force $F_X$ for determining corresponding displacement distances $D_X$. The computing resource 116c may then communicate the imparted forces $F_X$ and corresponding displacement distances $D_X$ of the tire T to the tire characteristic database 75.

In another example, the computing resource 116c may send a signal to the actuator 114c for causing the tire-engaging test probe 112c to push the engaged portion of the tire T at a specific displacement distance (see, e.g., $D_X$, which corresponds to $D_1$, $D_2$, $D_3$, $D_4$, $D_5$ . . . $D_n$ in the data look-up table 175 of FIG. 8). The actuator 114c may include a sensor 134c such as, for example, a force sensor) for determining an amount of force (see, e.g., $F_X$, which corresponds to $F_1$, $F_2$, $F_3$, $F_4$, $F_5$ . . . $F_n$ in the data look-up table 175 of FIG. 8) that was required for moving the tire-engagement test probe 112c at the specified displacement distance $D_X$ (as a result of the resistance arising from the sidewall stiffness characteristic of the upper sidewall $T_{SU}$ of the tire T). The sensor 134c may then communicate the determined amount of force $F_X$ to the computing resource 116c. The above process may be repeated by increasing or decreasing the amount of specified displacement distance $D_X$ for determining corresponding imparted force amounts $F_X$. The computing resource 116c may then communicate the specified displacement distances $D_X$ and corresponding force amounts $F_X$ imparted to the tire T to the tire characteristic database 75.

In another example, with reference to FIGS. 2D and 8, a technician or scientist may populate a data look-up table 175 by interfacing an exemplary tire characteristic determination device 102d with a plurality of tire classes $T_{2-1}$-$T_{2-n}$ of a run-flat tire species $T_2$ in order to discover the sidewall stiffness characteristics of each tire class $T_{2-1}$-$T_{2-n}$ of the run-flat tire species $T_2$. Firstly, in an example, the technician may selectively maintain the temperature (see, e.g., ##° F.) and/or humidity (see, e.g., ##%) within a test lab by selectively-adjusting one or more of the thermostat 108 and the humidistat 110. The ambient temperature sensor 104 and the ambient humidity sensor 106 may then communicate the sensed temperature ##° F. and humidity ##% to the tire characteristic database 75. Then, as will be described in the following disclosure, the technician or scientist may study the sidewall stiffness characteristics of each tire class $T_{2-1}$-$T_{2-n}$ of the run-flat tire species $T_2$ at the maintained temperature ##° F. and/or humidity setting ##% by, for example: utilizing the exemplary tire characteristic determination device 102d for (1) pushing the engaged portion of a tire class $T_{2-1}$, $T_{2-2}$, $T_{2-3}$, $T_{2-4}$, $T_{2-5}$ . . . $T_{2-n}$ with a specific amount of force $F_1$, $F_2$, $F_3$, $F_4$, $F_5$ . . . $F_n$ or (2) pushing the engaged portion of the tire class $T_{2-1}$, $T_{2-2}$, $T_{2-3}$, $T_{2-4}$, $T_{2-5}$ . . . $T_{2-n}$ at a specific displacement distance $D_1$, $D_2$, $D_3$, $D_4$, $D_5$ . . . $D_n$; thereafter, as a result of discovering the sidewall stiffness characteristics of each tire class $T_{2-1}$-$T_{2-n}$ of the run-flat tire species $T_2$ resulting from the applied forces $F_1, F_2, F_3, F_4, F_5 \ldots F_n$ or displacement distances $D_1, D_2, D_3, D_4, D_5 \ldots D_n$, the technician or scientist may, for example, empirically populate the data look-up table 175 of the tire characteristic database 75 with tire-engaging data $XYZ_1\text{-}XYZ_n$ corresponding to the one or more tire-engaging values $X_{150a1}, Y_{150a1}, Z_{150a1}; X_{150a2}, Y_{150a2}', Z_{150a2}; X_{150b1}', Z_{150b1}; X_{150b2}', Z_{150b2}; X_{150c}'$ that is/are to be imparted by the one or more tire-engaging components 150.

Referring to FIG. 2D, the exemplary tire characteristic determination device 102d includes a tire-engaging test probe 112d, an actuator 114d and a computing resource 116d. The computing resource 116d is communicatively-coupled to the actuator 114d and the actuator 114d is connected to the tire-engaging test probe 112d.

The computing resource 116d may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 116d may be communicatively-coupled (e.g., wirelessly or hardwired by, for example, one or more communication conduits) to the tire characteristic database 75.

The tire-engaging test probe 112d includes a disk-shaped tire-sidewall-engaging member 118d and a shaft 130d. The shaft 130d may include a distal end $130d_D$ and a proximal end $130d_P$. The distal end 130b of the shaft 130d is connected to an upper surface $118d_U$ of the disk-shaped tire-sidewall-engaging member 118d. The proximal end $130d_P$ of the shaft may be connected to the actuator 114d. The disk-shaped tire-sidewall-engaging member 118d is sized to include a diameter $D_{118d}$ that is sufficient for permitting a lower surface $118d_L$ of disk-shaped tire-sidewall-engaging member 118d to circumferentially engage the upper sidewall $T_{SU}$ of the tire T.

Referring to FIG. 3D, a top view is shown, illustrating an exemplary arrangement of the tire characteristic determination device 102d circumferentially about the upper sidewall $T_{SU}$ of tire T. As seen in FIGS. $4D_1$-$4D_2$, the lower sidewall $T_{SL}$ of the tire T may be arranged adjacent a support surface S (of, for example, a mobile cart or fixed platform of the tire characteristic determination device 102d).

Referring to FIG. $4D_1$, after arranging the tire-engaging test probe 112d about the tire T such that the lower surface $118d_L$ of disk-shaped tire-sidewall-engaging member 118d is located in an opposing relationship with respect to the upper sidewall $T_{SU}$ of the tire T, the computing resource 116d may send a signal to the actuator 114d in order to impart movement to the tire-engaging test probe 112d. The direction of the imparted movement to the tire-engaging test probe 112d may be substantially orthogonal and toward (see, e.g., arrow X in FIG. $4D_2$) the upper sidewall $T_{SU}$ of the tire T. When the movement imparted to the tire-engaging test probe 112d is in this "pushing" direction, the lower surface $118d_L$ of disk-shaped tire-sidewall-engaging member 118d of the tire-engaging test probe 112d is pushed into for direct engagement with the upper sidewall $T_{SU}$ of the tire T.

In some examples, the computing resource 116d may send a signal to the actuator 114d for causing the tire-engaging test probe 112d to push the engaged portion of the tire T with a specific amount of force (see, e.g., $F_X$, which corresponds to $F_1, F_2, F_3, F_4, F_5 \ldots F_n$ in the data look-up table 175 of FIG. 8). A sensor 132d (e.g., a displacement sensor, which may be, for example, an imaging device) may be communicatively-coupled to the computing resource 116d for determining a displacement distance (see, e.g., $D_X$, which corresponds to $D_1, D_2, D_3, D_4, D_5 \ldots D_n$ in the data look-up table 175 of FIG. 8) that the tire-engagement test probe 112d was moved (as a result of the resistance arising from the sidewall stiffness characteristic of the upper sidewall $T_{SU}$ of the tire T). The sensor 132d may then communicate the determined displacement distance $D_X$ to the computing resource 116d. The above process may be repeated by increasing or decreasing the amount of imparted force $F_X$ for determining corresponding displacement distances $D_X$. The computing resource 116d may then communicate the imparted forces and corresponding displacement distances of the tire T to the tire characteristic database 75.

In another example, the computing resource 116d may send a signal to the actuator 114d for causing the tire-engaging test probe 112d to push the engaged portion of the tire T at a specific displacement distance (see, e.g., $D_X$, which corresponds to $D_1, D_2, D_3, D_4, D_5 \ldots D_n$ in the data look-up table 175 of FIG. 8). The actuator 114d may include a sensor 134d such as, for example, a force sensor) for determining an amount of force (see, e.g., $F_X$, which corresponds to $F_1, F_2, F_3, F_4, F_5 \ldots F_n$ in the data look-up table 175 of FIG. 8) that was required for moving the tire-engagement test probe 112d at the specified displacement distance $D_X$ (as a result of the resistance arising from the sidewall stiffness characteristic of the upper sidewall $T_{SU}$ of the tire T). The sensor 134d may then communicate the determined amount of force $F_X$ to the computing resource 116d. The above process may be repeated by increasing or decreasing the amount of specified displacement distance $D_X$ for determining corresponding imparted force amounts $F_X$. The computing resource 116d may then communicate the specified displacement distances $D_X$ and corresponding force amounts $F_X$ imparted to the tire T to the tire characteristic database 75.

In yet another example, with reference to FIGS. 2E and 8, a technician or scientist may populate a data look-up table 175 by interfacing an exemplary tire characteristic determination device 102e with a plurality of tire classes $T_{2-1}\text{-}T_{2-n}$ of a run-flat tire species $T_2$ in order to discover the sidewall stiffness characteristics of each tire class $T_{2-1}\text{-}T_{2-n}$ of the run-flat tire species $T_2$. Firstly, in an example, the technician may selectively maintain the temperature (see, e.g., ##° F.) and/or humidity (see, e.g., ##%) within a test lab by selectively-adjusting one or more of the thermostat 108 and the humidistat 110. The ambient temperature sensor 104 and the ambient humidity sensor 106 may then communicate the sensed temperature ##° F. and humidity ##% to the tire characteristic database 75. Then, as will be described in the following disclosure, the technician or scientist may study the sidewall stiffness characteristics of each tire class $T_{2-1}\text{-}T_{2-n}$ of the run-flat tire species $T_2$ at the maintained temperature ##° F. and/or humidity setting ##% by, for example: utilizing the exemplary tire characteristic determination device 102e for (1) pushing or pulling the engaged portion of a tire class $T_{2-1}, T_{2-2}, T_{2-3}, T_{2-4}, T_{2-5} \ldots T_{2-n}$ with a specific amount of force $F_1, F_2, F_3, F_4, F_5 \ldots F_n$ or (2) pushing or pulling the engaged portion of the tire class $T_{2-1}, T_{2-2}, T_{2-3}, T_{2-4}, T_{2-5} \ldots T_{2-n}$ at a specific displacement distance $D_1, D_2, D_3, D_4, D_5 \ldots D_n$; thereafter, as a result of discovering the sidewall stiffness characteristics of each tire class $T_{2-1}\text{-}T_{2-n}$ of the run-flat tire species $T_2$ resulting from the applied forces $F_1, F_2, F_3, F_4, F_5 \ldots F_n$ or displacement distances $D_1, D_2, D_3, D_4, D_5 \ldots D_n$, the technician or scientist may, for example, empirically populate the data look-up table 175 of the tire characteristic database 75 with tire-engaging data $XYZ_1\text{-}XYZ_n$ corresponding to the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that is/are to be imparted by the one or more tire-engaging components 150.

Referring to FIG. 2E, the exemplary tire characteristic determination device 102e includes a tire-engaging test probe 112e, an actuator 114e and a computing resource 116e. The computing resource 116e is communicatively-coupled to the actuator 114e and the actuator 114e is connected to the tire-engaging test probe 112e.

The computing resource 116e may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 116e may be communicatively-coupled (e.g., wirelessly or hardwired by, for example, one or more communication conduits) to the tire characteristic database 75.

The tire-engaging test probe 112e includes an arcuate shaped (as seen more clearly in, e.g., FIG. 3E) tire-engaging member 118e that may be generally defined by a C-shaped or U-shaped cross-sectional geometry (as seen more clearly in, e.g., FIG. $4E_1$-$4E_4$). Referring to FIG. 2E, the tire-engaging member 118e may include an upper portion 120e and a lower portion 122e that are connected by an intermediate portion 124e. Each of the upper portion 120e, the lower portion 122e and the intermediate portion 124e is defined by an inner surface $120e_I$, $122e_I$, $124e_I$ and an outer surface $120e_O$, $122e_O$, $124e_O$. The inner surface $120e_I$, $122e_I$, $124e_I$ of the upper portion 120e, the lower portion 122e and the intermediate portion 124e collectively define a tire-portion-receiving cavity 128e. Furthermore, a portion of the inner surface $120e_I$ proximate a distal end $120e_D$ of the upper portion 120e may define a toothed portion 146e that may be utilized for increasing a frictional engagement with the an outer surface $T_{SU-O}$ of the upper sidewall $T_{SU}$ of the tire T.

Referring to FIG. 3E, a top view is shown, illustrating an exemplary arrangement of the tire characteristic determination device 102e about the tire T. As seen in FIGS. $4E_1$-$4E_4$, the lower sidewall $T_{SL}$ of the tire T may be arranged adjacent a support surface S (of, for example, a mobile cart or fixed platform of the tire characteristic determination device 102e). Furthermore, as seen in FIGS. $4E_1$-$4E_4$, the tire-engaging test probe 112e may be arranged within the upper opening $T_{OU}$ of the tire T such that a portion of the tire T may be arranged within the tire-portion-receiving cavity 128e of the tire-engaging test probe 112e.

When arranged within the upper opening $T_{OU}$ of the tire T as described above, the tire-engaging test probe 112e may engage: (1) a portion of the circumferential upper bead $T_{BU}$ of the tire T, (2) a portion of an outer surface $T_{SU-O}$ of the upper sidewall $T_{SU}$ of the tire T and (3) a portion an inner surface $T_{SU-I}$ of the upper sidewall $T_{SU}$ of the tire T. In some instances, at least a portion of the inner surface $120e_I$ of the upper portion 120e of the tire-engaging test probe 112e, at least a portion of the inner surface $122e_I$ of the lower portion 122e of the tire-engaging test probe 112e and the inner surface $124e_I$ of the intermediate portion 124e of the tire-engaging test probe 112e may engage: (1) a portion of an upper surface $T_{BU-O}$, of the circumferential upper bead $T_{BU}$ of the tire T, (2) a portion of a lower surface $T_{BU-L}$, of the circumferential upper bead $T_{BU}$ of the tire T, and (3) a portion of a side surface $T_{BU-S}$, of the circumferential upper bead $T_{BU}$ of the tire T that connects the upper surface $T_{BU-O}$, of the circumferential upper bead $T_{BU}$ of the tire T to the lower surface $T_{BU-L}$, of the circumferential upper bead $T_{BU}$ of the tire T. Furthermore, in some examples, at least a portion of the inner surface $120e_I$ of the upper portion 120e of the tire-engaging test probe 112e may engage the outer surface $T_{SU-O}$ of the upper sidewall $T_{SU}$ of the tire T. Yet even further, in some instances, at least a portion of the inner surface $122e_I$ of the lower portion 122e of the tire-engaging test probe 112e may engage the inner surface $T_{SU-I}$ of the upper sidewall $T_{SU}$ of the tire T.

As seen in FIGS. 2E, 3E and $4E_1$-$4E_4$, the tire characteristic determination device 102e may further include a shaft 130e extending away from the outer surface $120e_O$ (see, e.g., FIG. 2E) of the upper portion 120e of the tire-engaging test probe 112e. Furthermore, the shaft 130e may be hingedly-connected to the tire-engaging test probe 112e such that the tire-engaging member 118e may freely rotate R about an axis $A_{118e}$-$A_{118e}$ extending through the tire-engaging member 118e. The axis $A_{118e}$-$A_{118e}$ extending through the tire-engaging member 118e may be substantially orthogonal to an axis $A_{130e}$-$A_{130e}$ extending through the shaft 130e. In an example, a distal end $130e_D$ (see, e.g., FIG. 2E) of the shaft 130e may be connected to a hinged portion 148e of the tire-engaging test probe 112e that is proximate the intermediate portion 124e of the tire-engaging member 118e. Yet even further, a proximal end $130e_P$ (see, e.g., FIGS. $4E_1$-$4E_4$) of the shaft 130e may be connected to the actuator 114e.

After arranging the tire-engaging test probe 112e about the tire T such that the above-described surface portions of the tire T are arranged within the tire-portion-receiving cavity 128e of tire-engaging test probe 112e, the computing resource 116e may send a signal to the actuator 114e in order to impart movement to the shaft 130e that will result in corresponding movement to the tire-engaging test probe 112e. The direction of the imparted movement to the tire-engaging test probe 112e may be substantially orthogonal and toward (see, e.g., arrow X in FIG. $4E_2$) the upper sidewall $T_{SU}$ of the tire T. When the movement imparted to the tire-engaging test probe 112e is in this first "pushing" direction, the inner surface $120e_I$ of the upper portion 120e of the tire-engaging test probe 112e is pushed into for direct engagement with the outer surface $T_{SU-O}$ of the upper sidewall $T_{SU}$ of the tire T. Conversely, the computing resource 116e may send a signal to the actuator 114e in order to impart movement to the shaft 130e that will result in corresponding movement to the tire-engaging test probe 112e in a direction that may be substantially orthogonal and away from (see, e.g., arrow X' in FIG. $4E_4$, which is opposite the direction of the arrow X in FIG. $4E_2$) the upper sidewall $T_{SU}$ of the tire T. When the movement imparted to the tire-engaging test probe 112e is in this first "pulling" direction, the inner surface $122e_I$ of the lower portion 122e of the tire-engaging test probe 112e is pulled into for direct engagement with the inner surface $T_{SU-I}$ of the upper sidewall $T_{SU}$ of the tire T. During the "pushing" or "pulling" movements of the shaft 130e as described above, the tire-engaging member 118e may freely rotate R about the axis $A_{118e}$-$A_{118e}$ extending through the tire-engaging member 118e as a result of the hinged connection described above.

In some examples, the computing resource 116e may send a signal to the actuator 114e for causing the tire-engaging test probe 112e to push or pull the engaged portion of the tire T with a specific amount of force (see, e.g., $F_X/F_X'$, which corresponds to $F_1$, $F_2$, $F_3$, $F_4$, $F_5$ ... $F_n$ in the data look-up table 175 of FIG. 8); the force $F_X/F_X'$ may be quantified in terms of a torque and an angle resulting from the hinged connection of the shaft 130e to the tire-engaging test probe 112e. A sensor 132e (e.g., a displacement sensor, which may be, for example, an imaging device) may be communicatively-coupled to the computing resource 116e for determining a displacement distance (see, e.g., $D_X/D_X'$, which corresponds to $D_1, D_2, D_3, D_4, D_5 \ldots D_n$ in the data look-up table 175 of FIG. 8) that the tire-engagement test probe 112e was moved (as a result of the resistance arising from the sidewall stiffness characteristic of the upper sidewall $T_{SU}$ of the tire T). The sensor 132e may then communicate the determined displacement distance $D_X/D_X'$ to the computing resource 116e. The above process may be repeated by increasing or decreasing the amount of imparted force $F_X/F_X'$ for determining corresponding displacement distances $D_X/D_X'$. The computing resource 116e may then communicate the imparted forces $F_X/F_X'$ and corresponding displacement distances $D_X/D_X'$ of the tire T to the tire characteristic database 75.

In another example, the computing resource 116e may send a signal to the actuator 114e for causing the tire-engaging test probe 112e to push the engaged portion of the tire T at a specific displacement distance (see, e.g., $D_X/D_X'$, which corresponds to $D_1, D_2, D_3, D_4, D_5 \ldots D_n$ in the data look-up table 175 of FIG. 8). The actuator 114e may include a sensor 134e such as, for example, a force sensor) for determining an amount of force (see, e.g., $F_X/F_X'$, which corresponds to $F_1, F_2, F_3, F_4, F_5 \ldots F_n$ in the data look-up table 175 of FIG. 8) that was required for moving the tire-engagement test probe 112e at the specified displacement distance $D_X/D_X'$ (as a result of the resistance arising from the sidewall stiffness characteristic of the upper sidewall $T_{SU}$ of the tire T); the force $F_X/F_X'$ may be quantified in terms of a torque and an angle resulting from the hinged connection of the shaft 130e to the tire-engaging test probe 112e. The sensor 134e may then communicate the determined amount of force $F_X/F_X'$ to the computing resource 116e. The above process may be repeated by increasing or decreasing the amount of specified displacement distance $D_X/D_X'$ for determining corresponding imparted force amounts $F_X/F_X'$. The computing resource 116e may then communicate the specified displacement distances $D_X/D_X'$ and corresponding force amounts $F_X/F_X'$ imparted to the tire T to the tire characteristic database 75.

Referring to FIGS. 5A-6A, an exemplary tire-wheel assembly manufacturing system 10 is shown including a plurality of processing sub-stations 10a-10h. The tire-wheel assembly manufacturing system 10 including the plurality of processing sub-stations 10a-10h is also generally represented as a box in FIG. 1, as described above. Regarding the view of FIG. 6A, the sub-station 10b is represented in a top view but shown next to the sub-station 10a due to the fact that the sub-station 10a would obscure the sub-station 10b from a true top view representation.

The sub-station 10a may be utilized for preparing a tire T prior to a subsequent processing act conducted by one or more of the sub-stations 10c-10h for forming a tire-wheel assembly TW. The "preparing" act conducted by the sub-station 10a may include lubricating the tire T with a lubricant (e.g., a soap) in order to reduce friction between the tire T and a wheel W during subsequent mounting steps at sub-stations 10c, 10d.

The sub-station 10b may be utilized for "preparing" a wheel W prior to a subsequent processing act conducted by one or more of the sub-stations 10c-10h for forming a tire-wheel assembly TW. The "preparing" act conducted by the sub-station 10b may include lubricating the wheel W with a lubricant (e.g., a soap) in order to reduce friction between the wheel W and the tire T during subsequent mounting steps at sub-stations 10c, 10d.

The sub-stations 10c-10d may be utilized for processing a tire-wheel assembly TW. The "processing" act conducted by the sub-stations 10c and 10d may include the act of "joining" or "mounting" a tire T to a wheel W for forming an un-inflated tire-wheel assembly TW; the act of "joining" or "mounting" may mean to physically couple, connect or marry the tire T and wheel W such that the wheel W may be referred to as a male portion that is inserted into a passage $T_P$ of the tire T being a female portion.

The "processing" act conducted by the sub-station 10e may include the act of "inflating" the tire-wheel assembly TW; the act of "inflating" may include directing air into the circumferential air cavity $T_{AC}$ of the tire T of the tire-wheel assembly TW. As a result of the act of "inflating," the upper bead $T_{BU}$ and the lower bead $T_{BL}$ of the tire T may be disposed (or "seated") adjacent the upper bead seat $W_{SU}$ and the lower bead seat $W_{SL}$ of the wheel W.

The "processing" act conducted by the sub-station 10f may include the act of "exercising" the tire T relative the wheel W in order to fully seat the upper bead $T_{BU}$ and the lower bead $T_{BL}$ of the tire T adjacent the upper bead seat $W_{SU}$ and the lower bead seat $W_{SL}$ of the wheel W respectively. In some circumstances, entrapments E (see, e.g., FIG. 12A) such as, for example: air bubbles, lubricant/soap, impurities or the like may be undesirably located between a bead $T_{BU}/T_{BL}$ of the tire T and the seat $W_{SU}/W_{SL}$ of the wheel W; by "exercising" (which may include one or more of the acts of vibrating, vacuuming, or the like) one or more of the tire T and the wheel W, the entrapments E may be removed/withdrawn from the tire-wheel assembly TW such that one or more of the upper bead $T_{BU}$ and the lower bead $T_{BL}$ of the tire T may be fully seated adjacent one or more of the upper bead seat $W_{SU}$ and the lower bead seat $W_{SL}$ of the wheel W.

The "processing" act conducted by the sub-station 10g may include balancing the inflated tire-wheel assembly TW. The "processing" act conducted by the substation 10h may include testing the uniformity of the balanced tire-wheel assembly TW. The balancing and testing-of-uniformity acts may include determining the un/balance of the inflated tire-wheel assembly TW and adding one or more weights to the tire-wheel assembly TW until the inflated tire-wheel assembly TW is balanced. Any desirable balancing apparatus and uniformity testing apparatus may be utilized for carrying out the above-described processing steps at the sub-stations 10g, 10h.

Referring now to FIGS. 5A-6A, an exemplary embodiment of the tire-wheel assembly manufacturing system 10 is described. The tire T and the wheel W are moved in one direction (i.e., according to the illustrated embodiment, in a forwardly/rightwardly direction, R). The wheel W for example, may move along a linear path $LP_W$ from the sub-station 10b to the sub-station 10c-10h. The tire T may also move along a linear path $LP_T$ from the sub-station 10a to the sub-station 10c; however, the exemplary implementation of the tire-wheel assembly manufacturing system 10 provides for a linear path of the tire T intersecting with and merging into the linear path $LP_W$ of the wheel W by way of the sub-station 10c (see, e.g., FIG. 6B). As a result of the generally linear movement of the tire T and the wheel W at least a portion (see, e.g., sub-stations 10c, 10d) of the tire-wheel assembly manufacturing system 10 may be referred to as a "linear mounter."

The tire-wheel assembly manufacturing system 10 may be operated automatically or manually according to the following implementations. In some embodiments, the tire-wheel assembly manufacturing system 10 may include a controller 12 (e.g., a computing resource, which may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles). The computing resource 116a may be communicatively-coupled (e.g., wirelessly or hardwired by, for example, one or more communication conduits) to, for example, the tire characteristic database 75 and the actuator 114a to permit automatic/automated control over the tire-wheel assembly manufacturing system 10) and one or more motors 14 for actuating and/or causing movement of one or more components of the sub-stations 10a-10h. The controller 12 may be communicatively-coupled (e.g., wirelessly or hardwired) to the one or motors 14 by one or more cable or leads 16. The one or more motors 14 may be connected to the one or more sub-stations 10a-10h by one or more cables or leads 18. Alternatively or in addition to automatic/automated operation by the controller 12, operation of the tire-wheel assembly manufacturing system 10 may result from one or more of a manual, operator input (e.g., by way of a joystick, depression of a button or the like).

As seen in FIGS. 5A and 6A, the sub-station 10a prepares the tire T by depositing a lubricant or soap upon the tire T; accordingly, in an embodiment, the sub-station 10a may be referred to as a tire lubricating sub-station. The tire lubricating sub-station 10a may include a dispenser 20 that sprays or wipes the lubricant or soap upon one or more regions of the tire T such as, for example, the upper bead $T_{BU}$ and the lower bead $T_{BL}$ of the tire T. The tire lubricating sub-station 10a may also include one or more tire rotating devices 22 for rotating the tire T during the lubricating step for the purpose of lubricating one or more regions of the tire T that may not be in the spraying direction or coating reach of the dispenser 20.

The tire lubricating sub-station 10a may also include a tire transporting device 24 for moving the tire T along the linear path $LP_T$ from the tire lubricating sub-station 10a to the substation 10c. The dispenser 20 and the one or more tire rotating devices 22 may be attached to and extend away from the tire transporting device 24.

Referring to FIG. 6A, the tire transporting device 24 may include a central conveyor portion 24a (such as, for example, a conveyor belt) that is flanked by support members 24b. The dispenser 20 and the one or more tire rotating devices 22 are attached to and extend away from the support members 24b.

As seen in FIGS. 5A and 6A, the sub-station 10b prepares the wheel W by depositing a lubricant or soap upon the wheel W; accordingly, in an embodiment, the sub-station 10b may be referred to as a wheel lubricating sub-station. The wheel lubricating sub-station 10b may include a dispenser 26 that showers/sprays or wipes the lubricant or soap upon one or more regions of the wheel W such as, for example, the upper bead seat $W_{SU}$ and the lower bead seat $W_{SL}$ of the wheel W. The wheel lubricating sub-station 10b may also include one or more wheel rotating devices 28 for rotating the wheel W during the lubricating step for the purpose of lubricating one or more regions of the wheel W that are not in the spraying direction or coating reach of the dispenser 26.

The wheel lubricating sub-station 10b may also include a wheel transporting device 30 such as, for example, a transporting platen or cart for moving the wheel W along the linear path $LP_W$ from the wheel lubricating sub-station 10b to the sub-station 10c. The one or more tire rotating devices 28 may be attached to the wheel transporting device 30; in an embodiment, a motor 14 may be arranged underneath the wheel transporting device 30, and, the rotating device 28 may extend away from the motor 14 and through the wheel transporting device 30 such that a distal end (not shown) of the rotating device 28 may be attached to an inner periphery/inner circumference of the wheel W. The dispenser 26 may be attached to and be suspended over the wheel W by a lower surface of the tire transporting device 24.

As seen in FIGS. 5B, 6B and 6B'-6B''', sub-station 10c is shown conducting a processing step that may be referred to as a first mounting step; therefore, the sub-substation 10c may be referred to as a first mounting sub-station 10c. Prior to describing an embodiment of the components of the first mounting sub-station 10c, the orientation of the first mounting sub-station 10c relative to the tire lubricating sub-station 10a and the wheel lubricating substation 10b is described according to an embodiment.

As described above in FIG. 5A, the tire lubricating sub-station 10a and the first mounting sub-station 10c generally define the linear path $LP_T$ of the tire T. The tire-lubricating sub-station 10a is connected to the first mounting sub-station 10c by a pivot joint 32. Additionally, in an embodiment, both of the tire lubricating sub-station 10a and the first mounting sub-station 10c are arranged above the wheel lubricating sub-station 10b at a spaced-apart distance $D_{10}$ such that the linear path $LP_T$ of the tire T and the linear path $LP_W$ of the wheel W are initially parallel and do not intersect with one another.

However, as seen in FIG. 5B, the controller 12 and motor 14 may communicate with the pivot joint 32 in order to permit a portion of the linear path $LP_T$ of the tire T defined by the first mounting sub-station 10c to be temporality interrupted such that the portion of the linear path $LP_T$ of the tire T defined by the first mounting sub-station 10c intersects with the linear path $LP_W$ of the wheel W. Because the linear paths $LP_T$, $LP_W$ of each of the tire T and the wheel W intersect, and, because both of the tire T and the wheel W are moved in one/the same direction (that is forwardly/rightwardly, R), the tire T and the wheel W may be at least partially coupled/joined at the first mounting sub-station 10c. Further, as will be described in the following embodiment, the forwardly/rightwardly R movement imparted to the tire T and the wheel W results in the partial coupling/joining of the tire T and the wheel W without the assistance of spatially manipulatable mounting equipment, such as, for example a robotic arm that is joined to, for example, the wheel W which would spatially move and force the wheel W into the passage $T_P$ of the tire T.

Referring to FIGS. 5A-6B, the first mounting sub-station 10c includes a match-mark imaging camera 34, a microprocessor 36, a tire rotating device 38, a tire-linear-movement interference member 40 and a pair of tire lower sidewall surface support members 42 that are spaced apart by a width $42_W$ (see FIGS. 6A, 6B) that forms a gap 44 (see FIGS. 6A, 6B) between the tire sidewall support members 42. The pivot joint 32 pivotally connects the tire support members 24b of the lubricating sub-station 10a to the support members 42 of the first mounting sub-station 10c. The tire-linear-movement interference member 40 may be spaced-apart by a height, $40_H$, from the pair of tire lower sidewall surface support members 42; the height $40_H$ is substantially equal to but less than the height $T_H$ of the tire T.

The tire rotating device 38 may include a plurality of roller members that extend away from approximately about a central portion of the upper surface of the tire lower sidewall surface support members 42. The tire-linear-movement interference member 40 may be located at and extend away from approximately about a distal end of the upper surface of the of the tire lower sidewall surface support members 42. The match-mark imaging camera 34 may be arranged above and over the tire lower sidewall surface support members 42. The microprocessor 36 is connected to the match-mark imaging camera 34. The microprocessor 36 is communicatively-coupled to the motor 14, and, the motor 14 is connected to the tire rotating device 38 (i.e., the microprocessor 36 is connected to the tire rotating device 38 by way of the motor 14).

Functionally, both of the tire T and the wheel W are advanced forwardly/rightwardly R at about the same speed such that the tire T and the wheel W arrive in a substantially axially-aligned orientation at the first mounting sub-station 10c prior to actuation of the pivot joint 32 by the controller 12 and the motor 14. The tire T may be advanced to and deposited upon the first mounting sub-station 10c as a result of the driving movement of the conveyor 24a, and, about concurrently, the wheel W may be advanced underneath the first mounting substation 10c by the wheel transporting device 30 in order to maintain substantially axial alignment of the wheel W with the tire T.

When substantially all of the lower sidewall $T_{SL}$ of the tire T is arranged upon the tire sidewall support members 42, the wheel W may be substantially axially-aligned with the tire T such that the wheel W is aligned with the gap 44 and is viewable through both of the gap 44 and the passage $T_P$ of the tire T by the match-mark imaging camera 34.

Then, the match-mark imaging camera 34 obtains/images match-marks $T_{MM}$, $W_{MM}$ of both of the tire T and the wheel W. The imaged match-marks $T_{MM}$, $W_{MM}$ of both of the tire T and the wheel W are then sent to and subsequently interpreted by the microprocessor 36. After interpreting the imaged match-marks $T_{MM}$, $W_{MM}$ of both of the tire T and the wheel W, the microprocessor 36 determines if and how much the tire T should be rotated by the tire rotating devices 38 in order to align the match-marks $T_{MM}$, $W_{MM}$ of both of the tire T and the wheel W. If the microprocessor 36 determines that the tire T should be rotated, the microprocessor 36 sends a signal to the motor 14, which, in turn causes/drives rotation of the tire rotating devices 38 in order to rotate the tire T for aligning the match-mark $T_{MM}$ of the tire T with the match-mark $W_{MM}$ of the wheel W. After the match-marks $T_{MM}$, $W_{MM}$ of both of the tire T and the wheel W have been aligned, the controller 12 causes the motor 14 to actuate the pivot joint 32, which causes the tire sidewall support members 42 to pivot relative to and no longer be linearly-aligned with the support members 24b, thereby disrupting the linear path $LP_T$ of the tire T thereby causing the linear path $LP_T$ of the tire T to intersect with the linear path $LP_W$ of the wheel W.

Once the pivot joint 32 has been actuated, the lower sidewall $T_{LS}$ of the tire T should no longer be arranged upon the conveyor 24a, and, with the assistance of gravity, one or more of the tread surface $T_T$ and a portion of the upper sidewall $T_{SU}$ of the tire T may be disposed adjacent the tire-linear-movement interference member 40 in order to, in part, prevent the tire T from sliding off of the tire sidewall support members 42. Further, once the pivot joint 32 has been actuated, and, because the wheel W is substantially axially-aligned with the tire T (and, due to the diameter $W_D$ of the wheel W being approximately equal to but slightly less than the width $42_W$ that forms the gap 44 between the tire sidewall support members 42), a portion of the wheel W may be arranged within the passage $T_P$ of the tire, T; referring to FIG. 6B', the portion of the wheel, W, arranged within the passage $T_P$ of the tire T may also result in a portion of the outer circumferential surface $W_C$ of the wheel W proximate the upper bead seat $W_{SU}$ being arranged adjacent the lower bead $T_{BL}$ of the tire T.

Referring to FIGS. 6B' and 6B", as the wheel W is advanced forwardly/rightwardly R along the linear path $LP_W$ of the wheel W by the wheel transporting device 30, the contact of the wheel W with the tire T results in the wheel W imparting movement to the tire T forwardly/rightwardly R along the linear path $LP_W$ of the wheel W. Although the wheel W imparts the movement to the tire T in the forwardly/rightwardly R along the linear path $LP_W$ of the wheel W, the tire-linear-movement interference member 40 resists, but does not prevent, movement of the tire T in the forwardly/rightwardly R direction along the linear path $LP_W$ of the wheel W; accordingly, as seen in FIG. 6B", 6B''', the tire-linear-movement interference member 40 temporarily deforms the tire T, which results in the tire T being spatially manipulated about the wheel W (such that, e.g., the chords $T_{C1}$, $T_{C2}/T_D$, $T_{C3}$, of the tire T are temporarily upset (i.e., expanded)) in order to permit the lower bead $T_{BL}$ of the tire T to be wrapped about the outer circumferential surface $W_C$ of the wheel W in order to partially join/mount the tire T to the wheel W, as seen in FIG. 6B'''. The wheel transporting device 30 also includes a wheel-retaining member (not shown) that counteracts the resistance imparted to the tire T by the tire-linear-movement interference member 40, which would otherwise be imparted to the wheel W in order to permit both of the tire T and the wheel W to continued forwardly/rightwardly R movement along the linear path $LP_W$ of the wheel W. Once the tire T is completely passed by the tire-linear-movement interference member 40 as seen in FIG. 6B''', the tire T deforms back into its at-rest/unbiased orientation prior to contacting the tire-linear-movement interference member 40 and is partially joined/mounted to the wheel W; further, as seen in FIG. 6B''', the upper bead $T_{BU}$ may be disposed over/adjacent the upper rim surface $W_{RU}$ of the wheel W.

Referring to FIGS. 5C, 6C and 6C'-6C''', once the tire T is partially joined/mounted to the wheel W as described above, the wheel transporting device 30 continues to move both of the wheel W and the tire T along the linear path $LP_W$ of the wheel W in the forwardly/rightwardly direction R toward the sub-station 10d. The sub-station 10d is shown conducting a processing step that may be referred to as a second mounting step; therefore, the sub-substation 10d may be referred to as a second mounting sub-station 10d.

As seen in FIGS. 5C and 6C, the second mounting sub-station 10d may include parallel support members 46 defining a gap 48. The transporting device 30 is movably-arranged within the gap 48 along the linear path $LP_W$ of the wheel W. The second mounting sub-station 10d may further comprise a pair of tire-linear-movement interference members 50 and one or more tire-tread-surface-contacting guide members 52 connected to and extending away from each support member defining the parallel support members 46. Like the tire-linear-movement interference member 40, the two pairs of tire-linear-movement interference members 50 may be spaced-apart by a height $50_H$ (see FIG. 5C) from the parallel support members 46; the height $50_H$ is substantially equal to but less than the height $T_H$ of the tire T.

Referring to FIGS. 6C' and 6C", as the tire T and the wheel W are advanced forwardly/rightwardly R along the linear path $LP_W$ of the wheel W by the wheel transporting device 30, the two pairs of tire-linear-movement interference members 50 of the second mounting sub-station 10d may come into contact with and resists, but does not prevent, movement of the tire T as the tire T is carried upon the wheel W in the forwardly/rightwardly R direction along the linear path $LP_W$ of the wheel W.

As the tire T is moved past the two pairs of tire-linear-movement interference members 50, the two pairs of tire-linear-movement interference members 50 are brought into contact with the upper sidewall $T_{SU}$ of the tire T; when the two pairs of tire-linear-movement interference members 50 come into contact with the upper sidewall $T_{SU}$ of the tire T, the two pairs of tire-linear-movement interference members 50 exert a downwardly force upon the tire T thereby temporarily deforming the tire T, which results in the tire T being spatially manipulated about the wheel W (such that, e.g., the chords $T_{C1}$, $T_{C2}/T_D$, $T_{C3}$ of the tire T are temporarily upset (i.e., expanded)) in order to permit the upper bead $T_{BU}$ of the tire T to be wrapped about the outer circumferential surface $W_C$ of the wheel W in order to complete the joining/mounting of the tire T to the wheel W as seen in FIG. 6C''' (due to both of the upper bead $T_{BU}$ and the lower bead $T_{BL}$ of the tire T being wrapped about the entire outer circumferential surface $W_C$ of the wheel W). During the temporary deforming process of the tire T as described above, the one or more tire-tread-surface-contacting guide members 52 may engage the tread surface $T_T$ of the tire T in order to assist in maintaining a substantially equal distribution of forces applied to the tire T as the tire T is advanced by the wheel W along the linear path $LP_W$ of the wheel W.

As explained above, the wheel transporting device 30 also includes a wheel-retaining member (not shown) that counteracts the resistance imparted to the tire T by the two pairs of tire-linear-movement interference members 50, which would otherwise be imparted to the wheel W in order to permit both of the tire T and the wheel W to continued forwardly/rightwardly R along the linear path $LP_W$ of the wheel W. Once the tire T is completely passed by the two pairs of tire-linear-movement interference members 50 as seen in FIG. 6C''', the tire T deforms back into its substantially at-rest/substantially unbiased orientation prior to contacting the two pairs of tire-linear-movement interference members 50 such that the tire T may be said to be mounted to the wheel W thereby forming a non-inflated tire-wheel assembly TW.

With reference to FIGS. 5A-6D and 7A-7C, in addition to the two pairs of tire-linear-movement interference members 50 and the one or more tire-tread-surface-contacting guide members 52, the second mounting sub-station 10d may further comprise one or more tire-engaging components 150 that also come into contact with and resists, but does not prevent, movement of the tire T as the tire T is carried upon the wheel W in the forwardly/rightwardly R direction along the linear path $LP_W$ of the wheel W. In an example, as seen in FIGS. 5A-5D, 6A-6D and 7A-7C, the one or more tire-engaging components 150 include: (1) a pair of upstream tire-engaging components 150a defined by a first upstream tire-engaging component $150a_1$ and a second upstream tire-engaging component $150a_2$, (2) a pair of midstream tire-engaging components 150b defined by a first midstream tire-engaging component $150b_1$ and a second midstream tire-engaging component $150b_2$ and (3) a downstream tire-engaging component 150c. Although the above-described number and combination of tire engagement components $150a_1$, $150a_2$, $150b_1$, $150b_2$, 150c are described at FIGS. 6A-6D and 7A-7C, the one or more tire-engaging components 150 are not limited to the above-described number and combination of tire-engaging components $150a_1$, $150a_2$, $150b_1$, $150b_2$, 150c and, as such, the one or more tire-engaging components 150 may include any desirable number and combination of tire-engaging components $150a_1$, $150a_2$, $150b_1$, $150b_2$, 150c.

Furthermore, as seen in FIGS. 1, 5A-5D and 7A-7C, the tire-wheel assembly manufacturing system 10 may also include an ambient temperature sensor 11 and an ambient humidity sensor 13 that is/are communicatively-coupled to the tire characteristic database 75. The ambient temperature sensor 11 and the ambient humidity sensor 13 detect ambient temperature and/or ambient humidity within the ambient environment that houses plurality of processing sub-stations 10a-10h of the tire-wheel assembly manufacturing system 10. The detected temperature and/or humidity may be communicated to the tire characteristic database 75.

Referring to FIG. 7A, the one or more tire-engaging components 150 are arranged in a non-engaged state relative to the tire T. As seen in FIG. 7B, the one or more tire-engaging components 150 are arranged in an engaged state, contacting the tire T and applying one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ (see, e.g., FIG. 7A) thereto; when arranged in the engaged state, the application of the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ by one or more tire-engaging components 150 assists the two pairs of tire-linear-movement interference members 50 and the one or more tire-tread-surface-contacting guide members 52 in spatially manipulating the tire T relative the W for wrapping the upper bead $T_{BU}$ of the tire T about the outer circumferential surface $W_C$ of the wheel W in order to complete the joining/mounting of the tire T to the wheel W as seen in FIGS. 6C''' and 7C (due to both of the upper bead $T_{BU}$ and the lower bead $T_{BL}$ of the tire T being wrapped about the entire outer circumferential surface $W_C$ of the wheel W). Referring to FIG. 7C, the one or more tire-engaging components 150 are returned to the non-engaged state from the engaged state.

As described above, the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ applied by the one or more tire-engaging components 150 to the tire T may assist the two pairs of tire-linear-movement interference members 50 and the one or more tire-tread-surface-contacting guide members 52 in mounting the tire T to the wheel W. As seen in FIGS. 7A-7C and alluded to in the reference numeral designations, the one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ are defined by a three-dimensional Cartesian coordinate system having an X component, a Y component and a Z component. A prime (') designation next to any of an X component, a Y component and a Z component infers a negative or opposite direction of a corresponding positive direction of a corresponding X component, a Y component and a Z component.

In an example, movement of the first upstream tire-engaging component $150a_1$ toward the tire T (as seen in, e.g., FIGS. 7A-7B) may be defined by: a positive X component (see, e.g., tire-engaging directional value $X_{150a1}$), a positive Y component (see, e.g., tire-engaging directional value $Y_{150a1}$) and a positive Z component (see, e.g., tire-engaging directional value $Z_{150a1}$). In an implementation, movement of the second upstream tire-engaging component $150a_2$ toward the tire T (as seen in, e.g., FIGS. 7A-7B) may be defined by: a positive X component (see, e.g., tire-engaging directional value $X_{150a2}$), a negative Y component (see, e.g., tire-engaging directional value $Y_{150a2}'$) and a positive Z component (see, e.g., tire-engaging directional value $Z_{150a2}$).

In another example, movement of the first midstream tire-engaging component $150b_1$ toward the tire T (as seen in, e.g., FIGS. 7A-7B) may be defined by: a negative X component (see, e.g., tire-engaging directional value $X_{150b1}'$) and a positive Z component (see, e.g., tire-engaging directional value $Z_{150b1}$). In an implementation, movement of the second midstream tire-engaging component $150b_2$ toward the tire T (as seen in, e.g., FIGS. 7A-7B) may be defined by: a negative X component (see, e.g., tire-engaging directional value $X_{150b2}'$) and a positive Z component (see, e.g., tire-engaging directional value $Z_{150b2}$). In yet another example, movement of the downstream tire-engaging component $150c$ toward the tire T (as seen in, e.g., FIGS. 7A-7B) may be defined by: a negative X component (see, e.g., tire-engaging directional value $X_{150c}'$).

Furthermore, when the one or more tire-engaging components 150 engages the tire T with any of the above-identified one or more tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$, the one or more tire-engaging components 150 may engage any surface portion of the tire T. For example, each of the first upstream tire-engaging component $150a_1$ and the second upstream tire-engaging component $150a_2$ may engage one or more of (a generally upstream portion of) the lower sidewall $T_{SL}$ and the tread surface $T_T$ of the tire T. In another example, the first midstream tire-engaging component $150b_1$ and the second midstream tire-engaging component $150b_2$ may engage one or more of (a generally upstream portion of) the lower sidewall $T_{SL}$ and the tread surface $T_T$ of the tire T. In yet another example, the downstream tire-engaging component $150c$ may engage (a generally upstream portion of) the tread surface $T_T$ of the tire T. As seen in FIG. 7B, the one or more tire-engaging components 150 may converge upon the tire T such that the first upstream tire-engaging component $150a_1$ and the second upstream tire-engaging component $150a_2$ engages a generally upstream portion of the tire T, and the first midstream tire-engaging component $150b_1$, the second midstream tire-engaging component $150b_2$ and the downstream tire-engaging component $150c$ engages a generally upstream portion of the tire T.

With reference to FIG. 7A, an exemplary methodology for operating the one or more tire-engaging components 150 is now described. Firstly, an operator may inform (by way of e.g., a manual input via a keyboard) the controller 12 of a tire species $T_1/T_2/T_n$ or a tire class $T_{2-1}/T_{2-2}/T_{2-3}/T_{2-4}/T_{2-5}/T_{2-n}$ that the tire-wheel assembly manufacturing system 10 is currently processing. Then, the controller 12 may communicate with the tire characteristic database 75 to retrieve optimal tire-engaging data (see, e.g., $XYZ_2$, $XYZ_{10}$, $XYZ_{15}$, $XYZ_{23}$, $XYZ_{26}$, $XYZ_{34}$ in FIG. 8) from the data look-up table 175 related to one or more optimal tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ that corresponds to predetermined sidewall stiffness characteristics of the currently-processed tire species $T_1/T_2/T_n$ or a tire class $T_{2-1}/T_{2-2}/T_{2-3}/T_{2-4}/T_{2-5}/T_{2-n}$; as described above, the optimal-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ associated with the optimal tire-engaging data (see, e.g., $XYZ_2$, $XYZ_{10}$, $XYZ_{15}$, $XYZ_{23}$, $XYZ_{26}$, $XYZ_{34}$ in FIG. 8) results from previous engagement of the tire species $T_1/T_2/T_n$ or the tire classes $T_{2-1}/T_{2-2}/T_{2-3}/T_{2-4}/T_{2-5}/T_{2-n}$ with the tire characteristic determination system 100.

In an example, as seen in FIGS. 1 and 7A, the operator may inform the controller 12 that the tire-wheel assembly manufacturing system 10 is currently processing a tire species $T_{2-3}$. Furthermore, in an example, the ambient temperature sensor 11 and the ambient humidity sensor 13 may inform the tire characteristic database 75 that the ambient temperature and/or the ambient humidity surrounding the tire-wheel assembly manufacturing system 10 is approximately 72° F. and 15%.

Upon receiving: (1) the tire species input $T_{2-3}$, (2) the ambient temperature input 72° F. and (3) the ambient humidity input 15%, the tire characteristic database 75 may locate the optimal tire-engaging data $XYZ_{15}$ for the tire species $T_{2-3}$ from the data look-up table 175 and communicate to the controller 12 the optimal tire-engaging values $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$ associated with the optimal tire-engaging data $XYZ_{15}$ that may be applied to the one or more tire-engaging components 150 for spatially manipulating the tire T relative the W such that the one or more tire-engaging components 150 do not under-engaging the tire species $T_{2-3}$ (which may result in, e.g., the tire species $T_{2-3}$ not being mounted to the wheel W) or over-engaging the tire species $T_{2-3}$ (which may result in, e.g., damage being imparted to the tire species $T_{2-3}$). Accordingly, once the tire species $T_{2-3}$ is advanced by the wheel W to an orientation as seen in FIG. 7B where the two pairs of tire-linear-movement interference members 50 and the one or more tire-tread-surface-contacting guide members 52 engage the tire species $T_{2-3}$, the controller 12 may send a signal to the motor 14 for causing the one or more tire-engaging components 150 to further engage the tire species $T_{2-3}$ with the optimal tire-engaging value are $X_{150a1}$, $Y_{150a1}$, $Z_{150a1}$; $X_{150a2}$, $Y_{150a2}'$, $Z_{150a2}$; $X_{150b1}'$, $Z_{150b1}$; $X_{150b2}'$, $Z_{150b2}$; $X_{150c}'$. Referring to FIG. 7C, just before or after the tire species $T_{2-3}$ is advanced along the linear path $LP_W$ of the wheel W past the two pairs of tire-linear-movement interference members 50 and the one or more tire-tread-surface-contacting guide members 52, the controller 12 may send a signal to the motor 14 for withdrawing the one or more tire-engaging components 150 from the tire species $T_{2-3}$ such that the one or more tire-engaging components 150 no longer engage the tire species $T_{2-3}$.

Referring to FIGS. 5D, 6D and 6D'-6D", the non-inflated tire-wheel assembly TW is advanced to the inflating sub-station 10e by the wheel transporting device 30. As explained above, the inflating sub-station 10e may engage the non-inflated tire-wheel assembly TW and perform the act of inflating the non-inflated tire-wheel assembly TW in order to direct air into the circumferential air cavity $T_{AC}$ of the tire T of the non-inflated ire-wheel assembly TW. As a result of the act of inflating conducted by the inflating sub-station 10e, the upper bead $T_{BU}$ and the lower bead $T_{BL}$ of the tire T may be disposed (or "seated") adjacent the upper bead seat $W_{SU}$ and the lower bead seat $W_{SL}$ of the wheel W such that the non-inflated tire-wheel assembly TW may now be referred to as an inflated tire-wheel assembly TW.

Once the tire-wheel assembly TW is inflated at the inflating sub-station 10e, the inflated tire-wheel assembly TW is advanced by the wheel transporting device 30 to the sub-station 10f. The processing act conducted by the sub-station 10f may include the act of "exercising" the tire T relative the wheel W in order to fully seat the upper bead $T_{BU}$ and the lower bead $T_{BL}$ of the tire T adjacent the upper bead seat $W_{SU}$ and the lower bead seat $W_{SL}$ of the wheel W respectively. Accordingly, the inflating sub-station 10e may be referred to as an exercising sub-station. As explained above, in some circumstances, entrapments E (see, e.g., FIG. 12A) such as, for example: air bubbles, lubricant/soap, impurities or the like may be undesirably located between a bead $T_{BU}/T_{BL}$, of the tire T and the seat $W_{SU}/W_{SL}$ of the wheel W after the inflating procedure conducted by the inflating sub-station 10e; by "exercising" (which may include the exercising sub-station contacting the inflated tire-wheel assembly TW and imparting one or more of the acts of vibrating, vacuuming, or the like to the inflated tire-wheel assembly TW) the entrapments E may be removed/withdrawn (as seen in FIG. 12B in reference to FIG. 12A) from the inflated tire-wheel assembly TW such that one or more of the upper bead $T_{BU}$ and the lower bead $T_{BL}$ of the tire T may be fully seated adjacent one or more of the upper bead seat $W_{SU}$ and the lower bead seat $W_{SL}$ of the wheel W.

Once the tire-wheel assembly TW is exercised at the exercising sub-station 10f, the inflated tire-wheel assembly TW is advanced by the wheel transporting device 30 to the sub-stations 10g and 10h. The processing act conducted by the sub-station 10g may include balancing the inflated tire-wheel assembly TW. The processing act conducted by the substation 10h may include testing the uniformity of the balanced tire-wheel assembly TW. The balancing and testing-of-uniformity acts may include determining the un/balance of the inflated tire-wheel assembly TW and adding one or more weights to the tire-wheel assembly TW until the inflated tire-wheel assembly TW is balanced. Any desirable balancing apparatus and uniformity testing apparatus may be utilized for carrying out the above-described processing steps at the sub-stations 10g, 10h.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating an automated tire-wheel assembly manufacturing system, comprising:
    determining a sidewall stiffness of a tire by quantifying the sidewall stiffness of the tire into one or more electrical signals;
    presenting the one or more electrical signals to the automated tire-wheel manufacturing system; and
    using the one or more electrical signals for
        establishing a manipulation scheme associated with at least one actuator used in the automated tire-wheel assembly manufacturing system for
        spatially manipulating the tire about a wheel for mounting the tire upon the wheel for forming a tire-wheel assembly.

2. The method of claim 1, wherein the tire is a non-inflated tire, wherein the tire-wheel assembly is a non-inflated tire-wheel assembly.

3. The method of claim 1, wherein said quantifying step includes:
    collecting tire engaging data; and
    creating a functional relationship between the tire engaging data and the electrical signals using a lookup table.

4. The method of claim 1, wherein said quantifying step includes:
    collecting tire engaging data; and
    creating a functional relationship between the tire engaging data and the electrical signals using parametric equations.

5. The method of claim 1, wherein said quantifying step includes:
    collecting tire engaging data; and
    creating a functional relationship between the tire engaging data and the electrical signals using piecewise linear functions.

6. The method of claim 1, wherein prior to the determining step, the method further comprises:
    arranging a tire-portion-receiving cavity of a tire-engaging test probe about one or more surface portions of the tire.

7. The method of claim 6, wherein after the arranging step, the method further comprises:
    sending an actuation signal from a computing resource to a tire engagement actuator connected to a shaft extending from the tire-engaging test probe for
        imparting movement to the shaft that results in corresponding movement to:

the tire-engaging test probe; and
the one or more surface portions of the tire arranged within the tire-portion-receiving cavity of a tire-engaging test probe.

8. The method of claim 7, wherein the imparted movement to the tire-engaging test probe is substantially orthogonal to an upper sidewall of the tire for:
pushing the one or more surface portions of the tire with the tire-engaging test probe; or
pulling the one or more surface portions of the tire with the tire-engaging test probe.

9. The method of claim 7, wherein the actuation signal is a force signal that results in the tire-engaging test probe:
pushing the one or more surface portions of the tire with the tire-engaging test probe with a specific amount of pushing force; or
pulling the one or more surface portions of the tire with the tire-engaging test probe with a specific amount of pulling force.

10. The method of claim 1, wherein the step of quantifying the sidewall stiffness of the tire includes:
utilizing a displacement sensor communicatively-coupled to a computing resource for
determining a displacement distance that the tire-engagement test probe was moved as a result of a resistance arising from the sidewall stiffness of the tire.

11. The method of claim 10, further comprising:
communicating from the displacement sensor to the computing resource the determined displacement distance.

* * * * *